United States Patent
K S et al.

(10) Patent No.: US 12,249,047 B2
(45) Date of Patent: Mar. 11, 2025

(54) METHODS AND SYSTEMS FOR DENOISING MEDIA USING CONTEXTUAL INFORMATION OF THE MEDIA

(71) Applicant: SAMSUNG ELECTRONICS CO., LTD., Suwon-si (KR)

(72) Inventors: Green Rosh K S, Bangalore (IN); Bindigan Hariprasanna Pawan Prasad, Bangalore (IN); Nikhil Krishnan, Bangalore (IN); Sachin Deepak Lomte, Bangalore (IN); Anmol Biswas, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 462 days.

(21) Appl. No.: 17/526,714

(22) Filed: Nov. 15, 2021

(65) Prior Publication Data

US 2022/0076385 A1   Mar. 10, 2022

Related U.S. Application Data

(63) Continuation of application No. PCT/KR2021/002708, filed on Mar. 4, 2021.

(30) Foreign Application Priority Data

Mar. 4, 2020 (IN) .............. 202041009368
Mar. 1, 2021 (IN) .............. 202041009368

(51) Int. Cl.
*G06K 9/00* (2022.01)
*G06T 5/20* (2006.01)
(Continued)

(52) U.S. Cl.
CPC .............. *G06T 5/70* (2024.01); *G06T 5/20* (2013.01); *G06T 7/11* (2017.01);
(Continued)

(58) Field of Classification Search
CPC ..... G06T 5/70; G06T 5/20; G06T 7/11; G06T 2207/20024; G06T 2207/20081;
(Continued)

(56) References Cited

U.S. PATENT DOCUMENTS 6,990,252 B2   1/2006   Shekter
8,280,185 B2  10/2012   Demandolx
(Continued)

FOREIGN PATENT DOCUMENTS

CN   106204467 A       12/2016
CN   110738605 A  *   1/2020  ............ G06T 5/002
(Continued)

OTHER PUBLICATIONS

International Search Report and Written Opinion dated Jun. 21, 2021 issued by the International Searching Authority in International Application No. PCT/KR2021/002708 (PCT/ISA/220, PCT/ISA/210, and PCT/ISA/237).
(Continued)

*Primary Examiner* — Xin Jia
(74) *Attorney, Agent, or Firm* — Sughrue Mion, PLLC

(57) ABSTRACT

A method for processing image data, may include: receiving at least one image; segregating the at least one image into at least one region, based on a requested noise reduction level; and denoising the at least one image by varying at least one
(Continued)

control feature of the segregated at least one region by a neural network to achieve the requested noise reduction level.

23 Claims, 48 Drawing Sheets

(51) Int. Cl.
    *G06T 5/70*     (2024.01)
    *G06T 7/11*     (2017.01)

(52) U.S. Cl.
    CPC ............... *G06T 2207/20024* (2013.01); *G06T 2207/20081* (2013.01); *G06T 2207/20084* (2013.01)

(58) Field of Classification Search
    CPC ............ G06T 2207/20084; G06T 5/60; G06T 2207/20104; G06T 2207/30201; G06N 3/08
    See application file for complete search history.

(56) References Cited

U.S. PATENT DOCUMENTS

| | | |
|---|---|---|
| 8,711,249 B2 | 4/2014 | Baqai et al. |
| 8,818,109 B2 | 8/2014 | Kisilev et al. |
| 2008/0310695 A1 | 12/2008 | Garnier et al. |
| 2019/0114742 A1 | 4/2019 | Wang |
| 2020/0175420 A1 | 6/2020 | Lee et al. |
| 2021/0104021 A1* | 4/2021 | Sohn ........................ G06T 5/70 |

FOREIGN PATENT DOCUMENTS

| | | |
|---|---|---|
| KR | 10-2019-0119548 A | 10/2019 |
| KR | 10-2063492 B1 | 1/2020 |
| WO | 2011/094164 A1 | 8/2011 |

OTHER PUBLICATIONS

Chen Chen et al., "Learning to See in the Dark", arXiv: 1805.01934v1, In Proceedings of the IEEE Conference on Computer Vision and Pattern Recognition, May 2018, 10 pages total.

Tim Brooks et al., "Unprocessing Images for Learned Raw Denoising", Computer Vision Foundation, In Proceedings of the IEEE Conference on Computer Vision and Pattern Recognition, 2019, 10 pages total.

Eli Schwartz et al., "DeepISP: Learning End-to-End Image Processing Pipeline", arXiv: 1801.06724v1, IEEE Transactions on Image Processing, Jan. 2018, 8 pages total.

Tal Remez et al, "Class-Aware Fully-Convolutional Gaussian and Poisson Denoising," XP081100135, Cornell University Library, Aug. 20, 2018, (16 total pages).

Thijs Vogels et al., "Denoising with Kernel Prediction and Asymmetric Loss Functions," XP058909112, AMC Transactions on Graphics, vol. 37, No. 4, Article 124. Jul. 30, 2018, (15 total pages).

Communication issued Dec. 9, 2022 by the European Patent Office in European Patent Application No. 21764622.3.

European Extended Search Report issued Sep. 20, 2024 by the European Patent Office for EP Patent Application No. 21764622.3.

* cited by examiner

FIG. 4C

| ISO | EXPOSURE TIME (ms) | INITIAL CONTROL FEATURE |
|---|---|---|
| 100 | 50 | 2k |
| 100 | 1000 | 0.1k |
| 400 | 50 | 8k |
| 400 | 1000 | 0.4k |
| ⋮ | ⋮ | ⋮ |
| 2000 | 50 | 40k |
| 2000 | 1000 | 2k |
| 4000 | 50 | 80k |
| 4000 | 1000 | 4k |

FIG. 5E

| ISO | EXPOSURE TIME (ms) | INITIAL CONTROL FEATURE | $\alpha$ = g(ISO, EXPOSURE, SENSOR) | UPDATED CONTROL FEATURE |
|---|---|---|---|---|
| 100 | 50 | 2k | 1 → 0.5 (tuning) | 20k$\alpha$ |
| 100 | 1000 | 0.1k | 1 | 0.1k$\alpha$ |
| 400 | 50 | 8k | 1 | 8k$\alpha$ |
| 400 | 1000 | 0.4k | 1 | 0.4k$\alpha$ |
| ... | ... | ... | ... | ... |
| 2000 | 50 | 40k | 1 | 40k$\alpha$ |
| 2000 | 1000 | 2k | 1 | 2k$\alpha$ |
| 4000 | 50 | 80k | 1 | 80k$\alpha$ |
| 4000 | 1000 | 4k | 1 | 4k$\alpha$ |

VALUE OF ALPHA AFTER TUNING

FIG. 7D

SENSOR PROFILE LUT

| ISO | EXPOSURE TIME (ms) | α = g(ISO, EXPOSURE, SENSOR) |
|---|---|---|
| 100 | 50 | 1 → 0.5 (tuning) |
| 100 | 1000 | 1 |
| 400 | 50 | 1 |
| 400 | 1000 | 1 |
| ... | ... | ... |
| 2000 | 50 | 1 |
| 2000 | 1000 | 1 |
| 4000 | 50 | 1 |
| 4000 | 1000 | 1 |

FIG. 9A

FACTORY PROFILE LUT

| OBJECT CONTEXT | | | FACTORY ALPHA |
|---|---|---|---|
| OBJECT CATEGORY | ISO | EXPOSURE | |
| FACE | 50 | 0.1 ms | 1 |
| ⋮ | ⋮ | ⋮ | ⋮ |
| FACE | 4000 | 1s | 1 |
| ⋮ | ⋮ | ⋮ | ⋮ |
| CLASS X | 50 | 0.1 ms | 1 |
| ⋮ | ⋮ | ⋮ | ⋮ |
| CLASS X | 4000 | 1s | 1 |

FIG. 9B

CUSTOMPROFILE LUT

| OBJECT CONTEXT | | | FACTORY ALPHA | USER ALPHA |
|---|---|---|---|---|
| OBJECT CATEGORY | ISO | EXPOSURE | | |
| FACE | 50 | 0.1 ms | 1 | 1 |
| | | ⋮ | | |
| FACE | 4000 | 1s | 1 | 1 |
| | | ⋮ | | |
| CLASS X | 50 | 0.1 ms | 1 | 1 |
| | | ⋮ | | |
| CLASS X | 4000 | 1s | 1 | 1 |

FIG. 9C

USER PROFILE LUT

| OBJECT CONTEXT | | | FACTORY ALPHA | USER ALPHA |
|---|---|---|---|---|
| OBJECT CATEGORY | ISO | EXPOSURE | | |
| FACE | 50 | 0.1 ms | 1 | 0.8 |
| | | ⋮ | | |
| FACE | 4000 | 1s | 1 | 0.8 |
| | | ⋮ | | |
| CLASS X | 50 | 0.1 ms | 1 | 1 |
| | | ⋮ | | |
| CLASS X | 4000 | 1s | 1 | 1 |

FIG. 10B

CROWD SOURCE PROFILE LUT

| CLASS | ISO | EXPOSURE | CROWD ALPHA |
|---|---|---|---|
| FACE | 50 | 0.1 ms | 0.6 |
| | | ⋮ | |
| FACE | 4000 | 1s | 0.5 |
| | | ⋮ | |
| CLASS X | 50 | 0.1 ms | 1 |
| | | ⋮ | |
| CLASS X | 4000 | 1s | 1 |

FIG. 14B
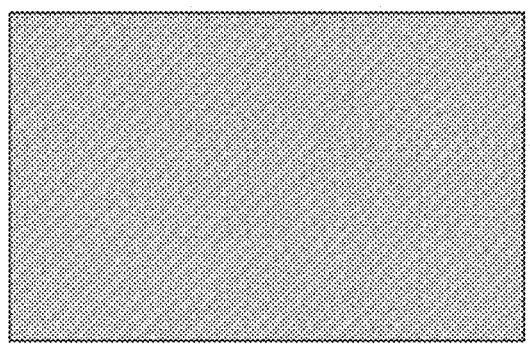
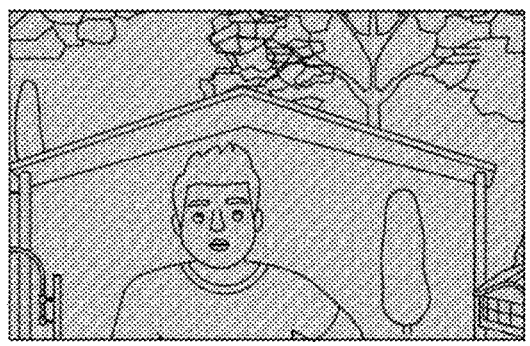
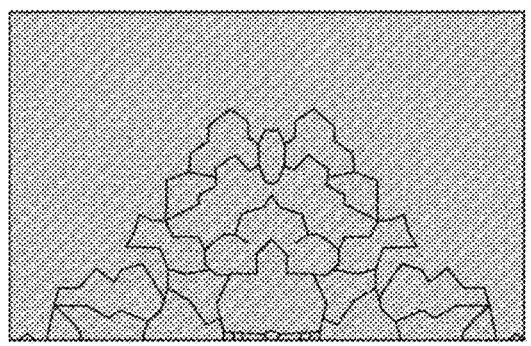

FIG. 14C
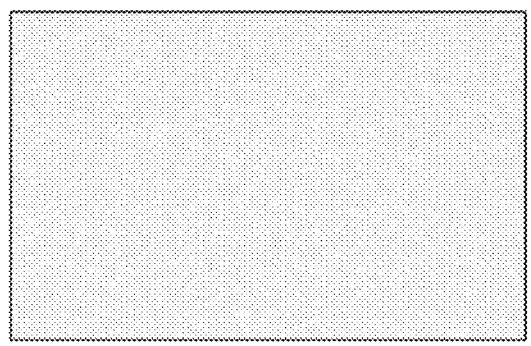
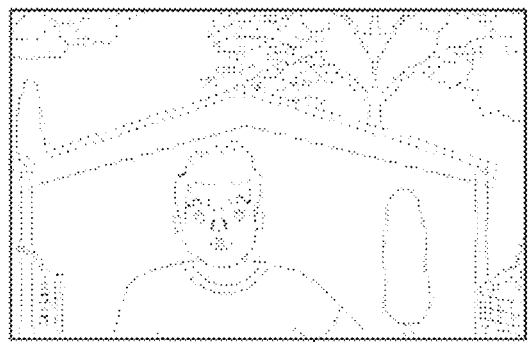
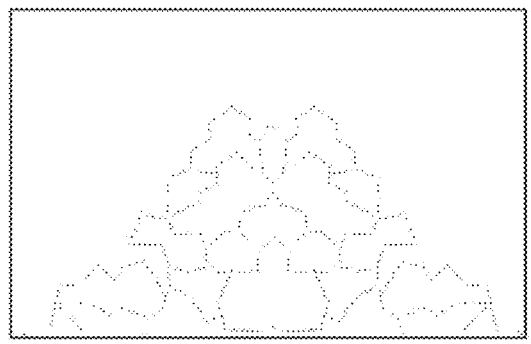

FIG. 14D
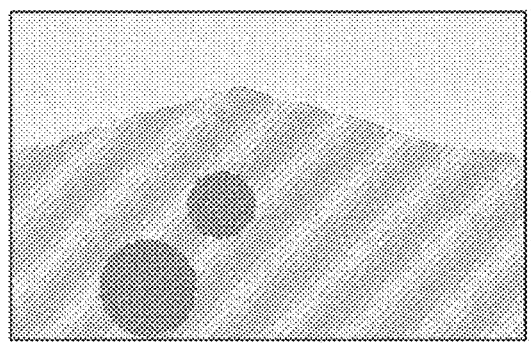
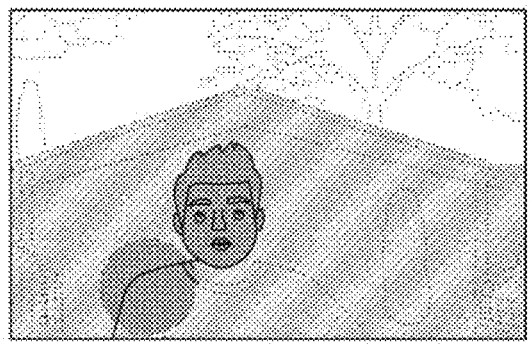
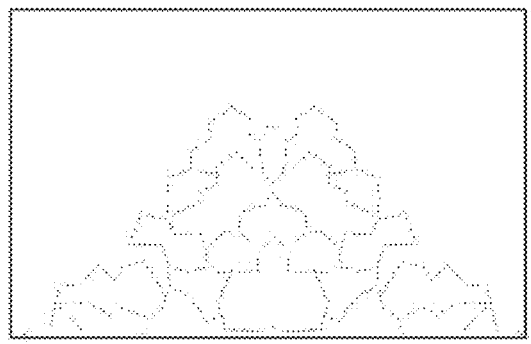

FIG. 17B
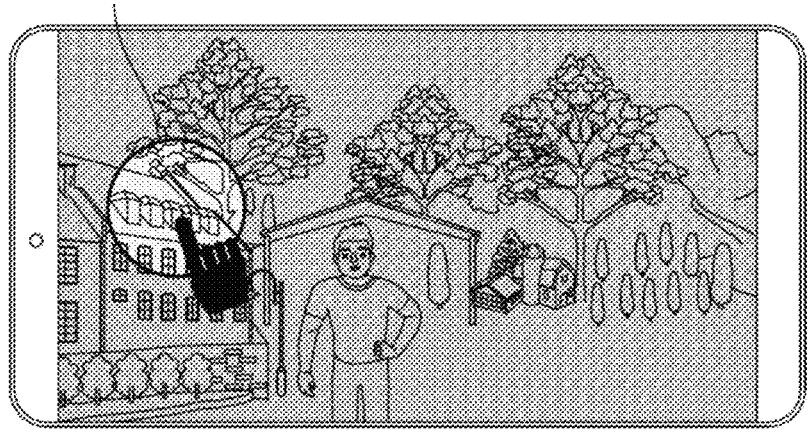
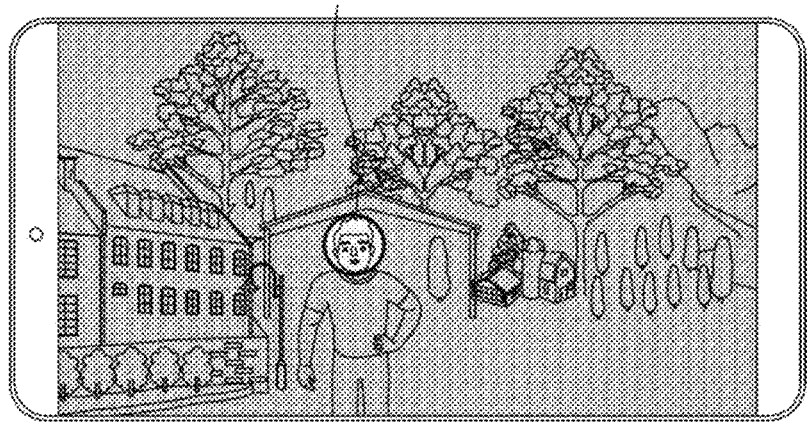
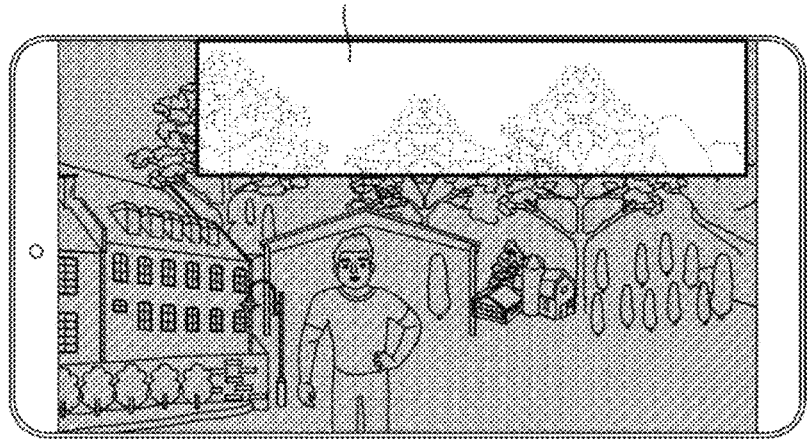

FIG. 19
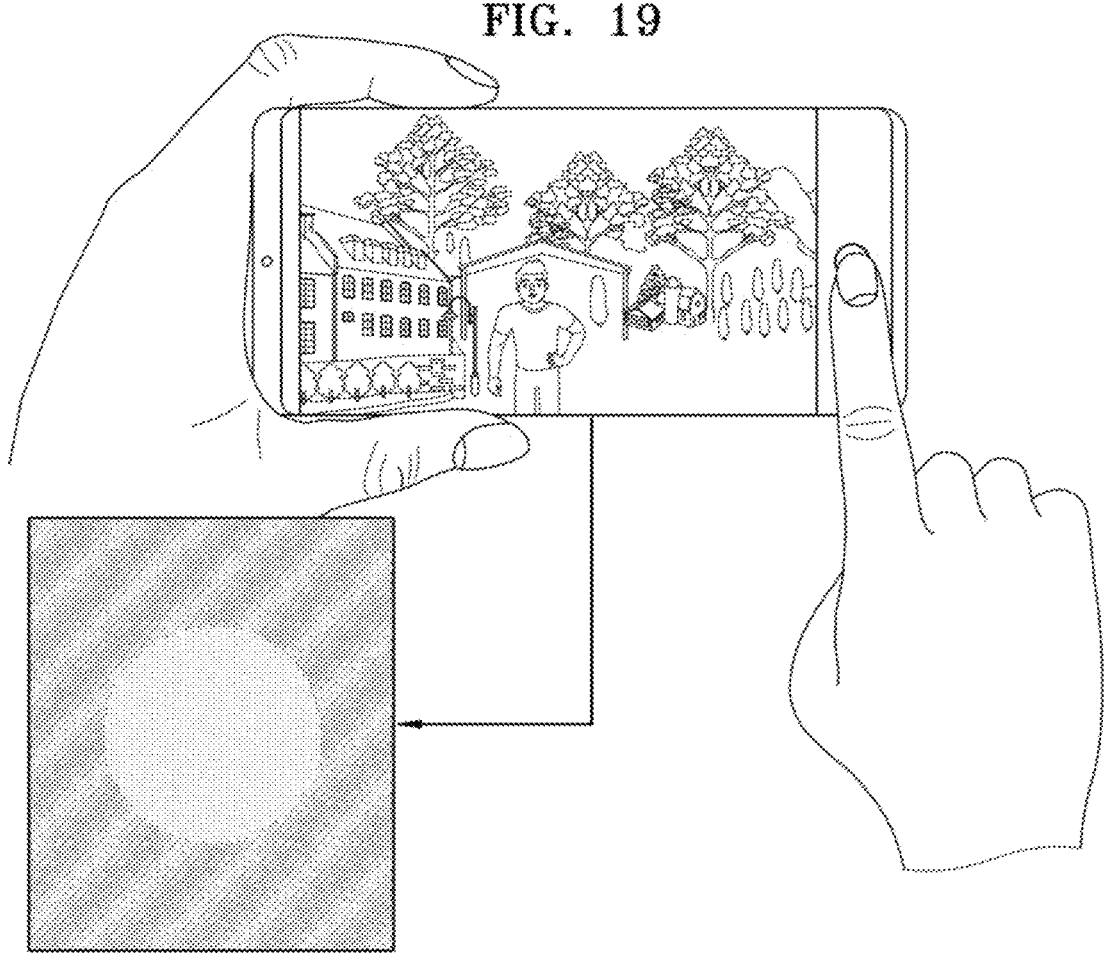
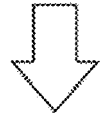
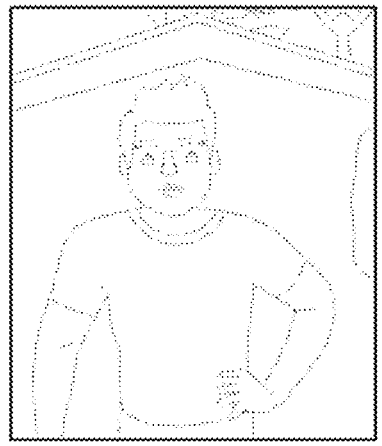
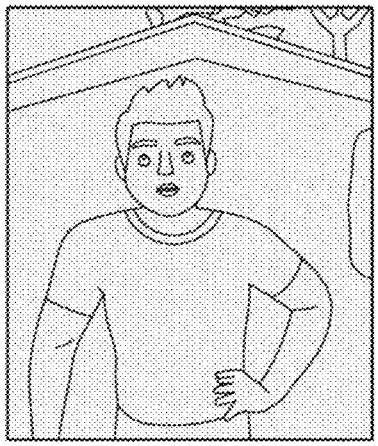
ALPHA MAP
DEFAULT NETWORK OUTPUT
OUTPUT WITH TOUCH BASED CONTROL FIG. 24
DEVICE A
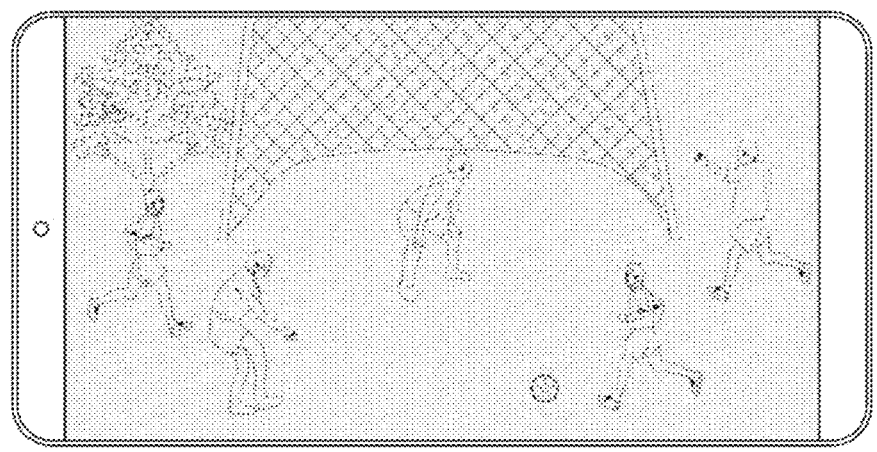
DEVICE B
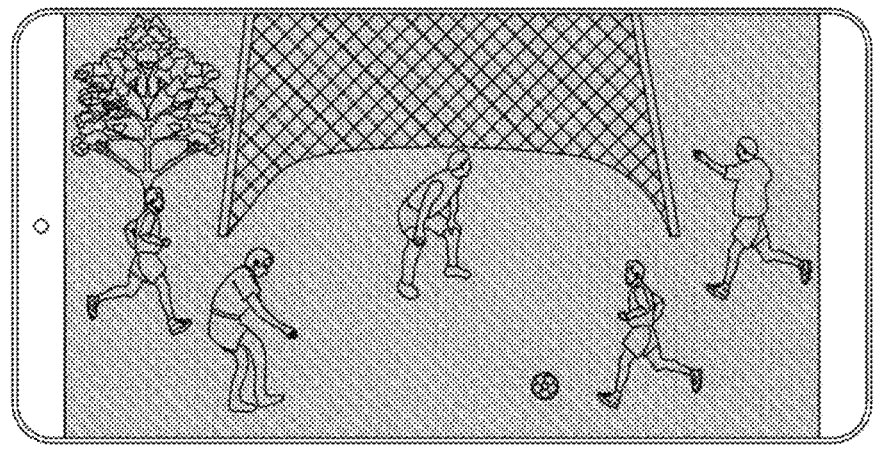
DENOISED OUTPUT
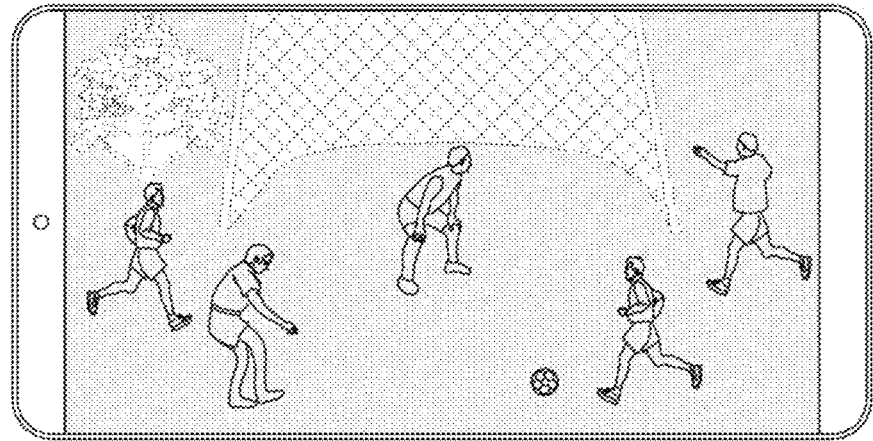

METHODS AND SYSTEMS FOR DENOISING MEDIA USING CONTEXTUAL INFORMATION OF THE MEDIA

CROSS-REFERENCE TO RELATED APPLICATIONS

This application is a bypass continuation application of International Application No. PCT/KR2021/002708, filed on Mar. 4, 2021, which claims priority to Indian Provisional Patent Application No. 202041009368 filed on Mar. 4, 2020 and Indian Complete Patent Application No. 202041009368 filed on Mar. 1, 2021, in the Indian Patent Office, the disclosures of which are incorporated herein by reference in their entireties.

BACKGROUND

1. Field

The disclosure relates to processing media data or an image and more particularly to processing the media data or the image to reduce noise, while preserving details in the media data or the image.

2. Description of Related Art

Denoising has been a primary area of focus especially in low light media data (such as images, videos, and so on). In the related art, multiple frames are blended to improve a signal to noise ratio of the media data, thereby reducing noise in the media data. However, a process of blending the multiple frames has to be performed several times when the frames are captured in low light scenarios.

In the related art, deep learning models may be used to reduce noise in the media data. However, parameters of the deep learning models are obtained based on a fixed amount of training data. Thus, it is difficult to change an output media data of the deep learning models dynamically based on captured conditions of the media data.

SUMMARY

Provided are methods and systems for denoising media using contextual information of the media.

Additional aspects will be set forth in part in the description which follows and, in part, will be apparent from the description, or may be learned by practice of the presented embodiments.

In accordance with an aspect of the disclosure, a method for processing image data may include: receiving at least one image; segregating the at least one image into at least one region, based on a requested noise reduction level; and denoising the at least one image by varying at least one control feature of the segregated at least one region by a neural network to achieve the requested noise reduction level.

The at least one image may be segregated into the at least one region based on at least one of a gesture input performed by a user on the at least one image, a frequency analysis performed on the at least one image, or saturation information of the at least one image.

The denoising the at least one image may include: training the neural network using a plurality of training image samples including noise characteristics, and a ground truth image sample; and denoising the at least one image using the trained neural network.

The training the neural network may include: extracting at least one feature from each of the plurality of training image samples, wherein the at least one feature may include at least one of noise distribution, lighting levels or sensor metadata; deriving at least one initial control feature for each of the plurality of training image samples by encoding the extracted at least one feature using at least one filter, wherein the at least one filter may include at least one of a high pass filter, or a Laplacian filter; providing each of the plurality of training image samples and the at least one initial control feature associated with of the plurality of training image samples, to the neural network for generating an output image sample for each of the plurality of training image samples; computing a loss function by comparing the generated output image sample corresponding to each of the plurality of training image samples with the ground truth image sample; and updating parameters of the neural network based on the computed loss function to generate the output image sample for at least one subsequent training image sample.

The at least one initial control feature of a training image sample, among the plurality of training image samples, may provide an estimate of noise present in the respective training image sample, wherein the at least one initial control feature may include at least one of a user touch input, face detection, scene analysis, sensor metadata or a user manual control.

The denoising the at least one image using the trained neural network may include: extracting contextual information of the at least one image, wherein the contextual information may include at least one of a user touch input, face detection, scene analysis, sensor metadata, or a user manual control; creating an alpha map for the at least one image based on the contextual information of the at least one image; generating the at least one control feature based on the alpha map or the at least one initial control feature that has been derived while training the neural network; and generating at least one output image by varying the at least one control feature using the trained neural network, wherein the generated at least one output image may include the at least one region of the at least one image, while preserving details of the at least one image.

The creating the alpha map may include: creating the alpha map based on the contextual information of the at least one image; or creating the alpha map using a look-up-table (LUT), wherein the alpha map provides information to control a denoising strength of the trained neural network.

The creating the alpha map based on the contextual information of the at least one image may include: generating a first initial map corresponding to a first contextual information of the at least one image by updating an initial uniform map based on the first contextual information; until initial maps are generated for all contextual information of the at least one image, recursively performing: receiving a subsequent contextual information of the at least one image; and generating a subsequent initial map corresponding to the subsequent contextual information by updating the first initial map or a previous initial map based on the subsequent contextual information; merging the initial maps corresponding to all the contextual information of the at least one image; and convoluting the merged initial maps using a smoothing filter to create the alpha map.

The creating the alpha map using the LUT may include: obtaining a value of an alpha parameter from the LUT for the contextual information of the at least one image; and creating the alpha map using the obtained value of the alpha parameter.

The LUT may include at least one of: a sensor profile LUT that includes a mapping of values of the alpha parameter with respect to values of the sensor metadata of at least one image sample, wherein the alpha parameter in the sensor profile LUT is a senor alpha parameter; a user profile LUT that includes a mapping of the values of the alpha parameter with respect to the values of the contextual information of the at least one image sample, wherein the alpha parameter in the user profile LUT is a user alpha parameter; a crowd source profile LUT that includes a mapping of the values of the alpha parameter with respect to the values of the contextual information of the at least one image sample, wherein the alpha parameter in the crowd source profile LUT is a crowd source alpha parameter; and a factory profile LUT that includes a mapping of the values of the alpha parameter with respect to the contextual information of the at least one image sample, wherein the alpha parameter in the factory profile LUT is a factory alpha parameter.

The method may further include: updating the sensor profile LUT, and the updating the sensor profile LUT may include at least one of: tuning at least one of the values of the alpha parameter using the at least one image sample captured using different image sensors under different capturing conditions; tuning the at least one of the values of the alpha parameter using an intra-sensor tuning, wherein the intra-sensor tuning includes tuning the at least one of the values of the alpha parameter of an image sensor used to capture the at least one image sample; and tuning the at least one of the values of the alpha parameter using an inter-sensor tuning, wherein the inter-sensing tuning includes tuning the at least one of the values of the alpha parameter with respect to a plurality of image sensors used to capture different image samples.

The method may further include: generating the user profile LUT including: determining at least one first action performed by a user to denoise the at least one image sample, when at least one factory profile image corresponding to the at least one image sample is generated by denoising the at least one image sample using the factory profile LUT and is provided to the user; determining the contextual information of the denoised at least one image sample using the at least one first action of the user; generating a custom profile LUT by creating a mapping of the values of the alpha parameter with respect to the determined contextual information; generate a custom profile image by denoising the at least one image sample using the custom profile LUT; determining at least one second action performed by the user to denoise the at least one image sample using at least one of the custom profile image and the factory profile image; determining the contextual information of the denoised at least one image sample using the at least one second action of the user; and updating the custom profile LUT by tuning at least one of the values of the alpha parameter based on the at least one second action of the user, wherein the updated custom profile LUT is set to the user profile LUT.

The method may further include: transmitting the user profile LUT to a server, to enable the server to generate a crowd source profile based on the user profile LUT corresponding to each of a plurality of users, and a weight of each of the plurality of users; receiving the crowd source profile LUT from the server; and providing, to the server, usage statistics that indicate whether the user has selected the crowd source profile LUT for denoising the at least one image sample, to enable the server to compute a preference score for the crowd source profile LUT, and to update the weight of each of the plurality of users.

The method may further include: updating the LUT based on user preferences. The updating the LUT may include: receiving at least one second denoised image from another electronic device; fetching at least one first denoised image stored in a memory; performing a noise estimation of the at least one first denoised image and the at least one second denoised image; calculating a ratio based on the noise estimation of the at least one first denoised image and the at least one second denoised image, wherein the ratio provides a relative noise estimation between the at least one first denoised image and the at least one second denoised image; and updating the LUT by tuning the alpha parameter based on the calculated ratio.

In accordance with an aspect of the disclosure, an electronic device may include: a memory storing instructions; and a processor configured to execute the instructions to: receive at least one image; segregate the at least one image into at least one region, based on a requested noise reduction level; and denoise the at least one image by varying at least one control feature of the segregated at least one region of the at least one image by a neural network to achieve the requested noise reduction level.

The processor may be further configured to segregate the at least one image into the at least one region based on at least one of a gesture input performed by a user on the at least one image, a frequency analysis performed on the at least one image, or saturation information of the at least one image.

The processor may be further configured to: train the neural network using a plurality of training image samples including noise characteristics and a ground truth image sample; and denoise the at least one image using the trained neural network.

The processor may be further configured to: extract contextual information of the at least one image, wherein the contextual information includes at least one of a user touch input, face detection, scene analysis, sensor metadata, or a user manual control; create an alpha map for the at least one image based on the contextual information of the at least one image; generate the at least one control feature based on the alpha map or the at least one initial control feature that has been obtain while training the neural network; and generate an output image by varying the at least one control feature using the trained neural network.

In accordance with an aspect of the disclosure, a non-transitory computer-readable storage medium may store a program that is executable by a computer to perform an image processing method. The image processing method may include: receiving an input image; generating an initial alpha map based on scene features extracted from the input image, wherein the scene features includes at least of a noise distribution or a brightness level of the input image; generating a plurality of intermediate alpha maps based on contextual information of the input image, wherein the contextual information includes at least one of a user input that enters with regard to the input image, an object detected from the input image, or image sensor metadata of the input image; combining the initial alpha map with the plurality of intermediate alpha maps to obtain a final alpha map of the input image, and inputting the final alpha map to a neural network to reduce noise level of the input image.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4C is an example table depicting values of the initial control features with respect to different values of sensor metadata of media data samples, according to embodiments of the disclosure;

FIG. 5E is an example table depicting the updated control features generated for the different values of the sensor metadata of the input image, the values of alpha parameter, and the initial control features, according to embodiments of the disclosure;

FIGS. 7A, 7B, 7C, and 7D depict generation and tuning of a sensor profile LUT, according to embodiments of the disclosure;

FIGS. 9A, 9B, and 9C depict a factory profile LUT, a custom profile LUT, and a user profile LUT respectively, according to embodiments of the disclosure;

FIG. 10B depicts the crowd source profile LUT, according to embodiments of the disclosure;

FIGS. 14A, 14B, 14C, and 14D are example diagrams depicting denoising the media data using the alpha map with different values, according to embodiments of the disclosure;

FIG. 17B depicts outputs of denoising process according to an embodiment of the disclosure;

FIG. 19 depicts example diagrams depicting denoising the media data, according to embodiments of the disclosure;

FIG. 24 is an example diagram depicting denoising the media data based on the user preferences, according to embodiments of the disclosure.

DETAILED DESCRIPTION

Figure 1:
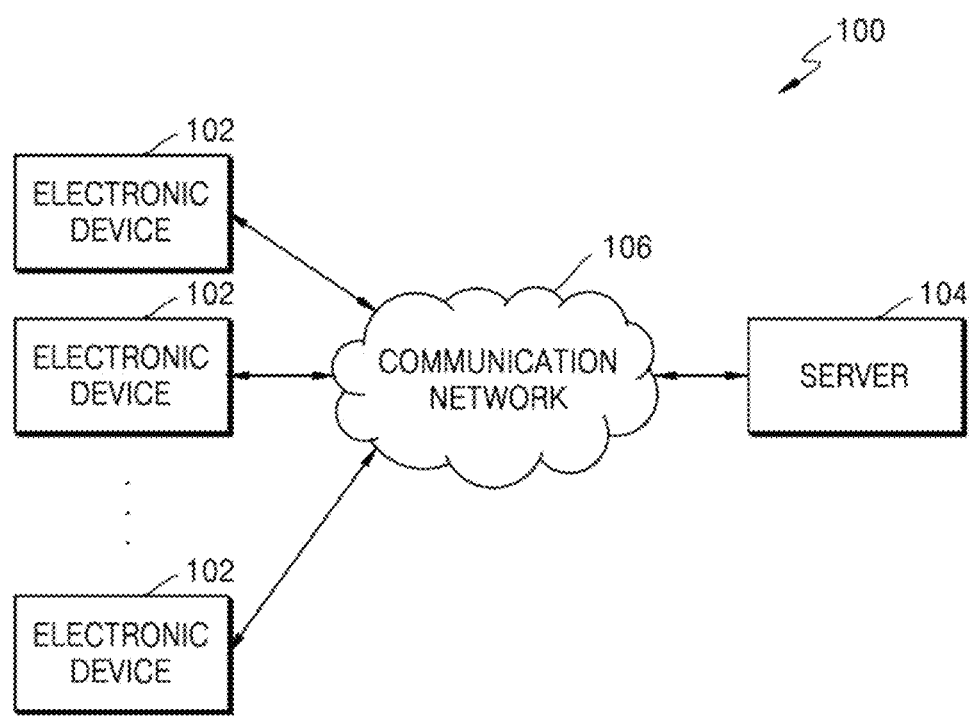
FIG. 1 depicts a denoising system, according to embodiments of the disclosure.

Embodiments of the disclosure are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

While such terms as "first," "second," etc., may be used to describe various elements, such elements must not be limited to the above terms. The above terms may be used only to distinguish one element from another.

Embodiments of the disclosure herein disclose methods and systems for denoising media data using contextual information of the media data, while considering noise characteristics and details present in the media data.

Embodiments of the disclosure herein use the terms such as "noisy characteristics", "noisy data", "noise", and so on, interchangeably through the document.

Embodiments of the disclosure herein use the terms such as "details", "details tradeoff", "details tuning", and so on, interchangeably through the document.

Embodiments of the disclosure herein use the terms such as "contextual information", "object context", "scene context", and so on, interchangeably through the document.

The term "media data" may refer to an image, an image frame, a sequence of image frames, or a video.

FIG. 1 depicts a denoising system 100, according to embodiments of the disclosure.

The denoising system 100 includes one or more electronic devices 102, and a server 104. The one or more electronic device 102 and the server 104 may be connected with each other using a communication network 106. The communication network 106 may include at least one of, but is not limited to, a wired network, a value added network, a wireless network, a satellite network, or a combination thereof. Examples of the wired network may be, but are not limited to, a Local Area Network (LAN), a Wide Area Network (WAN), an Ethernet, and so on. Examples of the wireless network may be, but are not limited to, a cellular network, a wireless LAN (Wi-Fi), Bluetooth, Bluetooth low energy, Zigbee, Wi-Fi Direct (WFD), Ultra-wideband (UWB), infrared data association (IrDA), near field communication (NFC), and so on.

The electronic device 102 may be any digital device that is capable of capturing and/or storing media data. Examples of the electronic device 102 may be, but are not limited to, a mobile phone, a smartphone, a tablet, a phablet, a personal digital assistant (PDA), a laptop, a computer, a wearable computing device, a vehicle infotainment device, a camera, an Internet of Things (IoT) device, a Virtual Reality (VR) device, or any other device that may capture and/or store the media data. Examples of the media data may be, but are not limited to, images, videos, Graphics Interchange Formats (GIFs), and so on.

The electronic device 102 may be configured to process the media data to reduce noise (hereinafter referred to as denoising the media data), while preserving (or retaining) noise characteristics and details in the media data. In an example, the details of the media data may include at least one of, but is not limited to, sharpness, texture, smoothness, contrast, and so on of the media data. In an example, the media data may be low light noisy media data that is captured in low light conditions. In other examples, the media data may be media data captured with a high exposure time, slow motion media data, media data captured indoors, blurry media data, and so on.

Figure 3:
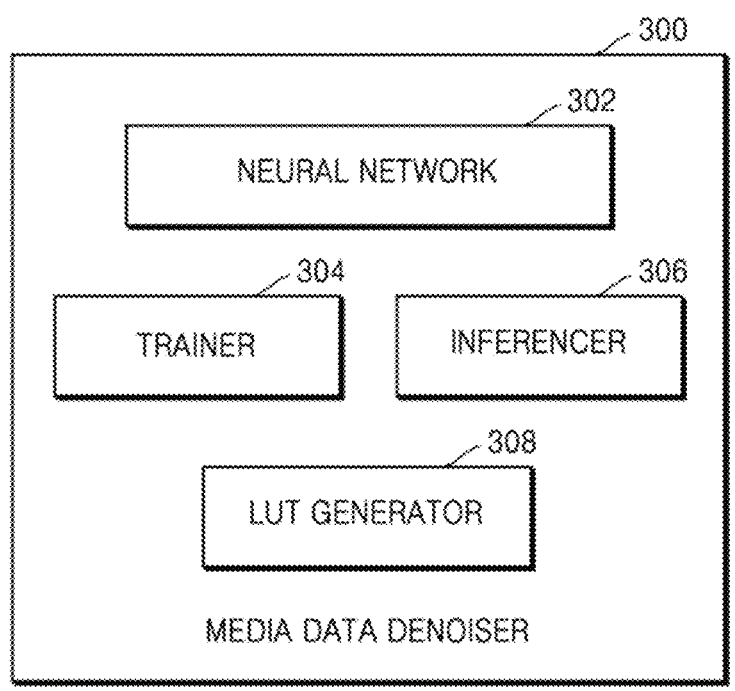
FIG. 3 depicts a media data denoiser included in the electronic device for denoising the media data, according to embodiments of the disclosure.

In an embodiment of the disclosure, the electronic device 102 trains a neural network 302 (as depicted in FIG. 3) using training media data samples at a training phase and uses the trained neural network 302 to denoise the media data at an inference phase. In another embodiment of the disclosure, the electronic device 102 receives the trained neural network 302 from the server 104 and uses the trained neural network 302 to denoise the media data.

Examples of the neural network 302 may be, but are not limited to, a machine learning network, a convolutional neural network (CNN), a deep neural network (DNN), a recurrent neural network (RNN), a restricted Boltzmann Machine (RBM), a deep belief network (DBN), a bidirectional recurrent deep neural network (BRDNN), generative adversarial networks (GAN), a deep Q-networks, an Artificial Intelligence (AI) model, a regression based neural network, an UNet model, and so on. The neural network 302 includes a plurality of nodes, which may be arranged in layers. Examples of the layers may be, but are not limited to, a convolutional layer, an activation layer, an average pool layer, a max pool layer, a concatenated layer, a dropout layer, a fully connected layer, a SoftMax layer, and so on. A topology of the layers of the neural network 302 may vary based on the type of the neural network 302. In an example, the neural network 302 may include an input layer, an output layer, and a hidden layer. The input layer receives an input (for example: training media data samples or the media data) and forwards the received input to the hidden layer. The hidden layer transforms the input received from the input layer into a representation, which may be used for generating the output in the output layer. The hidden layers extract useful low level features from the input, introduce non-linearity in the network and reduce a feature dimension to make the features equivariant to scale and translation. The nodes of the layers may be fully connected via edges to the nodes in adjacent layers. The input received at the nodes of the input layer may be propagated to the nodes of the output layer via an activation function that calculates the states of the nodes of each successive layer in the network based on coefficients/weights respectively associated with each of the edges connecting the layers.

At the training phase, the electronic device 102 uses a data augmentation to train the neural network. In accordance with the data augmentation, synthetic data is generated from the training media data samples to mimic a variety of inference-time scenarios. For training the neural network, the electronic device 102 collects the training media data samples. The training media data samples may include a plurality of media data that include the noise characteristics/noisy data. In an example, the electronic device 102 may fetch the plurality of previously stored media data that include the noise characteristics as the training media data samples. In another example, the electronic device 102 may receive the plurality of media data that include the noise characteristics as the training media data samples from the server 104. Each training media data sample may be captured using one or more sensors under one or more capturing conditions (such as, but not limited to, low light conditions, indoors, scenes which may result in blurry media data being captured, and so on). Examples of the sensors may be, but are not limited to, a wide array sensor, an ultra-wide sensor, a tele sensor, a macro sensor, and so on. Examples of the capturing conditions may be, but are not limited to, static conditions, motion and blur, and so on.

On collecting the training media data samples, the electronic device 102 extracts one or more features from each training media data sample. The extracted features may contribute to the noise in the media data. Examples of the features may be, but are not limited to, noise distribution, lighting levels, sensor metadata, or any other features that characterize the noise in the training media data sample. Examples of the sensor metadata may be, but are not limited to, ISO, exposure time (ET), shutter speed, and so on.

The electronic device 102 derives initial control features for each training media data sample, by encoding the features extracted from each training media data sample using one or more filters. Examples of the filters may be, but are not limited to, a high pass filter, a Laplacian filter, and so on. An example of the initial control feature may be an estimate of the noise obtained from feature extraction and sensor metadata. The initial control feature may be updated in runtime to obtain updated control features, based on user input, face detection, scene analysis, manual control, and so on. The user input corresponds to a gesture performed by the user on one or more image regions of an image. A gesture input means a user input generated by a gesture of a user. The electronic device 102 may receive the gesture input by detecting signals generated by a gesture of a user. Examples of the gestures may be, but are not limited to, a touch input, a swipe gesture, or the like. The face detection corresponds to a number of faces detected in the image. The scene analysis corresponds to detection of one or more objects present in the image. The sensor metadata may include sensor information such as, but are not limited to, the ISO, the ET, the shutter speed, and so on. The user manual control refers to adjustment of the noise characteristics and the details in the media data manually by the user. The initial control features may include high frequency noise details. The initial control features may provide an estimate of the noise present in each training media data sample. For example, if there is more noise present in the media data, value of the initial control features may be higher or vice-versa. Noise refers to noise incurred during capturing of the media data, due to Poisson capture noise (shot noise) and sensor noise (read noise). The electronic device 102 stores the derived initial control features.

The electronic device 102 trains the neural network by feeding each training media data sample and the respective derived initial control features to the neural network 302. The neural network 302 processes the initial control features of each training media data sample and generates an output media data sample for each training media data sample. The output media data sample generated for each training media data may be the denoised training media data sample.

The electronic device 102 compares the output media data sample corresponding to each training media data sample with a ground truth media data and computes a loss function. Loss function may be a combination of at least one of pixel level losses (L1, L2, . , and so on), perceptual losses, adversarial losses, contextual losses, GAN losses, and so on. The electronic device 102 updates parameters of the neural network 302 using the computed loss function, thereby providing the trained neural network (using the training media data samples and the ground truth media data). The trained neural network 302 may be the neural network in which, a number of layers, a sequence for processing the layers and the parameters related to each layer may be known and fixed for each of the one or more tasks. Examples of the parameters related to each layer/the neural network 302 may be, but are not limited to, activation functions, biases, input weights, output weights, and so on, related to the layers of the neural network. The electronic device 102 stores the trained neural network 302 in the memory 202.

In an embodiment, the electronic device 102 may also be configured to update the trained neural network for different capturing conditions and new sensors deployed in the electronic device 102. The electronic device 102 may update the trained neural network by tuning the neural network based on training media data samples that have captured using the new sensors under the different conditions (instead of retraining the neural network 302), which improves the robustness of the trained neural network 302 in denoising the input media data.

Figure 2:
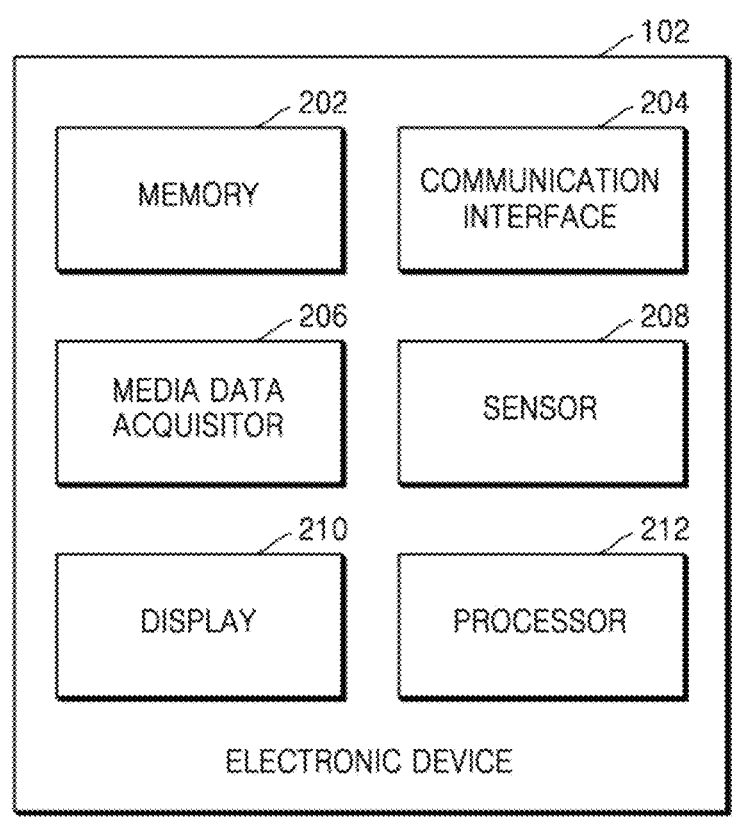
FIG. 2 is an example block diagram depicting various components of an electronic device for denoising media data, according to embodiments of the disclosure.

At the inference phase, the electronic device 102 denoises the media data using the trained neural network. The electronic device 102 receives the media data (hereinafter referred to as input media data) for denoising. In an example, the input media data may be the media data being captured or received by a media data acquisitor 206 (as depicted in FIG. 2) of the electronic device 102. In another example, the input media data may be the media data selected by a user from the stored media data. In another example, the input media data may be the media data received from the server 104. The input media data may be captured by the media data acquisitor 206 using the one or more sensors under the one or more conditions. In an example, the input media data may be low light noisy media data that is the media data captured in low light conditions.

For denoising or processing the input media data including an image, the electronic device 102 segregates the image into one or more image regions, wherein the noise characteristics to be removed or the details to be preserved. In an embodiment, the electronic device 102 segregates the input image into the one or more image regions based on the one or more gestures performed by the user on the input image. In another embodiment, the electronic device 102 segregates the input image into the one or more image regions using at least one of, but are not limited to, frequency analysis, saturation information, and so on. The image may be segregated into one or more image regions based on frequency content. For example, image regions such as sky may be classified as low frequency regions (in which pixel values change slowly over space) and regions with textures, face, and so on may be classified as high frequency regions (in which pixel values rapidly change in space). The electronic device 102 fetches the stored initial control features, which have been derived while training the neural network 302, for the input image.

The electronic device 102 also extracts contextual information from the input image. Examples of the contextual information may be, but are not limited to, the user touch input, the face detection, the scene analysis, the sensor metadata, and so on. In an example herein, considering that the contextual information is user touch input, if a user touches an image region, the corresponding object may be detected and noise for the entire object may be adjusted. In an example herein, considering that the contextual information is scene analysis, based on object segmentation, different detected objects may be given different noise/detail tradeoff levels.

On extracting the contextual information from the input image, the electronic device 102 creates an alpha map for the input image. The alpha map may be a guide providing information on how to control denoising strength of the neural network to denoise the input image. The alpha map is used to update the initial control features to form the updated control features. The updated control features are then appended to the input image. A lower value of alpha may result in low denoising and a higher value of alpha may lead to higher denoising. The created alpha map may include spatially varying denoising strength. The alpha map may be spatially varying based on the objects present in the scene, the user touch, user preferences and so on. For example, if the user touches an object and manually controls the noise level required, the alpha map is updated to enable this.

In an embodiment of the disclosure, the electronic device 102 creates a N-dimensional alpha map based on the contextual information extracted from the input image, wherein the N is a dimensionality of extracted contextual information. For creating the alpha map, the electronic device 102 generates initial maps corresponding to all the contextual information of the image. For generating the initial maps, the electronic device 102 generates a first initial map corresponding to a first contextual information by updating an initial uniform map using the first contextual information. The initial uniform map includes a uniform value of '1'. Once the first initial map is generated, the electronic device 102 recursively performs steps of, receiving a subsequent contextual information and generating a subsequent initial map corresponding to the subsequent contextual information by updating the first initial map or previous initial map using the subsequent contextual information, until the initial maps are generated for all the contextual information. Updating the initial map or initial uniform map using the contextual information includes boosting or suppressing the noise characteristics or the details at image regions in the initial map corresponding to the respective contextual information. The electronic device 102 merges all the generated initial maps. The maps may be merged using at least one of Gaussian smoothing, Laplacian Pyramids, Poisson blending, and so on. The electronic device 102 convolutes the merged initial maps using a smoothing filter to create the alpha map. In an example, the electronic device 102 uses a Gaussian smoothing filter to convolute the merged initial maps.

In another embodiment of the disclosure, the electronic device 102 uses a look-up table (LUT) to create the alpha map. In an embodiment of the disclosure, the LUT may include, at least one of, but is not limited to, a sensor profile LUT, a user profile LUT, a crowd source profile LUT, and so on. The sensor profile LUT includes a mapping of values of sensor alpha parameter or tuning values with respect to each of the sensor metadata (such as, the ISO, the ET, the shutter speed, and so on). The electronic device 102 may generate the sensor profile LUT by initializing the values of the alpha parameter to '1' for all the values of each sensor metadata. The electronic device 102 may update the sensor profile LUT by tuning the values of the alpha parameter for the values of each sensor metadata based on the media data samples (also referred to as image samples) that have been captured using different sensors under different capturing conditions for the values of each sensor metadata. Alternatively, the electronic device 102 may update the sensor profile LUT using at least one of an intra-sensor tuning and an inter-sensor tuning. The intra-sensor tuning includes updating the sensor profile LUT by tuning the alpha parameter within the sensor used to capture the image that has been selected for denoising. The inter-sensor tuning includes updating the LUT by tuning the alpha parameter with respect to the plurality of sensors used to capture the image that has been selected for denoising. Alternatively, the electronic device 102 may update the sensor profile LUT by tuning the alpha parameter, based on the noise characteristics and the details of the image that has been denoised on another electronic device. The user profile LUT includes a mapping of values of the user alpha parameter with respect to each of the contextual information or object context. The electronic device 102 may generate the user profile LUT by monitoring user interactions while denoising the at least one image. The crowd source profile LUT includes a mapping of values of a crowd source alpha parameter with respect to each of the contextual information/object context. The crowd source profile LUT may be a function of the user profile LUTs accepted by a plurality of users. The electronic device 102 may receive the crowd source profile LUT from the server 104. The generation of the LUT and updating the LUT is explained in detail in conjunction with FIGS. 6-11.

The electronic device 102 fetches the value of the alpha parameter (i.e., the sensor alpha parameter or the user profile alpha parameter or the crowd source profile alpha parameter) from the LUT (i.e., the sensor profile LUT, or the user profile LUT or the crowd source profile LUT), for the contextual information of the input image. The value of the alpha parameter may depict the denoising strength. The alpha parameter may range from 0-2. In an example, a higher value of the alpha parameter depicts higher denoising and a lower value of the alpha parameter depicts less denoising (hence more detail retention). Considering that the alpha parameter ranges from 0-2, low value refers to parameters in the range 0-1 and high value refer to parameters in the range 1-2. The electronic device 102 creates the alpha map using the fetched alpha parameter/tuning value.

Once the alpha map is generated for the input image, the electronic device 102 generates the updated control features for the input image. The electronic device 102 generates the updated control features by multiplying the alpha map with the initial control features to amplify or suppress intensity of the initial control features in a spatially varying manner. Intensity refers to the value at each pixel of the control features. The suppressed or amplified initial control features may be the updated control features. The updated control features lie in the same subspace as that of the initial control features that the trained neural network 302 is already known.

The electronic device 102 provides the input image with segregated one or more image regions and the updated control features generated for the input image to the trained neural network 302. In an example herein, the electronic device 102 may provide the input image and the updated control features to an input tensor of the trained neural network in four channels. The updated control features control the denoising strength of the trained neural network 302.

The trained neural network 302 processes the input image based on the updated control features and generates an output image corresponding to the input image. Processing of the input image includes denoising the segregated one or more image regions of the input image by spatially varying or controlling the updated control features across the segregated one or more image regions in the input image. The output image generated for the input image includes the denoised one or more image regions of the input image.

The electronic device 102 processes the output image generated by the trained neural network 302 and provides the processed output image to the user.

In an embodiment of the disclosure, the electronic device 102 may be configured to receive the input image for denoising and provide at least one of a factory profile media data, a sensor based output media data, a user profile media data, and a crowd source profile media data to the user, at a time, as the denoised output image to the user. The factory profile media data may be the output image generated by denoising the input image using the alpha map created based on a factory profile LUT. The factory profile LUT may be an LUT defined by media data analyzing experts. The factory profile LUT includes a mapping of values of a factory alpha parameter with respect to the contextual information of the media data samples. In an example, the values of the factory alpha parameter may be initialized to '1'. The factory profile LUT may not be edited by the users. The sensor based output media data may be the output image generated by denoising the input image using the alpha map created based on the sensor profile LUT. The user profile media data may be the output image generated by denoising the input image using the alpha map created based on the user profile LUT. The crowd source profile media data may be the output media data generated by denoising the input media data using the alpha map created based on the crowd source profile LUT.

The electronic device 102 allows the user to select one of the factory profile media data, the sensor based output media data, the user profile media data, and the crowd source profile media data as the denoised output image for the input image. The electronic device 102 stores the user selected output image and the associated input image (unprocessed media data).

In an embodiment of the disclosure, the electronic device 102 allows the user to select the stored denoised output image for further denoising or processing. In such a scenario, the electronic device 102 may provide a manual control option (for example: in a form of a manual slider control button) to the user to manually adjust the noise characteristics and the details of the output image.

The server 104 referred herein may be at least one of, but is not limited to, a cloud computing device (can be a part of a public cloud or a private cloud), a standalone server, a server on a cloud, a database, a computing device, and so on. The computing device may be, but is not limited to, a personal computer, a notebook, a tablet, desktop computer, a laptop, a handheld device, a mobile device, and so on. Also, the external entity 104 may be at least one of a microprocessor, a processor, a System on Chip (SoC), an integrated chip (IC), a microprocessor based programmable consumer electronic device, and so on.

The server 104 may be configured to train the neural network 302 for denoising the media data using the training media data samples and the ground truth media data samples. The server 104 may communicate the trained neural network 302 to the electronic device 102. The server 104 may train the neural network 302 for denoising the media data, similar to the electronic device 102, and thus a repeated description thereof is omitted for conciseness.

The server 104 may also be configured to generate the crowd source profile LUT. For generating the crowd source profile LUT, the server 104 receives the user profile LUTs of the plurality of users from the respective plurality of electronic devices 102. The crowd source profile generates the crowd source profile LUT based on the user profile LUT of each user and a weight of each user. The server 104 may store the weight of each user. The server 104 may set the weight of each user to '1' initially. The server 104 communicates the crowd source profile to the plurality of electronic devices 102 of the plurality of users and receives usage statistics from the plurality of electronic devices 102. The server 104 may or may not receive the usage statistics from all the plurality of electronic devices 102 for which the crowd source profile LUT has been communicated. The usage statistics depicts a selection of at least one of the sensor profile LUT, the user profile LUT, the crowd source profile LUT, and the factory profile LUT, by the user for denoising the media data.

The server 104 computes a preference score for the crowd source profile LUT, based on the usage statistics of each user. The preference score shows how many people like the current crowd sourced profile. The server 104 then updates the weight of each user based on the preference score computed for the crowd source profile LUT. The server 102 stores the updated weight of each user and uses the updated weight of each user for the subsequent generation or updating of the crowd source profile LUT.

FIG. 1 shows the denoising system 100, but it is to be understood that other embodiments are not limited thereon. In other embodiments, the denoising system 100 may include less or more number of blocks. Further, the labels or names of the blocks are used only for illustrative purposes and do not limit the scope of the embodiments herein. One or more blocks can be combined together to perform the same or substantially the same function in the denoising system 100.

FIG. 2 is an example block diagram depicting various components of the electronic device 102 for denoising the media data, according to embodiments of the disclosure. The electronic device 102 includes a memory 202, a communication interface 204, the media data acquisitor 206, a sensor 208, a display 210, and a processor 212.

The memory 202 may store at least one of, but is not limited to, the media data, the training media data samples, the alpha map, the LUT, the factory profile LUT, the initial and updated control features, the output media data generated for the input media data, and so on. The memory 202 may also store a media data denoiser 300, which may be processed or executed by the processor 212 to denoise the media data. The memory 202 referred herein may include at least one type of storage medium, from among a flash memory type storage medium, a hard disk type storage medium, a multi-media card micro type storage medium, a card type memory (for example, an SD or an XD memory), random-access memory (RAM), static RAM (SRAM), read-only memory (ROM), electrically erasable programmable ROM (EEPROM), programmable ROM (PROM), a magnetic memory, a magnetic disk, or an optical disk.

The communication interface 204 may include one or more components in which the electronic device 102 communicates with another device (for example: another electronic device, the server 104, and so on) using data communication methods that have been supported by the communication network 106. Examples of the one or more components may be, but are not limited to, a wired communicator, a short-range communicator, a mobile/wireless communicator, a broadcasting receiver, and so on.

The media data acquisitor 206 may be configured to capture the media data. Examples of the media data acquisitor 206 may be, but are not limited to, a camera, a scanner, one or more imaging sensors, a digital camera, a thermal camera, an ultraviolet (UV) camera, a multispectral camera, and so on. Alternatively, the electronic device 102 may be coupled with an external media data acquisitor through the communication interface 204.

The sensor 208 may include one or more sensors, which may be used by the media data acquisitor 206 to capture the media data. Examples of the sensors may be, but are not limited to, a wide array sensor, an ultra-wide sensor, a tele sensor, a macro sensor, and so on. A function of each sensor may be intuitively inferred by one of ordinary skill in the art based on its name or type, and thus, its detailed description is omitted.

The display 210 may be configured to enable the user to interact with the electronic device 102. The display 210 may enable the user to select the media data for processing or denoising. The display 210 may also receive the output media data generated by the processor 212 for the input media data and display the output media data to the user.

The processor 212 may include a single processer, a plurality of processors, multiple homogeneous or heterogeneous cores, multiple Central Processing Units (CPUs) of different kinds, microprocessors, special media data, and other accelerators. The one or a plurality of processors may be a general-purpose processor, a graphics-only processing unit, an image processing unit, a neural network processing unit, and so on. Examples of the general-purpose processor may be, but are not limited to, a central processing unit (CPU), an application processor (AP), and so on. Examples of the graphics-only processing unit may be, but are not limited to, a graphic processing unit (GPU), a visual processing unit (VPU), and so on. Examples of the image processing unit may be, but are not limited to, an image signal processor (ISP), or the like. Examples of the neural network processing unit may be, but are not limited to, an Artificial Intelligence (AI)-dedicated processor, a neural processing unit (NPU), and so on. The processor 212 may process or execute the media data denoiser 300 for denoising the media data.

The processor 212 may be configured to train the neural network 302 using the training media data samples and the ground truth media data samples. For training the neural network, the processor 212 extracts the features from each training media data sample, which characterizes the noise. The processor 212 encodes the features using at least one of the Laplacian filter, the high pass filter, or the like and generates the initial control features for each training media data sample. The processor 212 stores the generated initial control features in the memory 202. The processor 212 feeds the generated initial control features of each training media data sample to the neural network 302, which processes the initial control features of each training media data sample and generates the output media data sample for each training media data sample. The processor 212 compares each output media data sample with the respective ground truth media data sample and computes the loss function. The processor 212 updates the parameters of the neural network based on the loss function to generate the subsequent output media data samples, thereby providing the trained neural network 302. The processor 212 stores the trained neural network 302 in the memory 202. The processor 212 may also tune the trained neural network for the training media data samples that have been captured using new sensors under different conditions.

The processor 212 may also be configured to receive the input media data and denoise the input media data, while retaining the details in the input media data. Upon receiving the input media data, the processor 212 segregates the one or more image regions in the input media data based on the extent of denoising to be carried out (e.g., a noise reduction level requested by a user).

The processor 212 further extracts the contextual information from the input media data, fetches the initial control features generated for the training media data sample(s), while training the neural network from the memory 202, and creates the alpha map for the input media data. In an embodiment of the disclosure, the processor 212 creates the alpha map using the contextual information extracted from the input media data. In another embodiment of the disclosure, the processor 212 creates the alpha map using the LUT.

Upon creating the alpha map, the processor 212 generates the updated control features for the input media data. The processor 212 convolutes the created alpha map with the initial control features to generate the updated control features. The updated control features may be the initial control features with the amplified or suppressed intensity. The processor 212 provides the input media data with the segregated one or more image regions and the updated control features to the trained neural network 302, which varies the updated control features across the segregated one or more image regions in the input media data and generates the output media data corresponding to the input media data. The output media data includes the denoised one or more image regions of the input media data.

According to an embodiment of the disclosure, the electronic device 102 may include the memory 202 and the processor 212. The processor 212 may be coupled to the memory 202. The processor 212 may receive at least one input media data, segregate the at least one input media data into at least one image region, based on an extent of denoising to be carried out (e.g., a requested noise reduction level), and denoise the at least one input media data by varying at least one updated control feature of the at least one input media data across the segregated at least one image region to adjust the extent of denoising by a neural network with respect to the segregated at least one image region.

FIG. 3 depicts the media data denoiser 300 performable in the electronic device 102 for denoising the media data, according to embodiments of the disclosure as disclosed herein. The media data denoiser 300 includes the neural network 302, a trainer 304, an inferencer 306, and a LUT generator 308.

The neural network 302 may include a plurality of neural network layers. Each layer has a plurality of weight values and performs a layer operation through calculation of a previous layer and an operation of a plurality of weights or coefficients. Examples of the neural networks include at least one of, but is not limited to, a convolutional neural network (CNN), a deep neural network (DNN), a recurrent neural network (RNN), a restricted Boltzmann Machine (RBM), a deep belief network (DBN), a bidirectional recurrent deep neural network (BRDNN), generative adversarial networks (GAN), a regression based neural network, a deep Q-network, and so on.

The neural network 302 may be trained using at least one learning method to denoise the media data. Examples of the learning method may be, but are not limited to, supervised learning, unsupervised learning, semi-supervised learning, reinforcement learning, regression-based learning, and so on. A function associated with the learning method may be performed through the non-volatile memory, the volatile memory, and the processor 212.

The processor 212 may include one or a plurality of processors. At this time, one or a plurality of processors may be a general-purpose processor, such as a central processing unit (CPU), an application processor (AP), or the like, a graphics-only processing unit such as a graphics processing unit (GPU), a visual processing unit (VPU), and/or an Artificial Intelligence (AI)-dedicated processor such as a neural processing unit (NPU).

The one or a plurality of processors may denoise the media data or process the media data to reduce the noise, in accordance with a predefined operating rule of the neural network 302 stored in the non-volatile memory and the volatile memory. The predefined operating rules of the neural network are provided through training the neural network 302 using the learning method.

Here, being provided through learning means that, by applying the learning method to a plurality of learning data (for example: the training media data samples), a predefined operating rule or AI model of a desired characteristic is made. The denoising of the media data may be performed in the electronic device 102 itself in which the learning according to an embodiment of the disclosure is performed, and/or may be implemented through a separate server/system (for example: the server 104).

The trainer 304 may be configured to train the neural network using the initial control features of each of the training media data samples to denoise the media data samples. The trainer 302 may be explained in detail in conjunction with FIGS. 4A, 4B, and 4C.

The inferencer 306 may be configured to denoise the given input media data using the trained neural network 302.

For denoising the given input media data, the inferencer 306 creates the alpha map and generates the updated control features for the input media data based on the alpha map and the contextual information of the input media data. The inferencer 306 varies the updated control features across the one or more image regions in the input media data using the trained neural network 302 and generates the output media data corresponding to the input media data. The output media data may be the denoised input media data. The inferencer 306 is explained in detail in conjunction with FIGS. 5A, 5B, 5C, 5D, and 5E.

The LUT generator 308 may be configured to generate the LUT and dynamically vary/update the LUT based on denoising of each media data. The LUT generator 308 is explained in detail in conjunction with FIGS. 6-11.

Figure 4A:
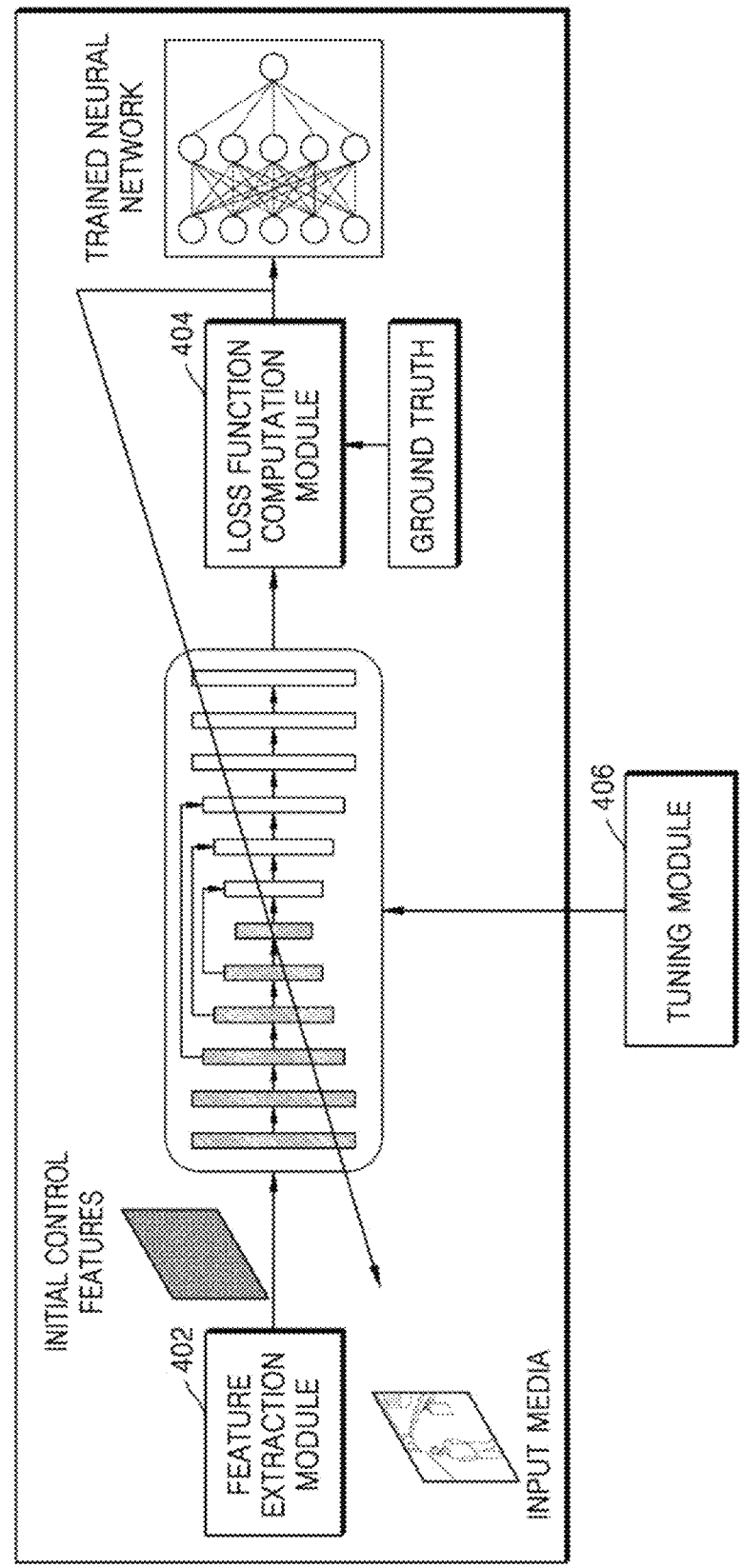
FIG. 4A depicts a trainer performable in the electronic device for training a neural network, according to embodiments of the disclosure.
Figure 4B:
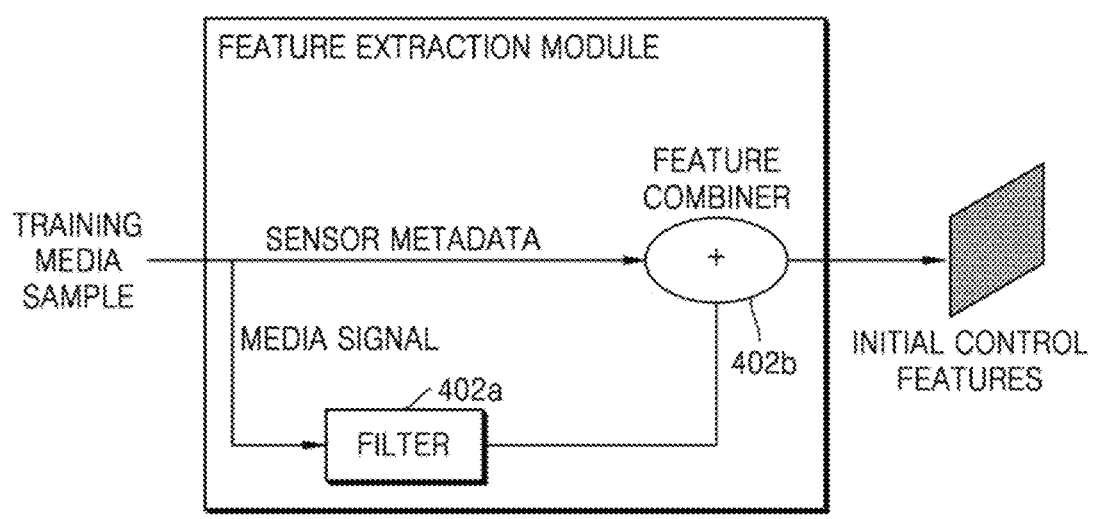
FIG. 4B depicts a feature extraction module of the trainer configured to extract initial control features from each training media data sample, according to embodiments.

FIG. 4A depicts the trainer 304 performable in the electronic device 102 for training the neural network 302, according to embodiments of the disclosure. FIG. 4B depicts a feature extraction module of the trainer configured to extract initial control features from each training media data sample, according to embodiments of the disclosure. FIG. 4C is an example table depicting values of the initial control features with respect to different values of sensor metadata of media data samples, according to embodiments of the disclosure.

The trainer 304 may be configured to train the neural network 302 using the training media data samples that have been captured using the one or more sensors under the one or more capturing conditions (for example: static conditions), and the ground truth media data. In an example, the trainer 304 may use 1000 training media data samples for training the neural network. The trainer 304 includes a feature extraction module 402, a loss computation module 404, and a tuning module 406.

The feature extraction module 402 may be configured to generate the initial control features for training the neural network 302. The feature extraction module 402 is depicted in FIG. 4B. As depicted in FIG. 4B, the feature extraction module 402 collects the training media data samples. The feature extraction module 402 fetches the set of media data stored in the memory 302 that characterizes the noise as the training media data samples. Alternatively, the feature extraction module 402 collects the training media data samples from the server 104. The training media data samples may be captured by the media data acquisitor 206 or the external media data acquisitor using the one or more sensors under the one or more capturing conditions.

Upon receiving the training media data samples, the feature extraction module 402 extracts the features from each training media data sample. The extracted features may characterize the noise in the training media data sample. Examples of the features may be, but are not limited to, the noise distribution, the lighting levels, the sensor metadata, and so on. The feature extraction module 402 passes the features such as, the noise distribution, the lighting levels, and so on, of each training media data sample to the at least one filter 402a. Examples of the filter 402a may be, but are not limited to, the high pass filter, the Laplacian filter, and so on. The filter 402a provides an output depicting the one or more image regions in the media data of having rapid intensity change. The feature extraction module 402 provides the output of the filter and the sensor metadata corresponding to each training media data sample to a feature combiner 402b. The feature combiner 402b generates the initial control features corresponding to each training media data sample by analyzing the output of the filter 402a and the feature combiner 402b. In an example, the feature combiner 402b may generate the value of the initial control feature with respect to the sensor metadata such as, the ISO, and the ET, using the below equation:

$$\text{Initial control feature} = \text{MIN}\left(\frac{ISO*k}{ET}, 2\right)$$

wherein, 'k' represents a normalizing value, and the value of the initial control feature ranges between '0' and '2', with '0' being the lowest denoising and '2' being the highest level of denoising. In an example, the values of the initial control features generated for the different values of the ISO, and the ET is depicted in a table of FIG. 4C.

The feature extraction module 402 stores the values of the initial control features with respect to the different values of the sensor metadata in the memory 202.

The feature extraction module 402 provides the generated initial control features corresponding to each training media data sample to the neural network 302 for training. The neural network 302 processes the initial control features corresponding to each training media data sample and generates the output media data sample for each training media data sample. The output media data sample may be the respective denoised training media data sample.

The loss computation module 404 may be configured to analyze each output media data sample generated by the neural network with the respective ground truth media data sample and computes the loss function. The loss computation module 404 updates the parameters of the neural network 302 based on the loss function to generate the output media data samples for the subsequent training media data samples, thereby providing the trained neural network 302. The loss computation module 404 stores the trained neural network 302 in the memory 202.

The tuning module 406 may be configured to adapt the trained neural network 302 to different sensors and capturing conditions or scenarios by tuning or updating the trained neural network rather than retraining the neural network 302. The different sensors may be the sensors that have not been used for capturing the training media data samples used for training the neural network and the different capturing conditions may be conditions under which the training media data samples used for training the neural network have not been captured. The tuning module 406 may tune the trained neural network 302 using training media data samples that have been captured under the different capturing conditions and without using the ground truth media data. In an example, the different capturing conditions may depict at least one of, but is not limited to, scenes with motion and blur, and so on. Thus, tuning the trained neural network is time efficient as well as robust to handle the conditions such as, the motion and blur, as compared to retraining the neural network based on the training media data samples captured using the different sensors. In addition, the tuning of the trained neural network using the training media data samples captured under the different capturing conditions requires a less number of training samples, compared to retaining of the neural network. In an example, the tuning module 406 may use around 25 training media data samples for tuning the trained neural network to adapt to the different sensors and capturing conditions.

Figure 5A:
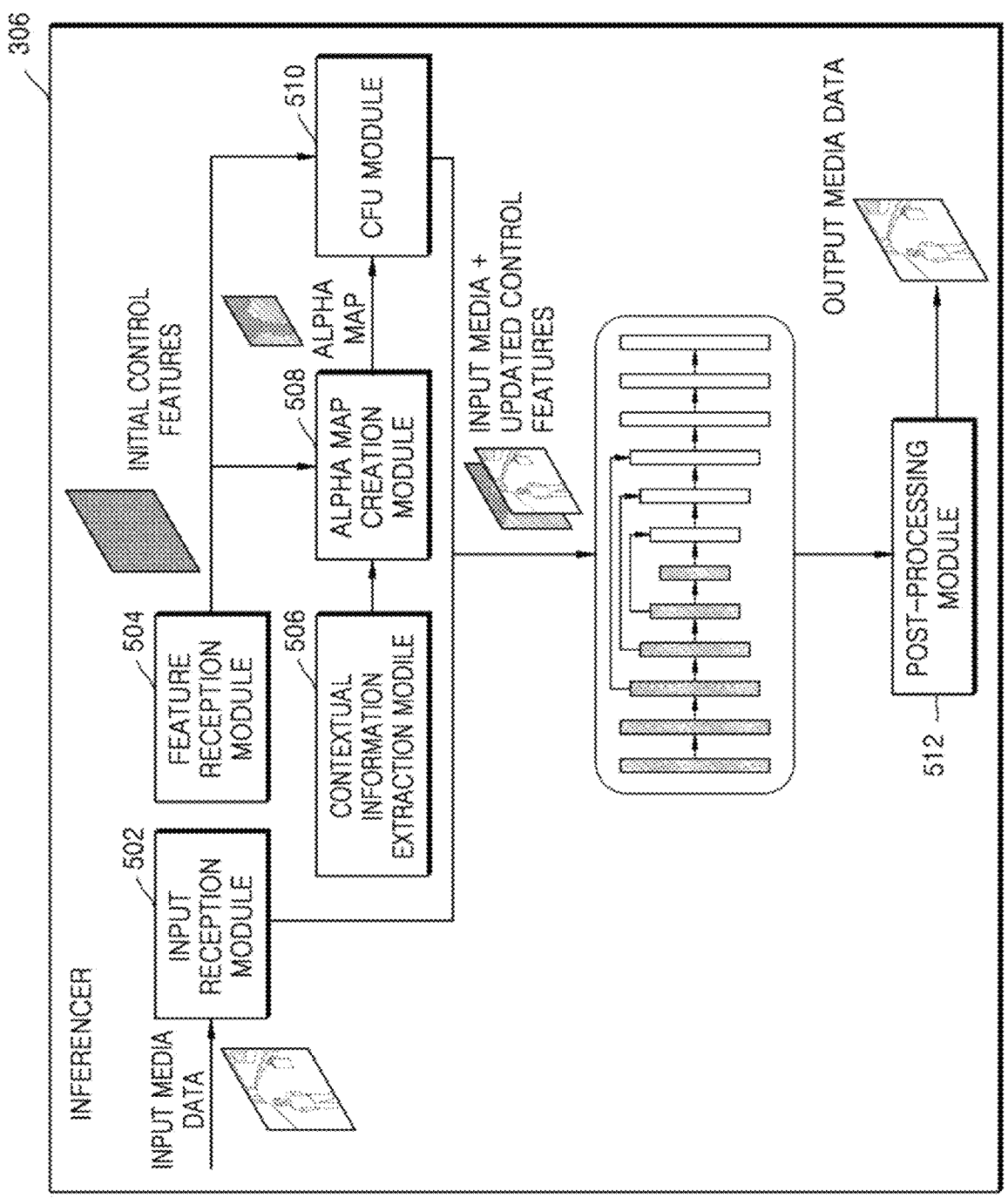
FIG. 5A depicts an inferencer performable in the electronic device for denoising an input image using the trained neural network, according to embodiments of the disclosure.

FIG. 5A depicts the inferencer 306 performable in the electronic device 106 for denoising the input media data using the trained neural network 302, according to embodiments of the disclosure. The inferencer 306 includes an input reception module 502, a feature reception module 504, a contextual information extraction module 506, an alpha map creation module 508, a control feature updating (CFU) module 510, and a post-processing module 512.

The input reception module 502 may be configured to receive the input media data for processing or denoising. In an example, the input media data may be the media data stored in the memory 202 and selected by the user for denoising. In another example, the input media data may be the media data being captured by the media data acquisitor 206 using the one or more sensors under the one or more capturing conditions. In another example, the input media data may be the media data received from the server 104 for denoising. The input reception module 502 may be further configured to segregate the one or more image regions in the input media data, based on the extent of denoising to be carried out. In an example, the input reception module 502 may segregate the one or more image regions in the input media data based on the gestures performed by the user on the input media data. In another example, the input reception module 502 may segregate the one or more image regions in the input media data based on the frequency analysis and the saturation information.

The feature reception module 504 may be configured to fetch the initial control features stored in the memory 202 for the received input media data, wherein the initial control features have been generated while training the neural network 302. The feature reception module 504 provides the initial control features fetched for the input media data to the CFU module 510.

The contextual information extraction module 506 may be configured to extract the contextual information from the input media data. Examples of the contextual information may be, but are not limited to, the user touch input, the face detection, the scene analysis, the sensor metadata, and so on. The contextual information extraction module 506 provides the contextual information of the input media data to the alpha creation module 508.

The alpha map creation module 508 may be configured to create the alpha map based on at least one of the contextual information of the input media data and the LUT.

Figure 5B:
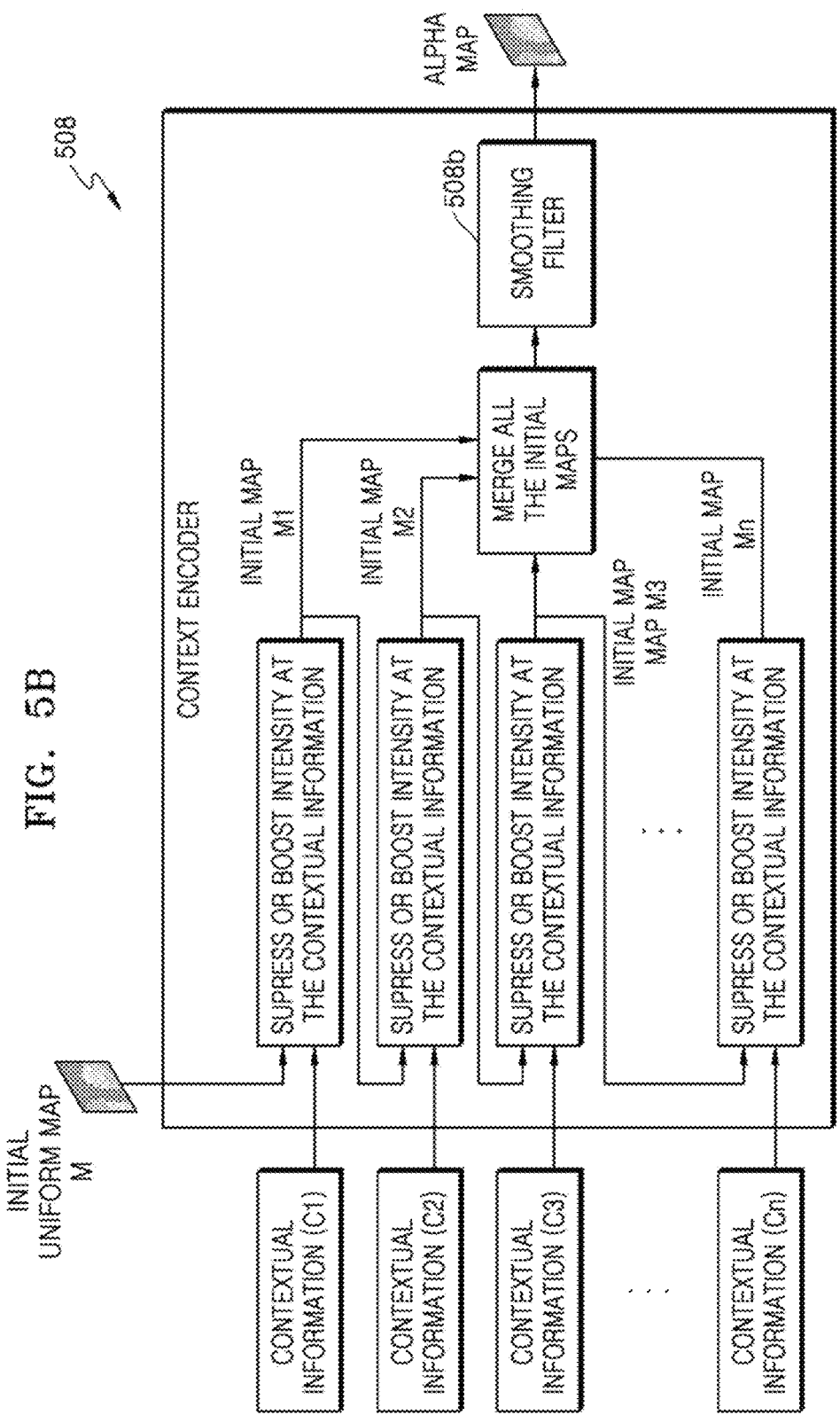
FIGS. 5B and 5C depict a context encoder of the inferencer configured to create an alpha map based on contextual information of the input image, according to embodiments of the disclosure.
Figure 5C:
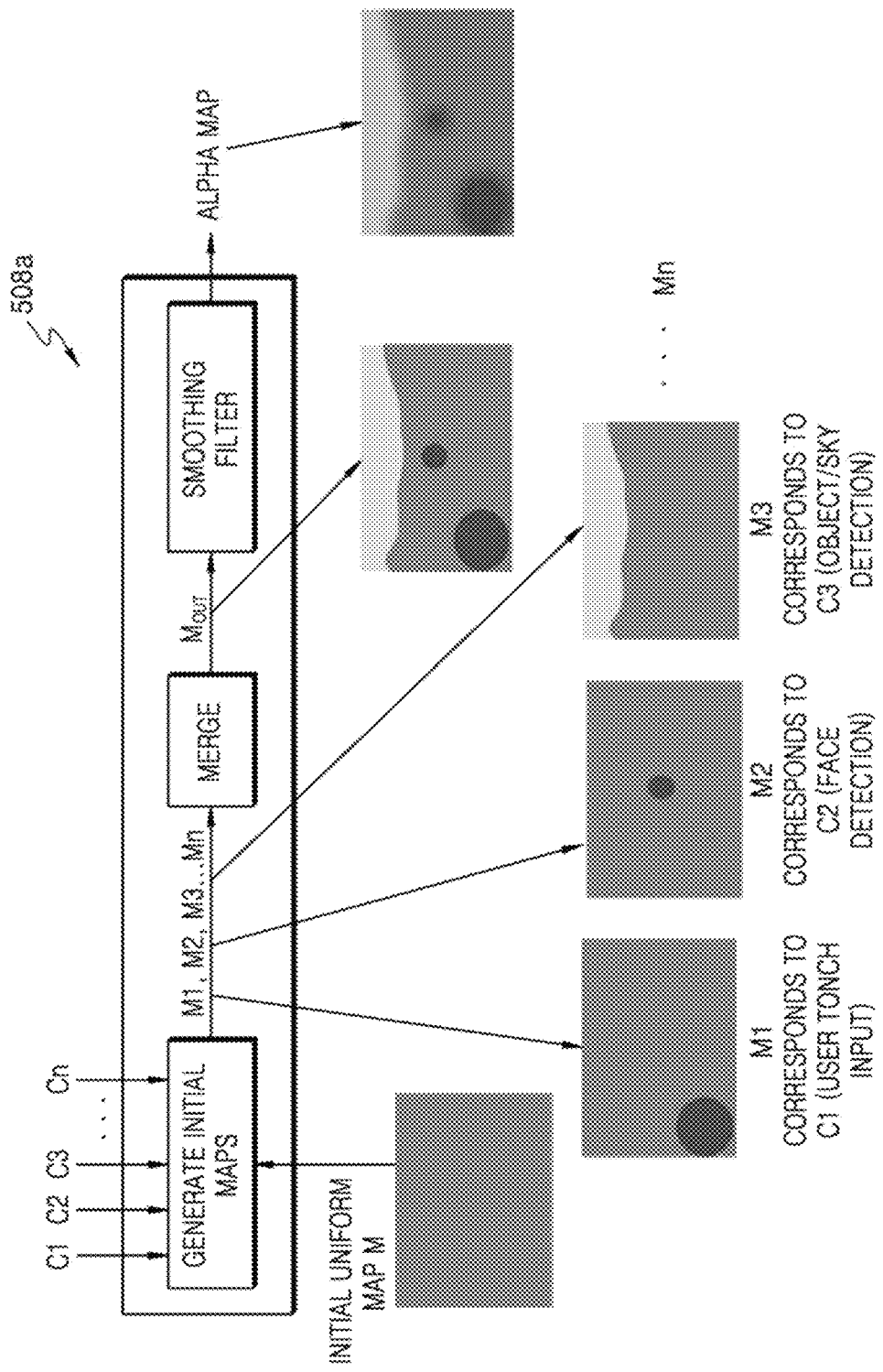

FIGS. 5B and 5C depict a context encoder of the inferencer configured to create an alpha map based on contextual information of the input media data, according to embodiments of the disclosure.

In an embodiment of the disclosure, the alpha map creation module 508 uses a context encoder 508a to create the alpha map, as depicted in FIG. 5B. The context encoder 508a may be configured to create the alpha map based on the contextual information. For creating the alpha map, the context encoder 508a receives the initial uniform map and the first contextual information input from the contextual information extraction module 506. The context encoder 508a generates the initial map corresponding to the first contextual information by modifying or updating the initial uniform map based on the first contextual information. The context encoder 508a recursively performs steps of receiving the subsequent contextual information input and generating the initial map for the received subsequent contextual information by updating the previous initial map based on the received subsequent contextual information input, until generating the initial maps for all the contextual information. Updating the initial map (i.e., the initial uniform map or the previous initial map) based on the (first or subsequent) contextual information input includes suppressing the intensity at the contextual information input in the initial map or boosting (or amplifying) the intensity at the contextual information input in the initial map.

Consider an example scenario, as depicted in FIG. 5C, wherein the context encoder 508a receives an initial uniform map M including a uniform value of 1 and details of a first contextual information (the user touch input). The details of the first contextual information may include at least one of, but is not limited to, coordinates of the user touch input on the input media data, and so on. In such a scenario, the context encoder 508a sets the values corresponding to a circular region centered around the user touch input in the initial map M to a value x<1 (i.e., suppressing the intensity at the user touch point), wherein 'x' may be chosen as 0.5 by the context encoder 508a as default. The context encoder 508a also chooses an area of the circular region as 10% of a total area of the input media data. The context encoder 508a labels the updated initial uniform map M as the initial map M1 corresponding to the first contextual information.

On generating the initial map M1, the context encoder 508a receives details of a second contextual information from the contextual information extraction module 506. The details may depict face regions detected in the input media data (e.g., an input image). The context encoder 508a sets the face regions in the initial map M1 to a value x<1 (i.e., suppressing the intensity at the face regions), wherein 'x' may be chosen as 0.5 by the context encoder 508a as default, since the details have to be preserved in the face regions. The context encoder 508 labels the updated initial map M1 as the initial map M2 corresponding to the second contextual information.

On generating the initial map M2, the context encoder 508a receives details of a third contextual information from the contextual information extraction module 506. In an example, the details of the third contextual information may depict sky regions detected using the frequency analysis and saturation information. On receiving the details of the third contextual information, the context encoder 508a sets the value of the initial map M2 to a value of x>1 (i.e., boosting the intensity at the sky regions), wherein 'x' may be chosen as 1.5 by the context encoder 508a as default, since the sky regions require higher denoising due to having low frequency data and low intensity during night. The context encoder 508a labels the updated initial map M2 as the initial map M3 corresponding to the third contextual information. Similarly, the context encoder 508a may generate the initial maps (for example: M1, M2, . . . Mn) for all the contextual information (for example: C1, C2, . . . Cn).

On generating the initial maps for all the contextual information, the context encoder 508a merges the initial maps corresponding to all the contextual information. In an example, the context encoder 508a uses a stochastic averaging method to merge the generated initial maps corresponding to all the contextual information. The context encoder 508a provides the merged initial maps ($M_{out}$) to a smoothing filter 508b, that creates the alpha map. In an example, the smoothing filter may be, but is not limited to, a smoothing Gaussian filter, or the like. The alpha map created based on the contextual information includes the spatially varying denoising strength.

In another embodiment of the disclosure, the alpha map creation module 508 may use the LUT for creating the alpha map. In an example, the LUT may be the sensor profile LUT. In another example, the LUT may be the user profile LUT. In another example, the LUT may be the crowd source profile LUT. The alpha creation module 508 fetches the alpha parameter from the LUT for the sensor metadata or the contextual information/object context of the input media data, using the LUT. In an example, the alpha parameter may be the sensor alpha parameter, if the LUT is the sensor profile LUT. In another example, the alpha parameter may be the user alpha parameter, if the LUT is the user profile LUT. In another example, the alpha parameter may be the crowd source alpha parameter, if the LUT is the crowd source profile LUT. The alpha creation module 508 creates the alpha map based on the alpha parameter. The alpha map creation module 508 provides the created alpha map to the CFU module 510.

Figure 5D:
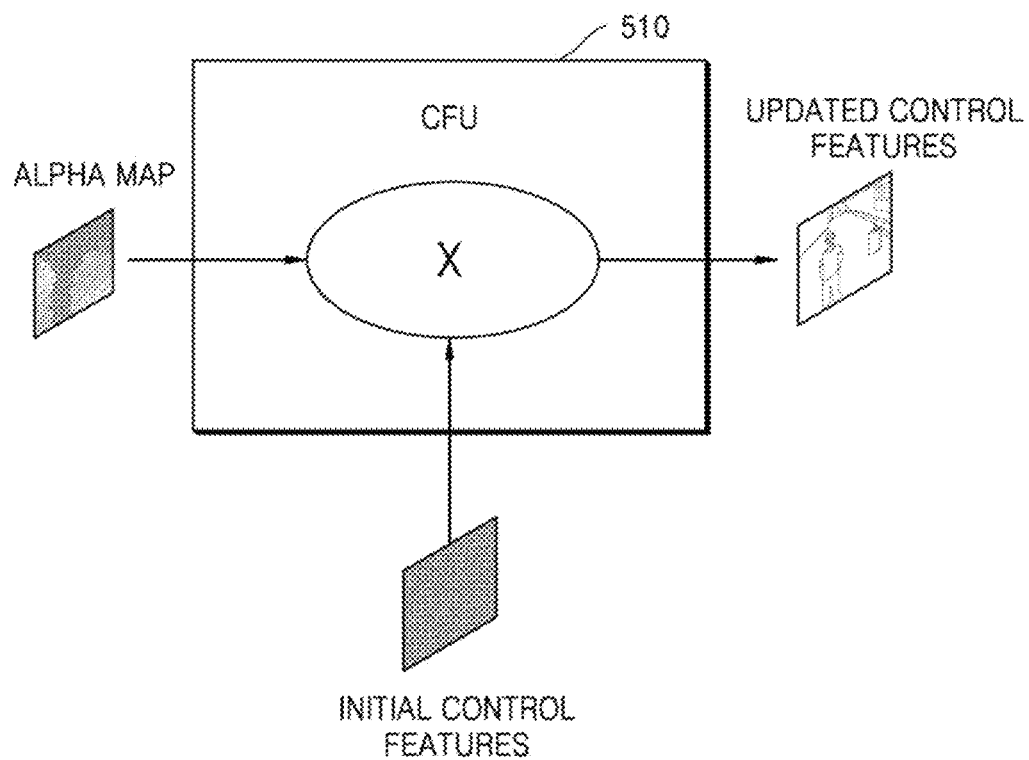
FIG. 5D depicts a control feature updating (CFU) module of the inference configured to generate updated control features for the input image, according to embodiments of the disclosure.

FIG. 5D depicts a control feature updating (CFU) module of the inference configured to generate updated control features for the input media data, according to embodiments of the disclosure.

The CFU module 510 may be configured to generate the updated control features based on the alpha map created for the input media data and the initial control features fetched for the input media data. The CFU 510 is depicted in FIG. 5D. The CFU 510 multiplies the alpha map with the initial control features of the input media data to vary the initial control features. The initial control features may be varied to fine tune the denoising strength. Varying the initial control features includes amplifying (or boosting) or suppressing the intensity of the initial control features. The varied (i.e., suppressed or amplified) initial control features may be the updated control features. In an example, the updated control features may be generated as:

$$\text{Updated control feature} = \text{MIN}(\text{Initial control feature} * \alpha, 2)$$

wherein, '$\alpha$' depicts the alpha parameter/tuning value of the alpha map.

FIG. 5E is an example table depicting the updated control features generated for the different values of the sensor metadata of the input media data, the values of alpha parameter, and the initial control features, according to embodiments of the disclosure.

The values of the updated control features with respect to the different values of the initial control features and the contextual information of the input media data is depicted in an example table of FIG. 5E. The CFU module 510 receives the input media data with the segregated one or more image regions from the input reception module 502. The CFU module 510 provides the input media data with the segregated one or more image regions and the updated control features to the trained neural network 302. The updated control features may vary the denoising strength of the trained neural network 302.

The trained neural network 302 processes the input media data with the segregated one or more image regions based on the updated control features and generates the output media data corresponding to the input media data. Processing the input media data includes spatially varying the updated control features across the segregated one or more image regions in the input media data to generate the output media data. The output media data may include the denoised one or more image regions of the input media data. Thus, the input media data may be denoised by preserving the details in the media data.

The post processing module 512 may be configured to process the output media data generated by the trained neural network 302 and provide the processed output media data to the user corresponding to the input media data. The post processing module 512 may be configured to process the output media data generated by the trained neural network 302 by performing operations such as, but not limited to, contrast enhancement, color corrections, and so on.

Figure 6:
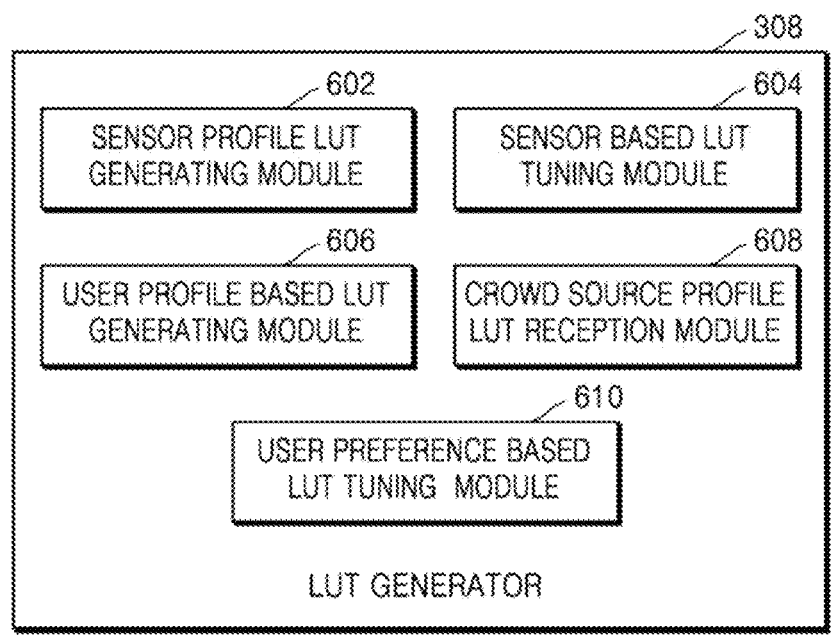
FIG. 6 depicts a look-up-table (LUT) generator performable in the electronic device to generate and dynamically tune a LUT, which may be used for creating the alpha map, according to embodiments of the disclosure.

FIG. 6 depicts the LUT generator 308 performable in the electronic device 102 to generate and dynamically tune the LUT, which has been used for creating the alpha map, according to embodiments of the disclosure. The LUT generator 308 includes a sensor profile LUT generating module 602, a sensor based LUT tuning module 604, a user profile LUT generating module 606, a crowd source profile LUT reception module 608, and a user preference based LUT tuning module 610.

The sensor profile LUT generating module 602 may be configured to generate the sensor profile LUT. The sensor profile LUT may be generated by creating the mapping of values of the sensor alpha parameter or tuning values with the different values of the sensor metadata (such as, the ISO, the ET, or the like). The alpha parameter or tuning value may be used to change the denoising strength of the trained neural network 302 for denoising the input media data.

Embodiments of the disclosure herein explain the generation and update of the sensor profile LUT using the sensor metadata such as the ISO and the ET, as an example, but it may be obvious to a person skilled in the art that any other sensor metadata may be used to generate and tune the LUT.

The sensor profile LUT generating module 602 generates the sensor profile LUT by creating the mapping of the values of the sensor alpha parameter for all the values of the ISO and the ET. The values of the sensor alpha parameter may be initialized to '1' for all the values of the ISO and the ET.

FIGS. 7A, 7B, 7C, 7D, and 7E depict generation and tuning of a sensor profile LUT, according to embodiments of the disclosure.

Figure 7A:
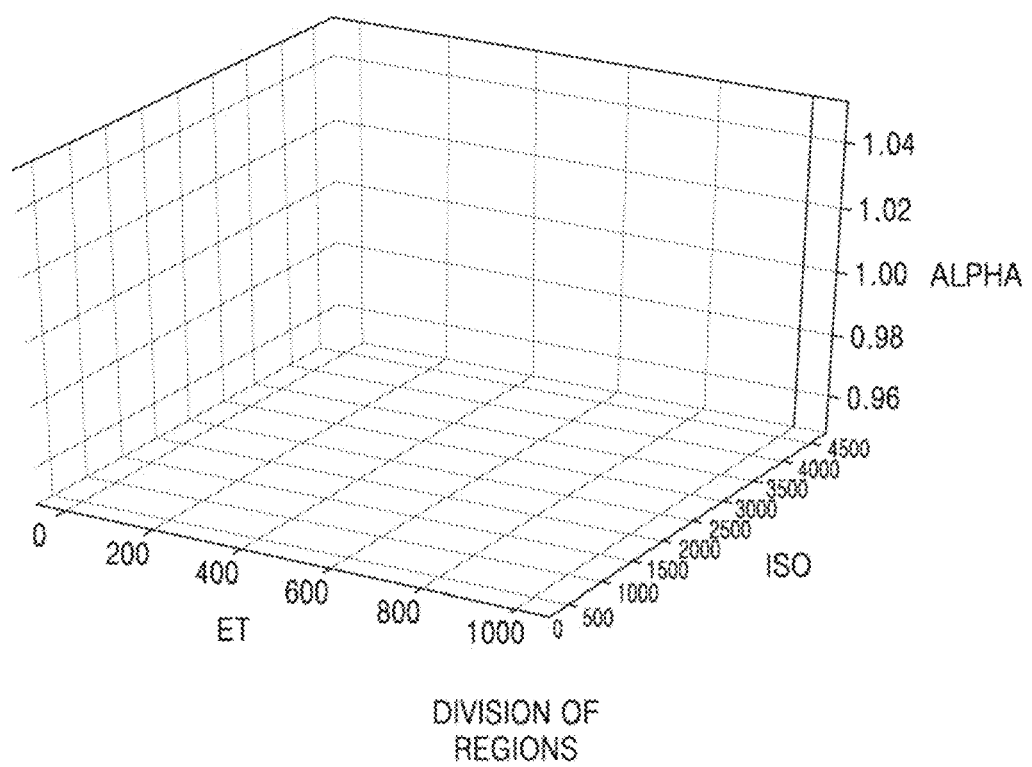
Figure 7B:
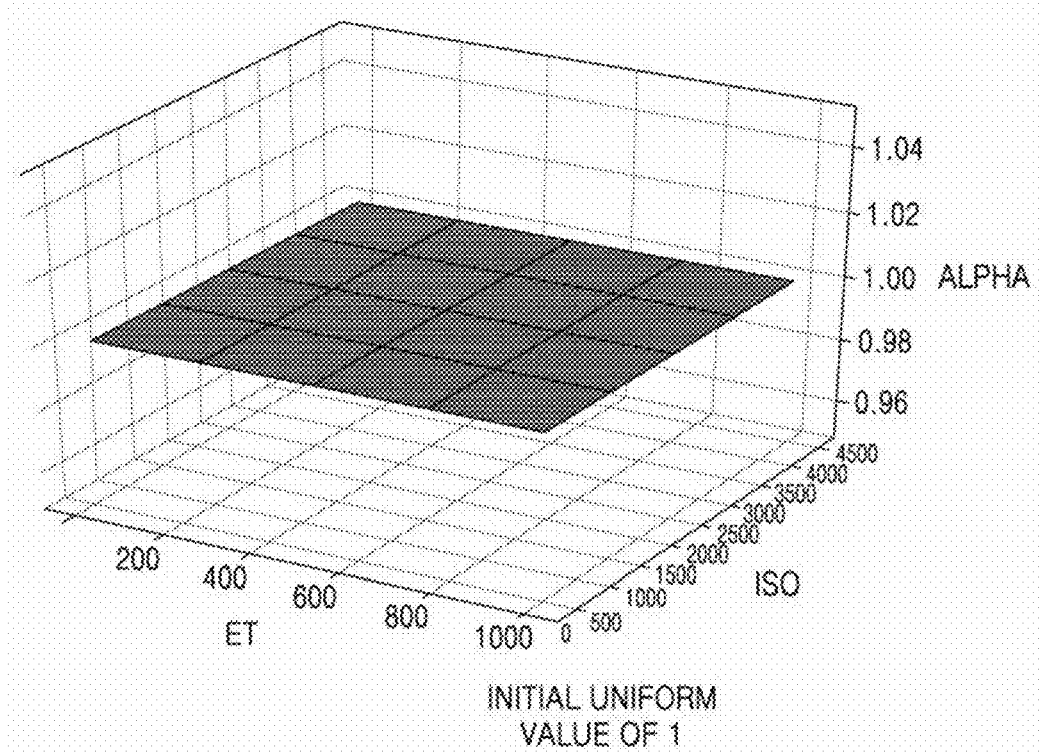
Figure 7C:
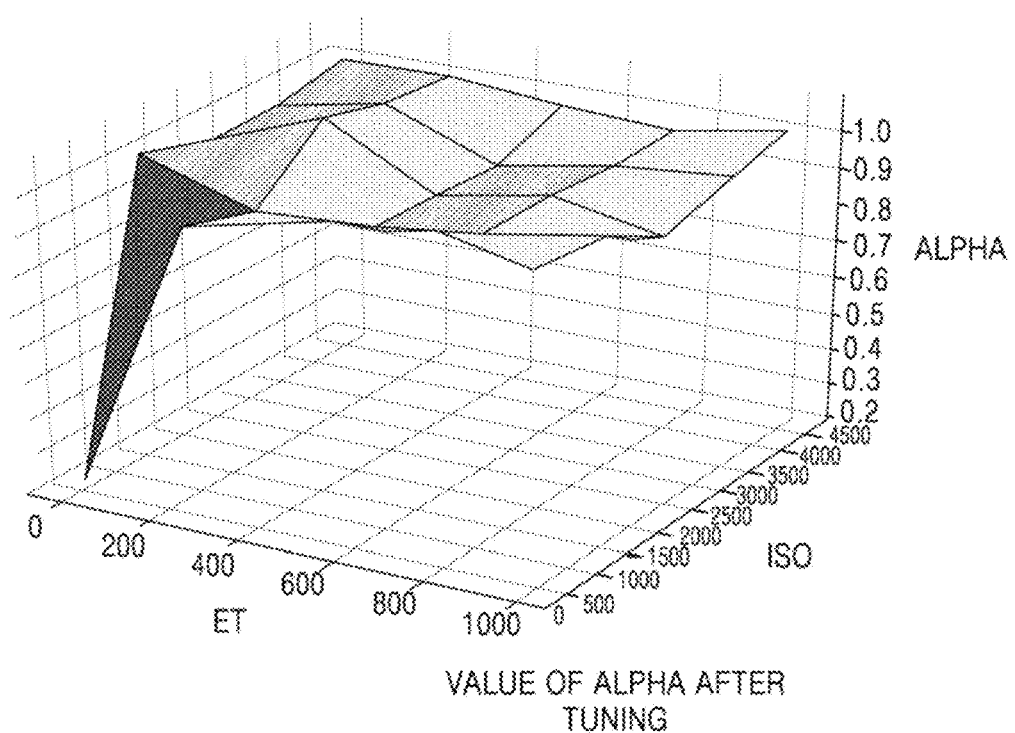

The sensor profile LUT generating module 602 updates the LUT by tuning the sensor alpha parameter for each value of the ISO and the ET by considering the set of media data captured using the different sensors under different capturing conditions for the corresponding value of the ISO and the ET. For tuning the sensor alpha parameter, the sensor profile LUT generating module 602 divides the ISO values (for example: 50, 4000) and the ET values (for example 10 ms, 1000 milliseconds (ms)) into five equal regions, which results in a total of 25 ISO-EO regions (5×5), where the sensor alpha parameter has to be computed, as depicted in FIG. 7A. The sensor profile LUT generating module 602 sets the tuning value as 1 for all the 25 ISO-ET regions, as depicted in FIG. 7B. The sensor profile LUT generating module 602 captures a plurality of media data (for example; five (5) images) for each of the 25 ISO-ET regions, that results in 125 media data for evaluation and tuning. The sensor profile LUT generating module 602 provides the 125 media data (e.g., 125 images) to the media data analyzing experts to evaluate the 125 media data using the initial tuning value of 1 and receive a feedback from the media data analyzing experts. The feedback may indicate the ISO-ET regions where the sensor alpha parameter or denoising strength has to be tuned. The sensor profile LUT generating module 602 checks the tuning value for the depicted ISO-ET regions. If the value of the sensor alpha parameter is satisfactory for the depicted ISO-ET region, the sensor profile LUT generating module 602 retains the sensor alpha parameter of 1 for the corresponding ISO-ET region. If the sensor alpha parameter for the depicted ISO-ET region is less, compared to other ISO-ET regions, the sensor profile LUT generating module 602 increases the sensor alpha parameter until a satisfactory denoising of the media data is achieved at the corresponding ISO-ET region. If the sensor alpha parameter for the depicted ISO-ET region is more than the other ISO-ET regions, the sensor profile LUT generating module 602 decreases the sensor alpha parameter, until the satisfactory denoising of the media data is achieved at the corresponding ISO-ET region. The values of the sensor alpha parameter after tuning are depicted in FIG. 7C.

In an example, the sensor profile LUT generating module 602 may compute the sensor alpha parameter as:

$$\alpha = g(ISO, ET, \text{sensor} \ldots)$$

wherein, the ISO, the ET, the sensor, and so on, represents the sensor metadata. A value of the 'g' depends on the sensor that has been used to capture the input media data and is equivalent to the LUT. The 'g' may be different for different sensors due to differences in the noise characteristics.

Consider an example scenario, wherein the sensor metadata may include the ISO of 100, and the ET of 50 milliseconds (ms). In such a scenario, the sensor profile LUT generating module 602 computes 5 values of the sensor alpha parameter/tuning values by considering 5 different sensors and 5 different operating conditions. In an example herein, the values of the sensor alpha parameter may be $\alpha=0.5, 0.75, 1, 1.25, 1.5$. The sensor profile LUT generating module 602 considers the sensor alpha parameter of 0.5 has the best details and best denoising compared to other values of the sensor alpha parameter. The sensor profile LUT generating module 602 updates the sensor profile LUT by modifying the sensor alpha parameter/tuning value from 1 to 0.5 for the ISO=100 and the ET=50 ms. The updated sensor profile LUT may be depicted in an example table of FIG. 7D.

The sensor based LUT tuning module 604 may be configured to update the sensor profile LUT by tuning the sensor alpha parameter(s) for the value(s) of the sensor metadata. The sensor based LUT tuning module 604 may tune the values of the sensor alpha parameter based on the inter-sensor tuning and the intra-sensor tuning. Intra and inter sensor tuning may be done at factory level by image quality engineers. For every (ISO, ET) bin, the engineer may tune the denoising strength using an alpha channel.

Figure 8A:
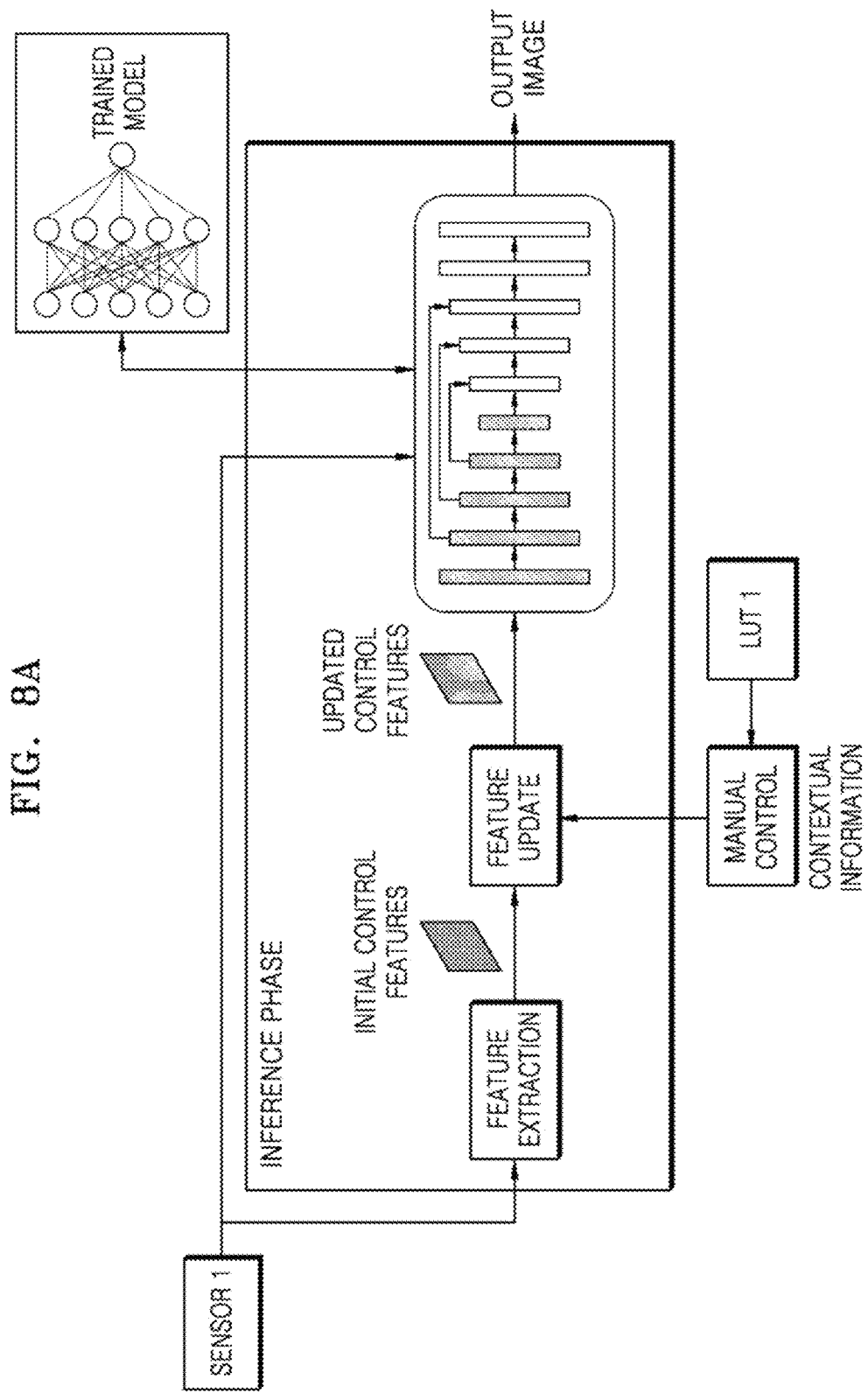
FIGS. 8A and 8B depicts the tuning of the sensor profile LUT based on an intra-sensor tuning and an inter-sensing tuning respectively, according to embodiments of the disclosure.
Figure 8B:
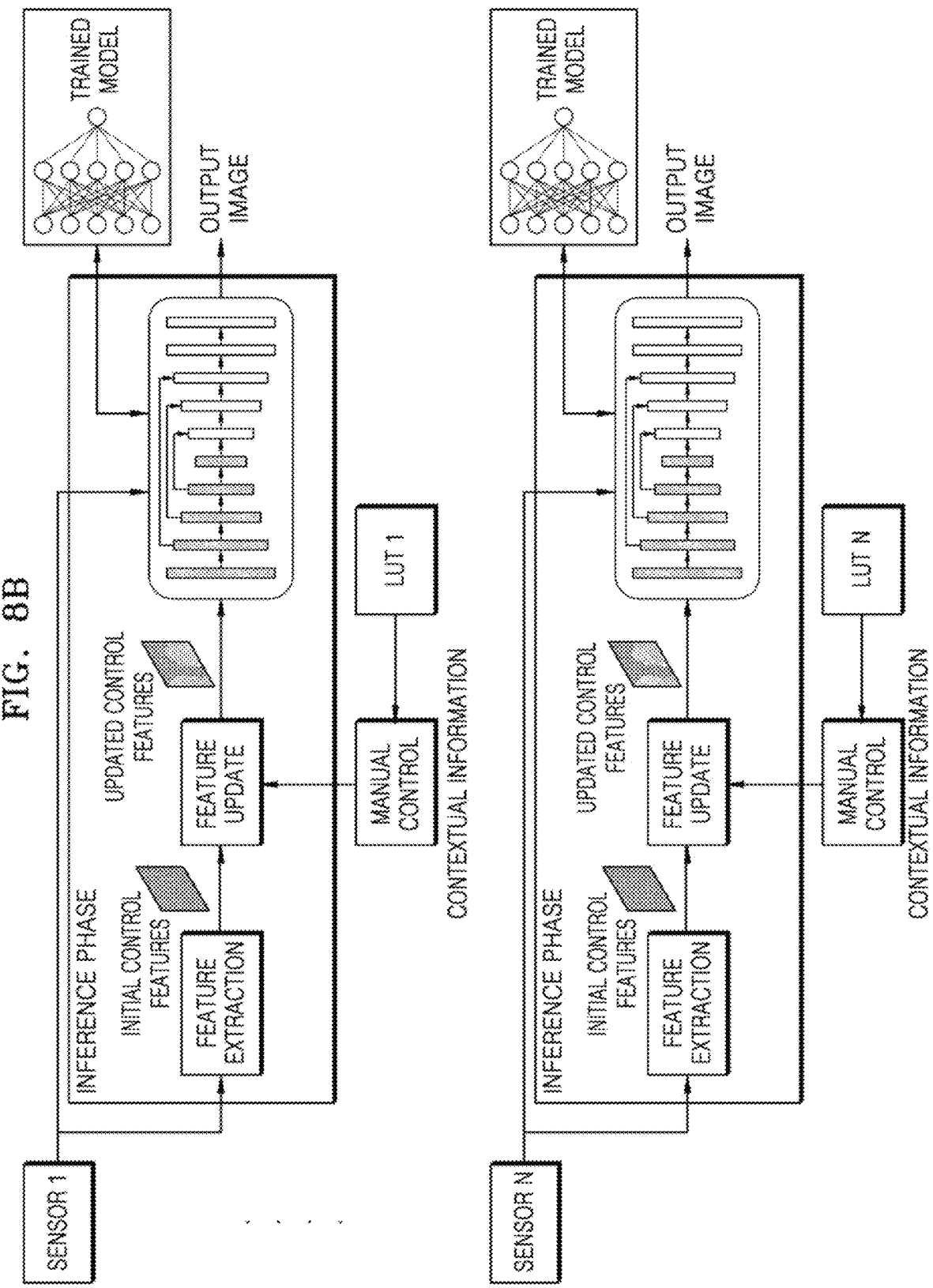

FIGS. 8A and 8B depicts the tuning of the sensor profile LUT based on an intra-sensor tuning and an inter-sensing tuning respectively, according to embodiments of the disclosure.

The intra-sensor tuning includes updating the sensor profile LUT by tuning the sensor alpha parameter with respect to the sensor used to capture the input media data. The intra-senor tuning may be the media data quality tuning with the particular sensor that has been used to capture the input media data. For the particular sensor, the noise characteristics of the neural network has to be tuned. Thus, the sensor based LUT tuning module 604 controls the denoising strength of the trained neural network 302 by tuning the alpha parameter without retraining the neural network 302 explicitly. Updating the sensor profile LUT using the intra-sensor tuning is depicted in FIG. 8A.

The inter-sensor tuning includes updating the sensor profile LUT by tuning the alpha parameter with respect to the plurality of sensors used to capture the input media data. The inter-sensor tuning may be the media data quality tuning required to adapt the trained neural network to handle the large number of sensors. The trained neural network may be overfit to handle only a specific type of noise strength, since the noise characteristics vary between the sensors used to capture the media data. Retraining such a neural network may be a very time-consuming task, as the retraining requires data collection from all the sensors. Thus, the sensor based LUT tuning module 604 controls the denoising strength of the trained neural network 302 by tuning the sensor alpha parameter based on the plurality of sensors used to capture the media data (i.e., without explicitly retraining the neural network), thereby saving collection of data required for retraining the neural network. Updating the sensor profile LUT using the inter-sensor tuning is depicted in FIG. 8B.

The user profile LUT generating module 606 may be configured to generate the user profile LUT. The user profile LUT includes the mapping of the values of the user alpha parameter, the values of the factory alpha parameter with respect to the object context or contextual information of the media data samples. The contextual information/object context includes at least one of, but is not limited to, the category of the object, the sensor metadata, and so on.

FIGS. 9A, 9B, and 9C depict a factory profile LUT, a custom profile LUT, and a user profile LUT respectively, according to embodiments of the disclosure.

For generating the user profile LUT, the user profile LUT generating module 606 determines actions (for example: first actions) performed by the user (i.e., the user interactions) for denoising the input media data, when the factory profile media data has been provided for the user for denoising the input media data. The factory profile media data has been provided based on the factory profile LUT. An example factory profile LUT is depicted in FIG. 9A. Examples of the actions performed by the user may be, but are not limited to, selection of the factory profile media data as the denoised media data, selecting one or more objects or regions present in the input media data and controlling noise or details tradeoff of the selected one or more objects or regions, and so on. Based on the actions performed by the user, the user profile LUT generating module 606 determines the one or more objects of which the noise characteristics and the details have been controlled by the user (i.e., denoising of the one or more objects) and the associated contextual information/object context. The user profile LUT generating module 606 generates a custom profile LUT by creating the mapping of the values of the alpha parameter, and the factory alpha parameter with respect to the object context. The user profile LUT generating module 606 initializes the values of the user alpha parameter and the factory alpha parameter for each parameter value of the object context to '1' in the custom profile LUT. An example custom profile LUT is depicted in FIG. 9B. The custom profile LUT may be used by the inferencer 306 to provide the factory profile media data, and the custom profile media data corresponding to the input media data to the user, while denoising the input media data.

The user profile LUT generating module 606 further monitors the actions (for example: second actions) performed by the user for denoising the input media data, when the factory profile media data and the custom profile media data have been provided to the user for denoising the input media data. Examples of the actions may be, but are not limited to, toggling between the factor profile media data and the custom profile media data, selecting the factor profile media data or the custom profile media data, manually reducing the noise details in the media data, selecting the one or more objects or regions of interests in the media data, and controlling the noise or detail tradeoff of the selected one or more objects, and so on. Based on the actions performed by the user, the user profile LUT generating module 606 determines the contextual information or object context associated with the denoised one or more objects. The user profile LUT generating module 606 updates the custom profile LUT by tuning the user alpha parameter(s) for the value(s) of the determined object context. The user profile LUT generating module 606 may tune the user alpha parameter based on the actions performed by the user to denoise the input media data. The user profile LUT generating module 606 labels the updated custom profile LUT as the user profile LUT and stores the user profile LUT in the memory 202. An example user profile LUT is depicted in FIG. 9C. The user profile LUT may be used by the inferencer 306 to provide the user profile media data corresponding to the input media data to the user, while denoising the input media data. The user profile media data may be the input media data denoised based on the user alpha parameter of the user profile LUT.

The user profile LUT generating module 606 may be further configured to update the user profile LUT by tuning the values of the alpha parameter for the values of the object context, on monitoring the actions performed by the user to denoise the input media data each time, when the factory profile media data and the user profile media data have been provided for the input media data for denoising.

Figure 10A:
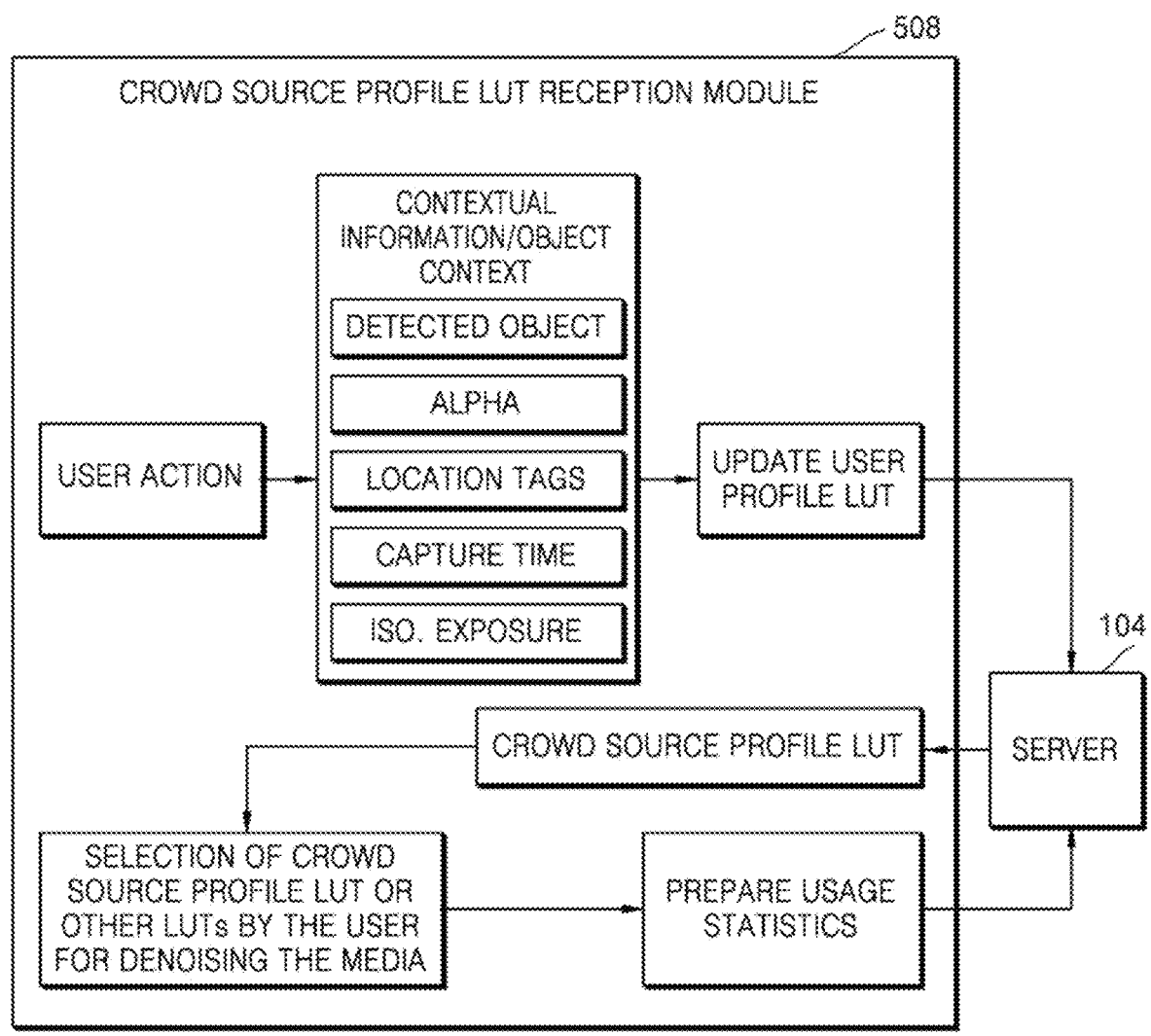
FIG. 10A depicts reception of a crowd source profile LUT from a server, according to embodiments of the disclosure.

FIG. 10A depicts reception of a crowd source profile LUT from a server, according to embodiments of the disclosure.

The crowd source profile LUT reception module 608 may be configured to receive the crowd source profile LUT from the server 104. A process of receiving the crowd source profile LUT is depicted in FIG. 10A.

FIG. 10B depicts the crowd source profile LUT, according to embodiments of the disclosure.

The crowd source profile LUT reception module 608 communicates the user profile LUT to the server 104, whenever the user profile LUT has been updated by the user profile LUT generation module 608. The crowd source profile LUT reception module 608 receives the crowd source profile LUT from the server 104 in response to the communicated user profile LUT. The crowd source profile LUT may be the function of the user profile LUTs selected by the plurality of users. An example crowd source profile LUT is depicted in FIG. 10B.

The crowd source profile LUT reception module 608 stores the crowd source profile LUT in the memory 202. The crowd source profile LUT includes the mapping of the values of the crowd source alpha parameter with respect to the object context/contextual information of the media data samples. The inferencer 306 may use the sensor profile LUT, the factory profile LUT, the crowd source profile LUT and the user profile LUT to provide the sensor profile media data, the factory profile media data, the user profile media data, and the crowd source profile media data, as the denoised output media data corresponding to the input media data to the user, when the input media data has been selected by the user for denoising.

The crowd source profile LUT reception module 608 may also be configured to determine the usage statistics and communicates the usage statistics to the server 104. The usage statistics depict the selection of one of, the sensor profile media data or sensor profile LUT, the factory profile media data or factory profile LUT, the user profile media data or user profile LUT, and the crowd source profile media data or crowd source profile LUT, by the user as the denoised input media data. The usage statistics may be used by the server 104 to compute the preference score for the crowd source profile, which may be further used to update the weight of each user.

Figure 11:
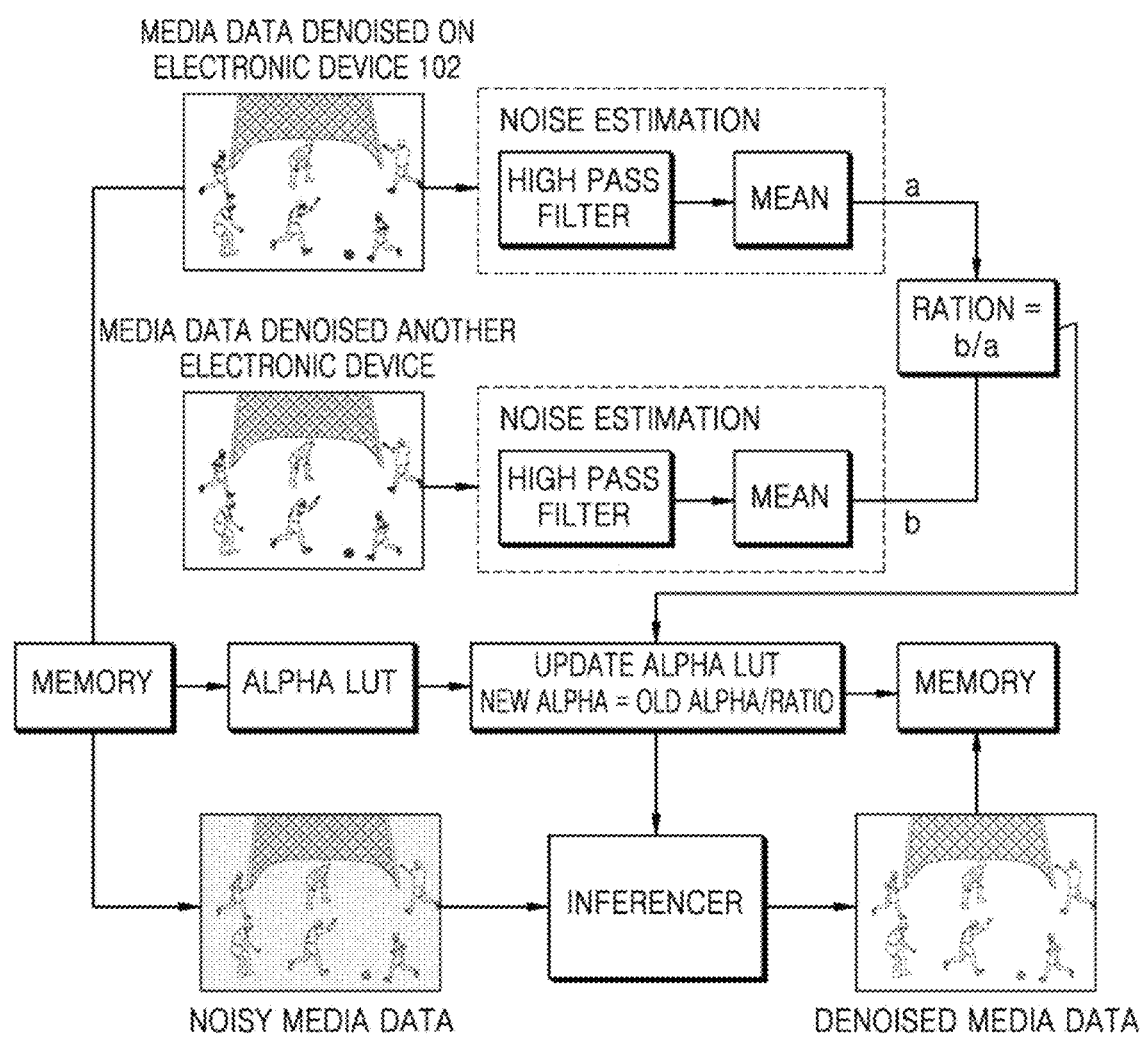
FIG. 11 depicts tuning of the LUT based on noise characteristics and details of the image denoised on another electronic device, according to embodiments of the disclosure.

FIG. 11 depicts tuning of the LUT based on noise characteristics and details of the media data denoised on another electronic device, according to embodiments of the disclosure.

The user preference based LUT tuning module 610 may be configured to update the LUT, when the user wants to apply the noise characteristics or detail tuning of another electronic device on the electronic device 102 for denoising the media data on the electronic device 102. The user preference based LUT tuning module 608 may update the LUT by tuning the alpha parameter(s) based on the noise or detail tuning of another electronic device. The LUT may include at least one of the sensor profile LUT, the user profile LUT, and the crowd source profile LUT. The alpha parameter includes at least one of the sensor alpha parameter, the user alpha parameter, and the crowd source alpha parameter. A process of tuning the alpha parameter based on the noise/detail tuning of another electronic device is depicted in FIG. 11.

As depicted in FIG. 11, for tuning the alpha parameter, the user preference based tuning module 610 receives the denoised media data from another electronic device that has been preferred by the user. The user preference based tuning module 610 also fetches the media data denoised on the electronic device 102 from the memory 202. The user preference based tuning module 610 estimates the noise characteristics of the media data denoised on the electronic device 102 using a first noise estimator 610a. The user preference based tuning module 610 estimates the noise characteristics of the media data denoised on another electronic device 102 using a second noise estimator 610b. The noise estimator 610a or 610b includes one or more filters such as, but are not limited to, a high pass filter, Laplacian filters, or the like for estimating the noise characteristics of the media data.

The user preference based tuning module 610 estimates the ratio, which depicts the relative relationship between the noise characteristics of the media data denoised on the electronic device 102 and the noise characteristics of the media data denoised on another electronic device. The ratio may be calculated as:

$$\text{Ratio} = \frac{b}{a}$$

wherein, 'b' depicts the noise characteristics of the media data denoised on another electronic device and 'a' depicts the noise characteristics of the media data denoised on the electronic device 102. In an example herein, if the ratio of the relative noise characteristics of media data b with respect to the relative noise characteristics of media data a is higher, the media data denoised on another electronic device may have more noise or details, compared to the media data denoised on the electronic device 102.

On computing the ratio, the user preference based LUT tuning module 610 fetches the LUT stored in the memory 202. The user preference based LUT tuning module 610 updates the LUT by tuning the alpha parameter based on the computed ratio. The alpha parameter may be tuned as:

$$\text{Tuned alpha parameter} = \frac{\text{alpha parameter}}{\text{ratio}}$$

The user preference based LUT tuning module 610 stores the updated LUT with the tuned alpha parameter in the memory 202. Thus, the updated LUT may be used by the inferencer 306 to denoise the input media data selected by the user on the electronic device 102.

FIGS. 2-11 show the electronic device 102, but it is to be understood that other embodiments are not limited thereon. In other embodiments, the electronic device 102 may include less or more number of blocks. Further, the labels or names of the blocks are used only for illustrative purpose and do not limit the scope of the embodiments herein. One or more blocks can be combined together to perform the same or substantially the same function in the electronic device 102.

Figure 12A:
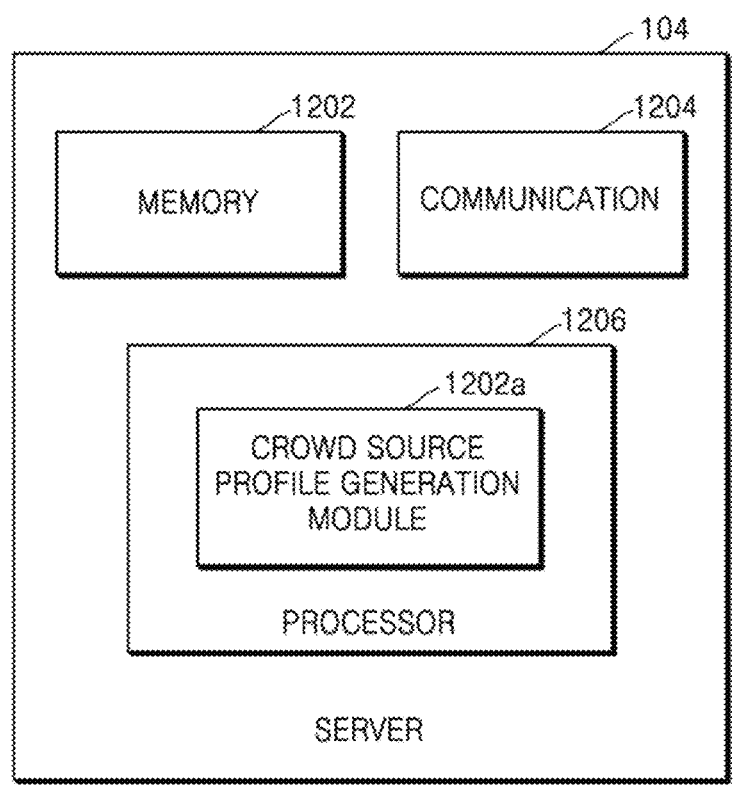
FIG. 12A is an example block diagram depicting various components of the server for generating the crowd source profile LUT, according to embodiments of the disclosure.
Figure 12B:
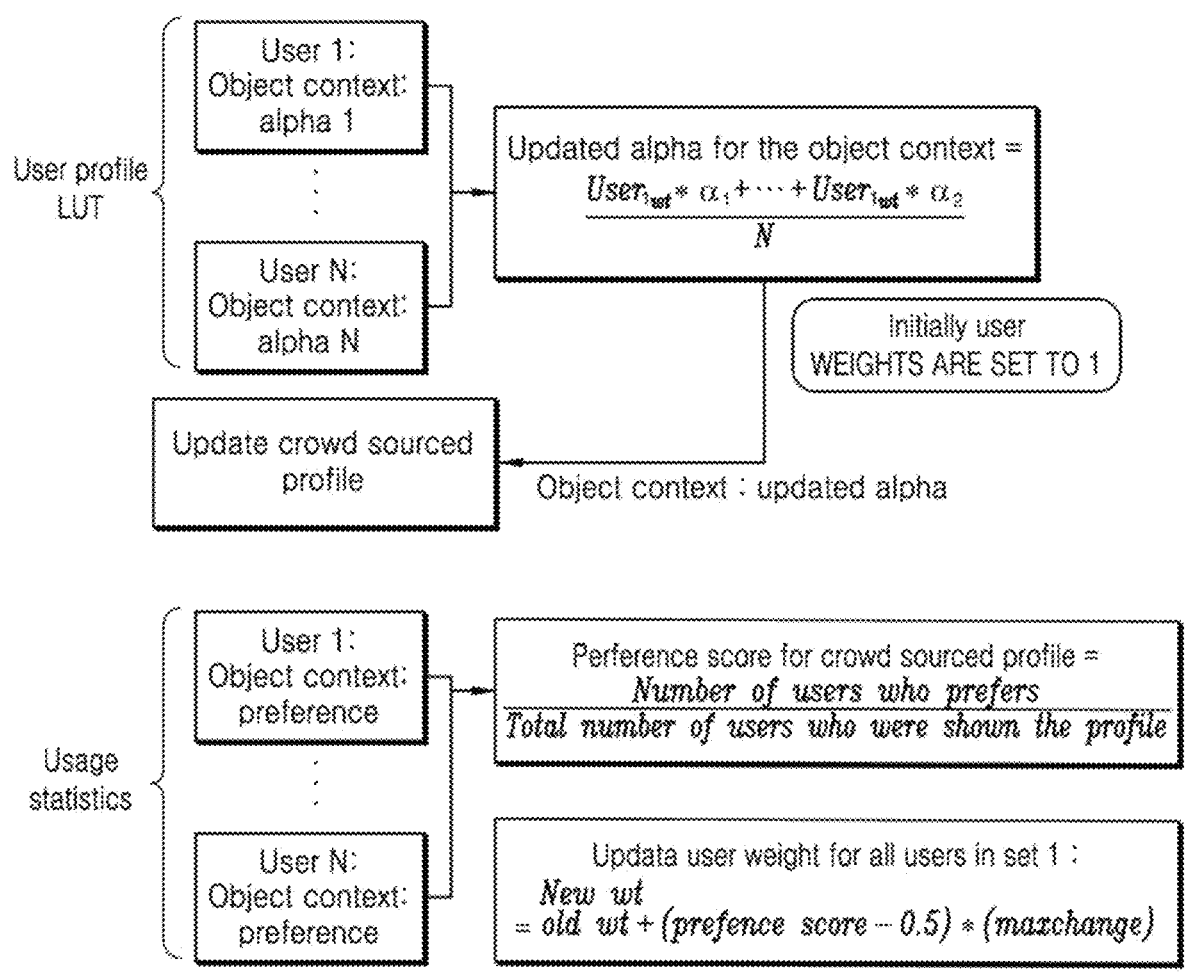
FIGS. 12B, and 12C depict generation of the crowd source profile LUT, according to embodiments of the disclosure.
Figure 12C:
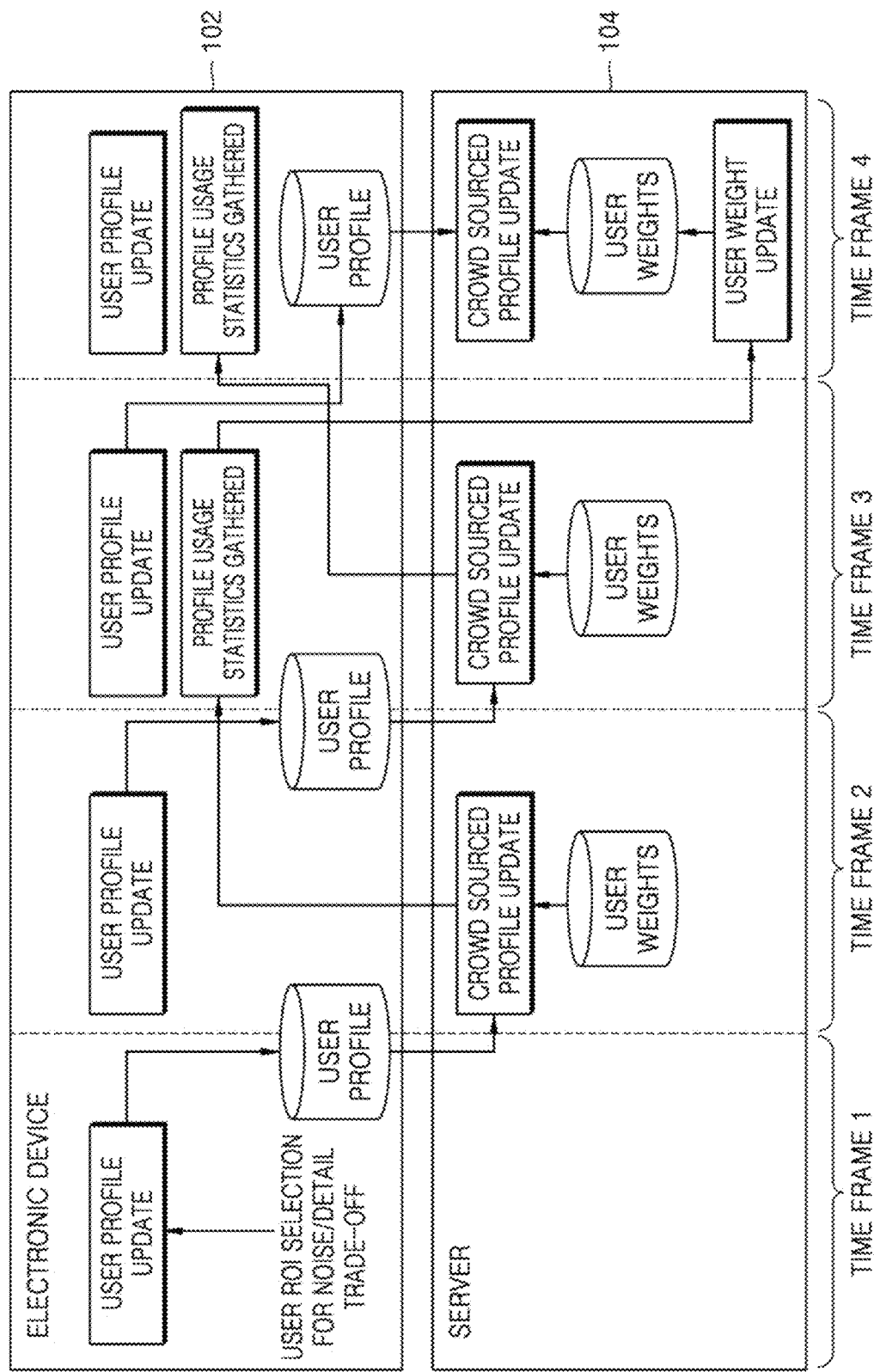

FIG. 12A is an example block diagram depicting various components of the server 104 for generating the crowd source profile LUT, according to embodiments. FIGS. 12B, and 12C depict generation of the crowd source profile LUT, according to embodiments of the disclosure.

The server 104 includes a memory 1202, a communication interface 1204, and a processor 1206.

The memory 1202 may store at least one of the weights of the plurality of users associated with the plurality of electronic devices 102, the crowd source profile LUT, the preference scores of the crowd source profile LUT, and so on. The memory 1202 also stores a crowd source LUT generation module 1202a, which may be processed/executed by the processor 1206 to generate the crowd source profile LUT. The memory 1202 referred herein may include at least one type of storage medium, from among a flash memory type storage medium, a hard disk type storage medium, a multi-media card micro type storage medium, a card type memory (for example, an SD or an XD memory), random-access memory (RAM), static RAM (SRAM), read-only memory (ROM), electrically erasable programmable ROM (EEPROM), programmable ROM (PROM), a magnetic memory, a magnetic disk, or an optical disk.

The communication interface 1204 may be configured to enable the server 104 to communicate with the electronic devices 102 through the communication network 106.

The processor 1206 may include a single processor, a plurality of processors, multiple homogeneous or heterogeneous cores, multiple Central Processing Units (CPUs) of different kinds, microprocessors, special media, and other accelerators. The one or a plurality of processors may be a general-purpose processor, a graphics-only processing unit, an image processing unit, a neural network processing unit, and so on.

The processor 1206 may be configured to generate the crowd source profile LUT. The crowd source profile LUT may be the function of the user profile LUTs selected by the plurality of users. The processor 1206 processes the crowd source LUT generation module 1202a to generate the crowd source profile LUT. A process of generating the crowd source profile LUT is depicted in FIGS. 12B, and 12C.

As depicted in FIG. 12B, and 12C, the crowd source LUT generation module 1202a receives the user profile LUTs of the plurality of users from the respective plurality of electronic devices 102. The user profile LUT includes the mapping of the values of the user alpha parameter with respect to the values of the contextual information or object context. The crowd source LUT generation module 1202a fetches the values of the user alpha parameter corresponding to the object context from the user profile LUT of each user and the weight of each user from the memory 1202. The crowd source LUT generation module 1202a sets the weight of each user initially as 1. The crowd source LUT generation module 1202a estimates the updated user alpha parameter for each object context as:

$$\text{Updated alpha parameter} = \frac{\text{User}_{1_{wt}} * \alpha_1 + \ldots + \text{User}_{N_{wt}} * \alpha_N}{N}$$

wherein, 'User$_{1_{wt}}$' represents the weight of a first user, $\alpha_1$ represents the alpha parameter fetched from the user profile LUT of the first user, 'User$_{N_{wt}}$' represents the weight of a Nth user, '$\alpha_N$' represents the alpha parameter fetched from the user profile LUT of the Nth user, and N represents a number of users or the number of LUT profiles received from the number of users.

The crowd source LUT generation module 1202a generates the crowd source profile LUT by creating the mapping of the updated values of the user profile alpha parameter with the object context. The crowd source LUT generation module 1202a communicates the crowd source profile LUT to the plurality of electronic devices 102 associated with the plurality of users.

The crowd source LUT generation module 702a may also be configured to calculate the preference score for the crowd source profile LUT. For calculating the preference score, the crowd source LUT generation module 1202a receives the user statistics corresponding to each user from the respective electronic device 102. The crowd source LUT generation module 1202a may or may not receive the usage statistics of the plurality of users from the plurality of electronic devices 102, for which the crowd source profile LUT has been communicated. The usage statistics of each user depicts the selection of at least one of the sensor profile LUT, the user profile media data, the factory profile media data, and the crowd source profile media data, by the user, while denoising the input media data. The crowd source LUT generation module 1202a calculates the preference score for the crowd source profile LUT based on the usage statistics of each user. In an example, the crowd source LUT generation module 1202a may compute the preference score for the crowd source profile LUT as:

$$\text{preference sore} = \frac{\text{Number of users who prefers the crowd source profile media}/LUT}{\text{Total number of users who have been provided with the crowd source profle } LUT}$$

The crowd source LUT generation module 1202a may also be configured to update the weight of each user based on the preference score calculated for the crowd source profile LUT. The crowd source LUT generation module 1202a may use the updated weight of each user for subsequent updating of the crowd source profile LUT. In an example, the crowd source LUT generation module 1202a may update the weight of each user as:

New weight=old weight+(prefence score−0.5)*(max change)

Max change refers to the maximum change that is allowed during user preference update and can be a constant value, or a function of old weight. If the preference score is less than 0.5, the weight needs to be reduced and if the preference score is more than 0.5, the weight needs to be increased.

It is understood that any other methods (including the above) may be used to update the weight of each user based on the preference score of the crowd source profile LUT.

FIG. 12A shows the server 104, but it is to be understood that other embodiments are not limited thereon. In other embodiments, the server 104 may include less or more number of blocks. Further, the labels or names of the blocks are used only for illustrative purposes and do not limit the scope of the embodiments herein. One or more blocks can be combined together to perform the same or substantially the same function in the server 104.

Figure 13:
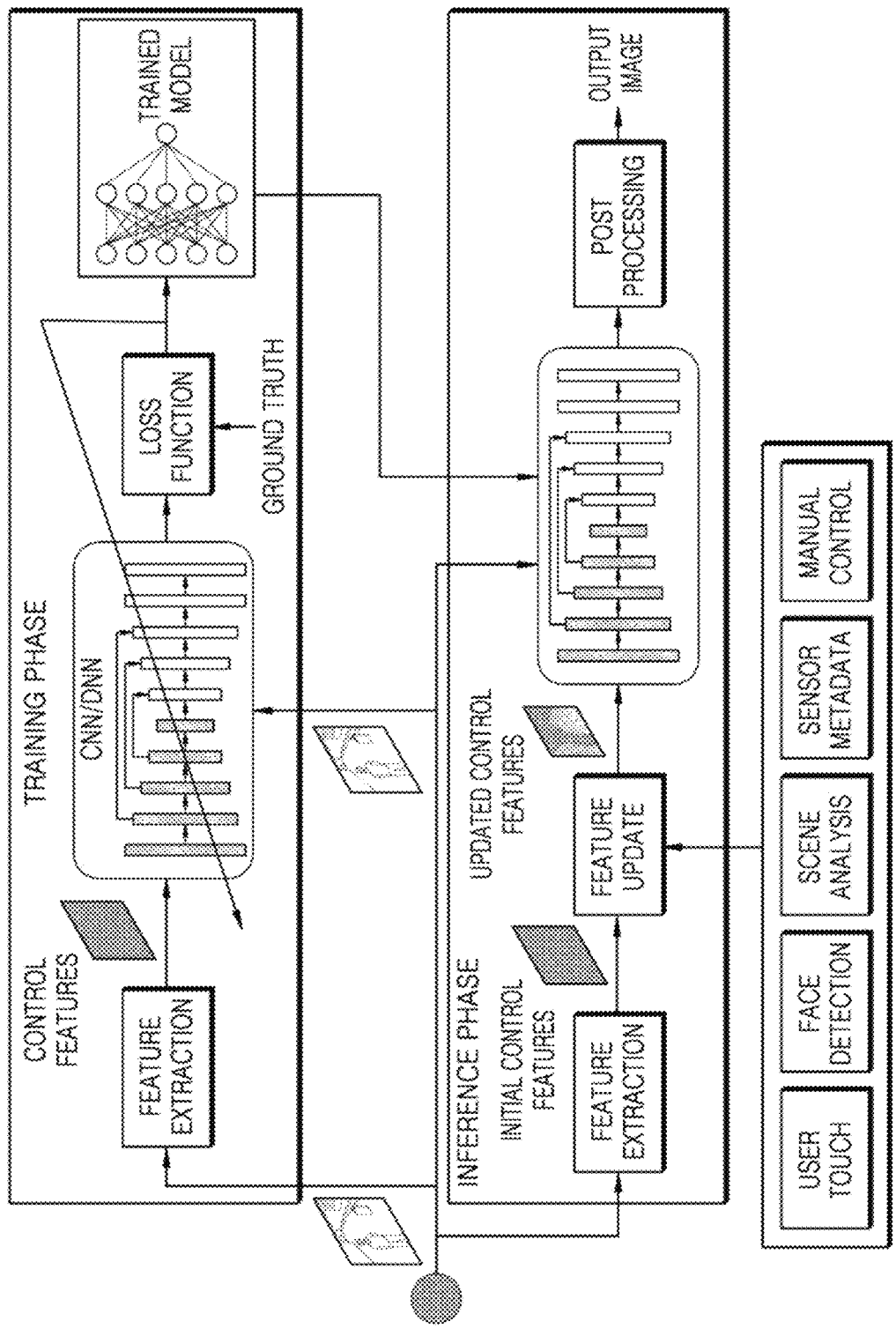
FIG. 13 is an example conceptual diagram depicting denoising the media data based on the contextual information of the media data, according to embodiments of the disclosure.

FIG. 13 is an example conceptual diagram depicting denoising of the media data based on the contextual information of the media data, according to embodiments of the disclosure.

The electronic device 102 trains the neural network 302 at the training phase to denoise the media data. For training the neural network, the electronic device 102 extracts the features from the training media data samples and encodes the extracted features as the initial control features. The electronic device 102 provides the initial control features and the training media data samples to the neural network, which generates the output media data samples by denoising the training media data samples. The electronic device 102 compares the output media data samples with the respective ground truth media data samples and computes the loss function. The electronic device 102 updates the parameters of the neural network 302 based on the loss function, thereby providing the trained neural network 302. The electronic device 102 stores the trained neural network 302 in the memory 202.

At the inference phase, the electronic device 102 receives the input media data and denoises the input media data using the trained neural network 302. The electronic device 102 segregates the input media data into the one or more regions, which include the noisy data. The electronic device 102 fetches the initial control features from the memory 202, which have been generated while training the neural network 302. The electronic device 102 also extracts the contextual information from the input media data (such as, but are not limited to, face detection, scene analysis, sensor metadata, manual control, and so on). The electronic device 102 creates the alpha map using the contextual information extracted from the input media data. Alternatively, the electronic device 102 creates the alpha map corresponding to the extracted contextual information of the input using the alpha parameter present in the LUT.

Upon creating the alpha map, the electronic device 102 generates the updated control features by multiplying the initial control features with the created alpha map. The electronic device 102 provides the updated control features and the input media data with the segregate one or more regions to the trained neural network 302. The trained neural network 302 generates the output media data by varying the updated control features across the segregated one or more regions of the input media data. The output media data may be the denoised input media data.

FIGS. 14A, 14B, 14C, and 14D are example diagrams depicting denoising of the media data using the alpha map with different values, according to embodiments of the disclosure.

Figure 14A:
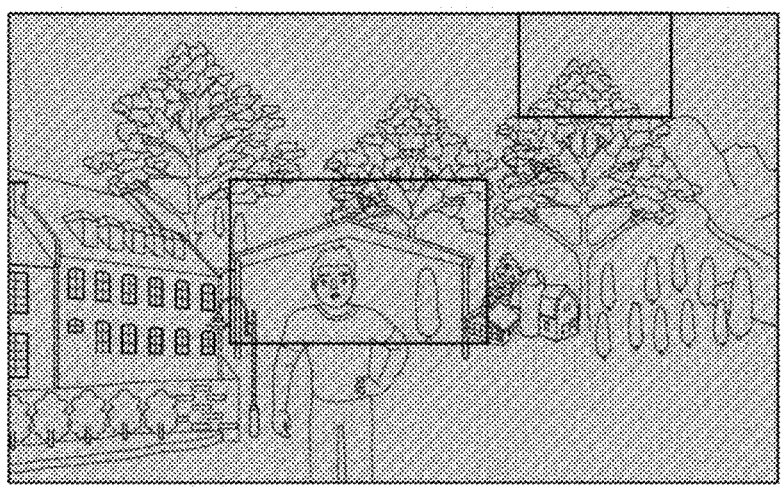

Consider an example scenario, wherein the electronic device 102 receives a noisy image (an example of the media data), as depicted in FIG. 14A. The received noisy image may include stable regions (for example: sky regions) with low frequency details, so that the stable regions have to be highly denoised without losing the texture of the image.

In an example herein, consider that the electronic device 102 uses the alpha map with spatially uniform low denoising strength to generate the denoised output image corresponding to the received noisy image. The alpha map with the spatially uniform low denoising strength preserves the details in the certain regions of the denoised output image (such as, face regions of the like). However, the alpha map with the spatially uniform low denoising strength fails to remove the noise from the smooth/stable regions (such as, the sky regions, or the like), as depicted in FIG. 14B.

In an example herein, consider that the electronic device 102 uses the alpha map with spatially uniform high denoising strength to generate the denoised output image corresponding to the received noisy image. The alpha map with the spatially uniform high denoising strength removes the noise in the smooth/stable regions (such as, the sky regions, or the like), however, the details may be lost in the certain regions with texture, as depicted in FIG. 14C.

Thus, embodiments of the disclosure herein enable the electronic device 102 to use the alpha map with the spatially varying denoising strength to generate the denoised output image corresponding to the received noisy image. The alpha map with the spatially varying denoising strength may be generated based on the contextual information of the received noisy image. The alpha map with the spatially varying denoising strength removes the noise in the smooth regions while maintaining the details in other regions of the output image, as depicted in FIG. 14D.

FIGS. 15A-15C and 16A-16A are example diagrams depicting denoising of the media data by spatially varying the updated control features across the regions of the media data, according to embodiments of the disclosure.

Figure 15A:
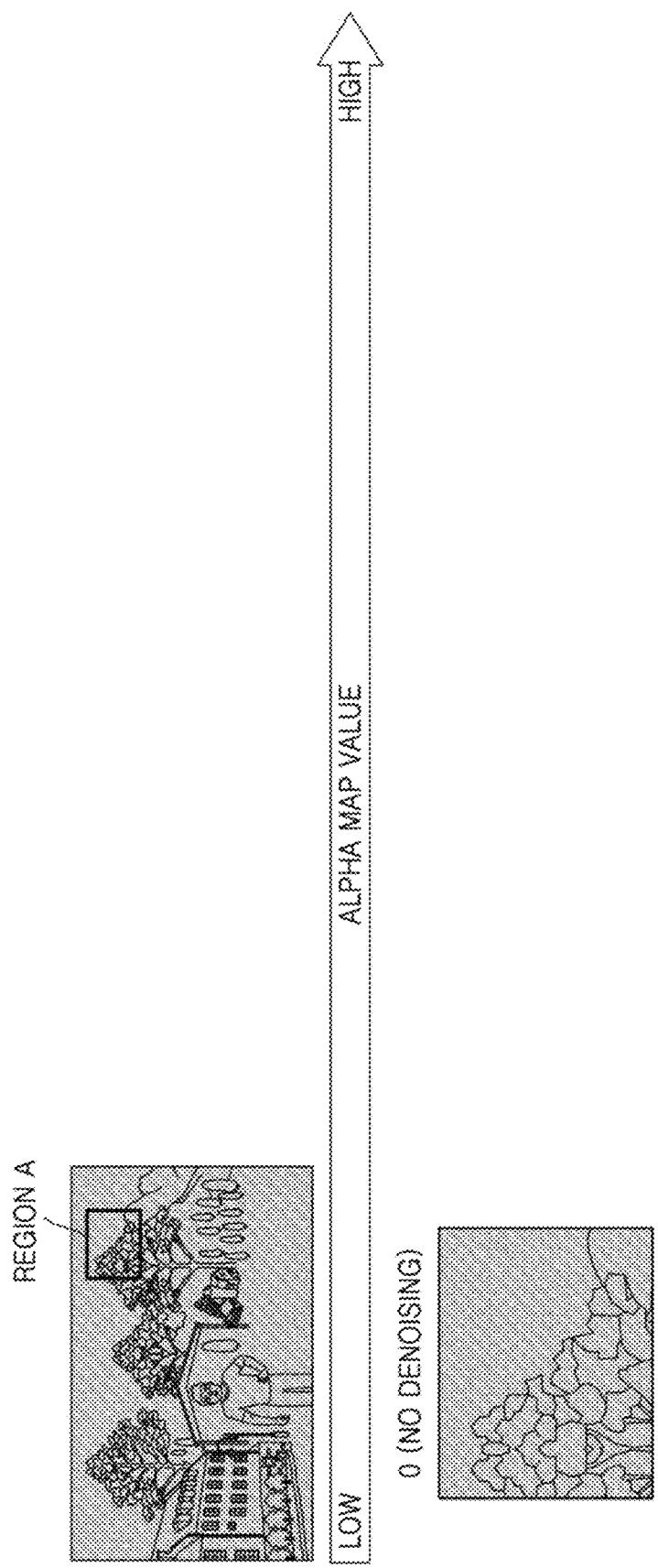
FIGS. 15A, 15B, and 15C are example diagrams depicting denoising the media data by spatially varying the updated control features across the image regions of the media data, according to embodiments of the disclosure.

Consider an example scenario, as depicted in FIG. 15A, wherein the electronic device 102 receives an image A (an example of the input media data) for denoising. The electronic device 102 segregates the one or more regions in the image A (for example: a region A), wherein the noisy data to be reduced/removed. The electronic device 102 creates the alpha map for the image A, based on the contextual information of the image A. The alpha map created for the image A based on the contextual information may be the alpha map with the spatially varying denoising strength. On creating the alpha map, the electronic device 102 generates the updated control features for the image A using the alpha map and the contextual information of the image A. The electronic device 102 generates an output image A, by spatially controlling the updated control features (that have been generated using the alpha map) across the region A in the media data using the trained neural network, thereby removing the noisy data in the region A by preserving details in the input image.

Figure 15B:
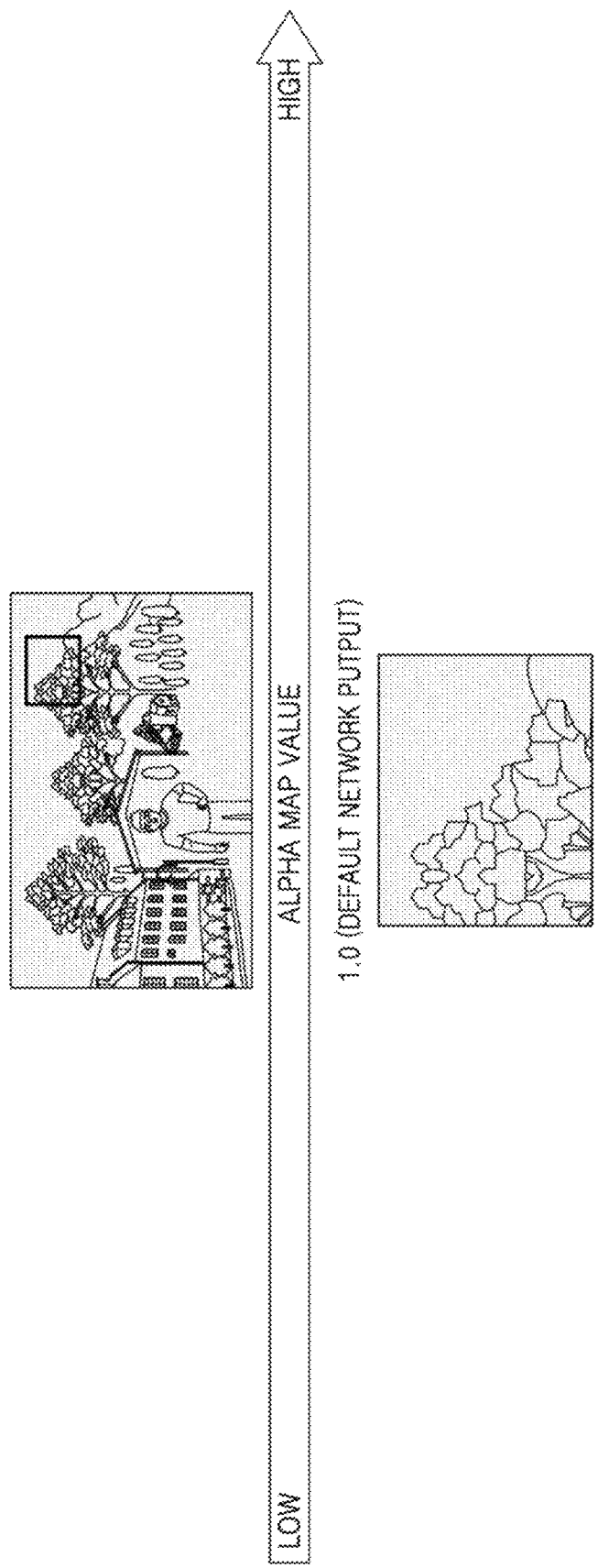

The output image generated by the trained neural network using the alpha map of having a uniform value of 1 (i.e., the alpha map generated without considering the contextual information of the image A) is depicted in FIG. 15B.

Figure 15C:
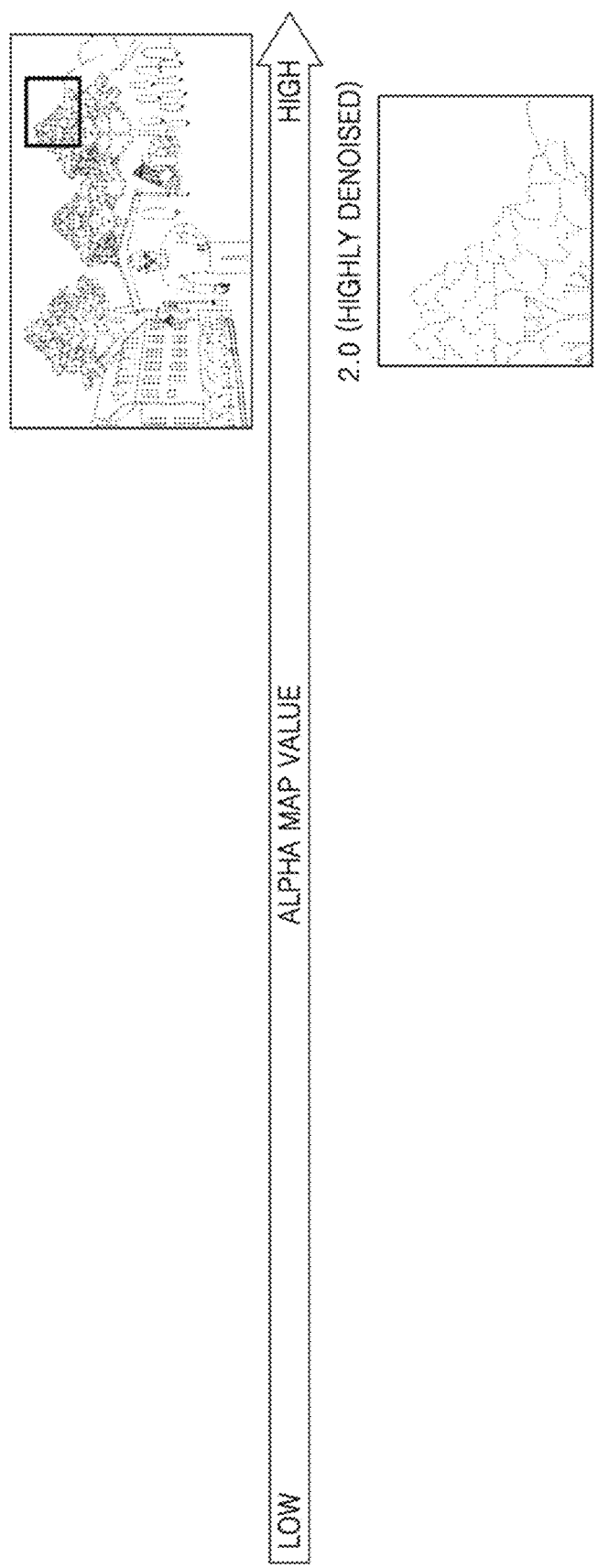

The output image generated by the trained neural network using the alpha map having the value of 2 (i.e., the alpha map generated based on the contextual information of the image A) is depicted in FIG. 15C. The output image generating using the alpha map having the value of 2 may be the highly denoised input image.

Figure 16A:
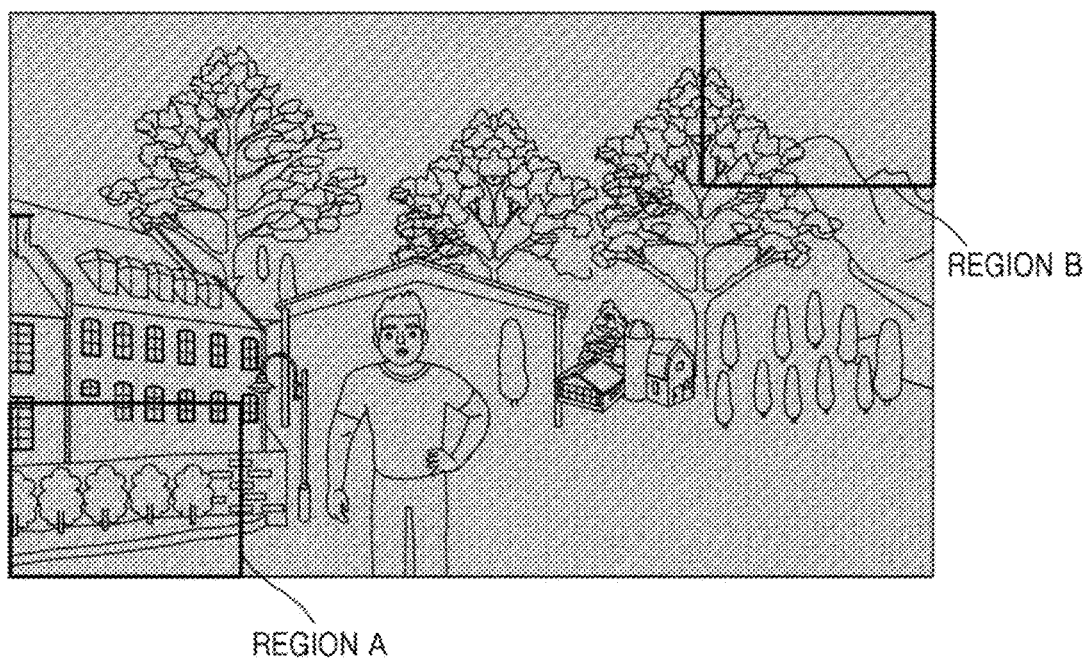
FIGS. 16A, 16B, and 16C are example diagrams depicting denoising the media data by spatially varying the updated control features across the image regions of the media data, according to embodiments of the disclosure.
Figure 16B:
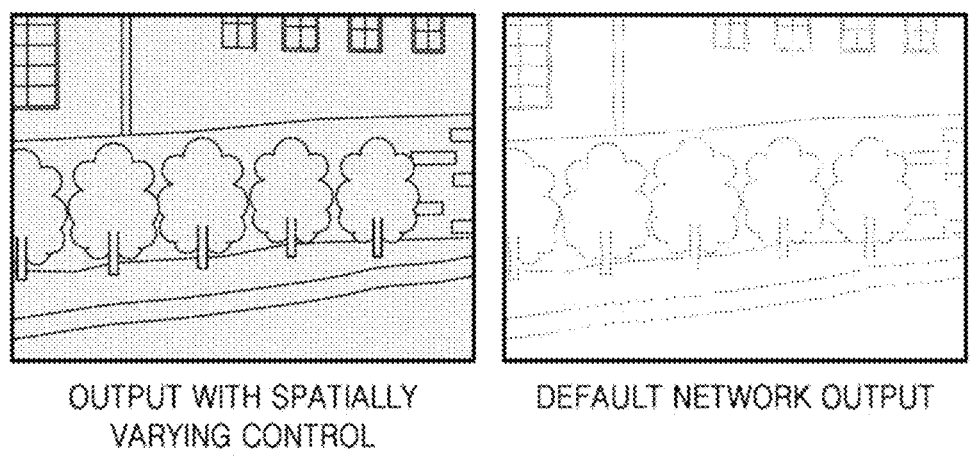
Figure 16C:
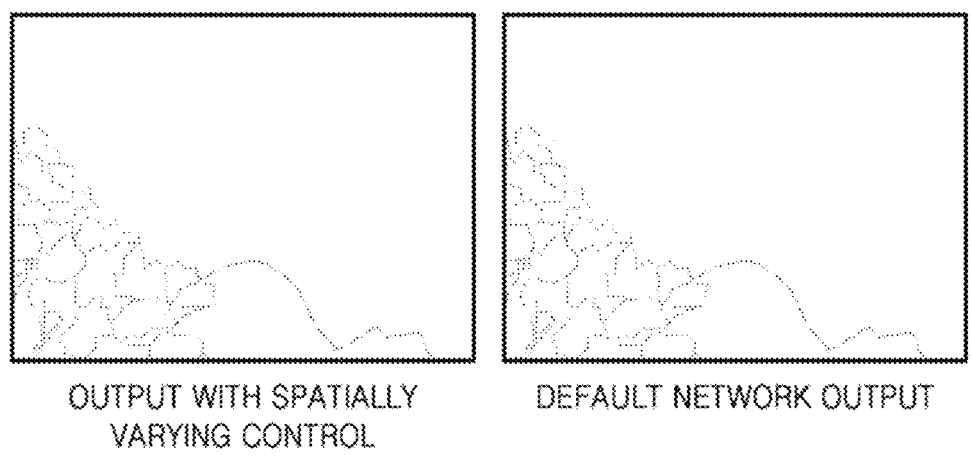

FIGS. 16A, 16B, and 16C are example diagrams depicting denoising of the media data by spatially varying the updated control features across the regions of the media data, according to embodiments of the disclosure.

Consider an example scenario, as depicted in FIG. 16A, wherein the electronic device 102 receives an image B for denoising. The electronic device 102 segregates the image B into two regions (a region A and a region B), wherein the noisy data is removed or reduced. In an example herein, the region A includes one or more objects (such as, plants, or the like), and the region B includes a sky region. The electronic device 102 extracts the contextual information (such as, face detection, scene analysis, sensor metadata, or the like) from the image B. The electronic device 102 generates the alpha map by suppressing the noise in certain regions and boosting the details in other regions in the image B, based on the contextual information of the image B. In an example herein, the electronic device 102 generates the alpha map by boosting the details in the region A and the suppressing the noise in the region B of the image B. Thus, the alpha map may include the spatially varying denoising strength. On creating the alpha map, the electronic device 102 generates the updated control features for the image B using the alpha map and the contextual information of the image B. The electronic device 102 generates an output image B for the image B by spatially controlling the updated control features across the region A and the region B in the media data using the trained neural network 302. The output image B may be the denoised image B.

The region A in the output image B (corresponding to the region A of the image B) generated using the alpha map with the spatially varying denoising strength and the alpha map having the uniform value of 1 is depicted in FIG. 16B. The region A in the output image B generated using the alpha map with the spatially varying denoising strength includes the improved details.

The region B in the output image B (corresponding to the region B of the image B) generated using the alpha map with the spatially varying denoising strength and the alpha map having the uniform value of 1 is depicted in FIG. 16C. The region B in the output image B generated using the alpha map with the spatially varying denoising strength includes the reduced noise.

FIGS. 17-21 are example diagrams depicting denoising of the media data, according to embodiments.

Figure 17A:
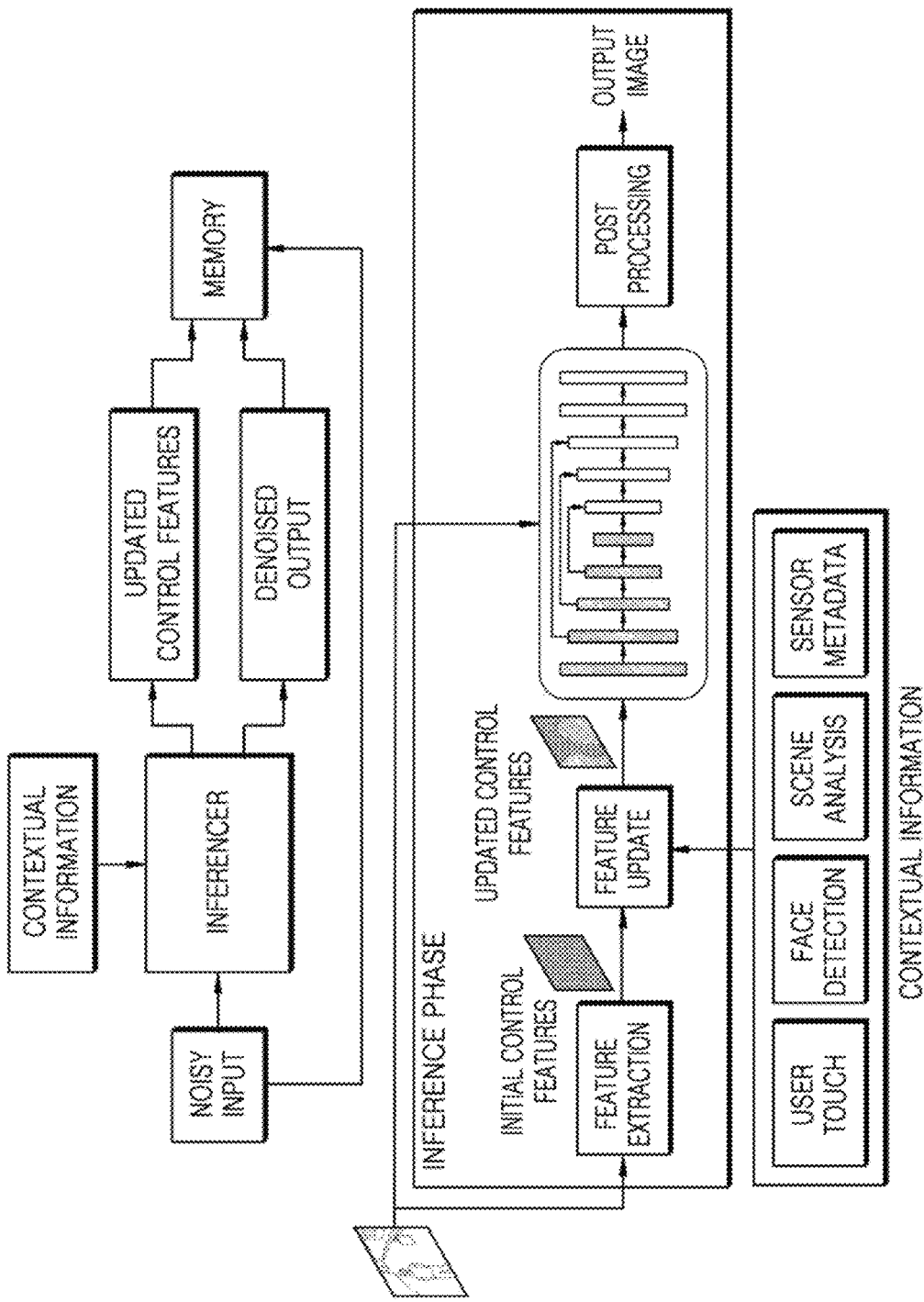
FIG. 17A depicts example block diagrams of the electronic device for denoising the media data, according to embodiments of the disclosure.

FIG. 17A depicts example block diagrams of the electronic device for denoising of the media data, according to embodiments of the disclosure. FIG. 17B depicts outputs of denoising process according to an embodiment of the disclosure.

Consider an example scenario, as depicted in FIG. 17B, wherein the user performs a gesture on the region in a noisy input image (an example of the media data) being captured using the media data acquisition device 206, wherein the gesture includes performing a touch on a specific region in the noisy input image. In such a scenario, the electronic device 102 extracts the contextual information of the noisy input image. In an example, the contextual information includes the user touch input, the face detection, the scene analysis, the sensor metadata, and so on. The user touch input depicts a circular region around a user touch area in a preview, while capturing the noisy input image. The face detection depicts a circular region depending upon a size of a face detected in the noisy input image. The scene analysis depicts sky regions detected using the frequency analysis and saturation information. The sensor metadata depicts sensor related data such as, but are not limited to, ISO, ET, and so on, to obtain fine tunable control.

As depicted in FIG. 17A, the electronic device 102 creates the alpha map based on the contextual information extracted from the noisy input image. The electronic device 102 generates the updated control features using the alpha map and the contextual information. The electronic device 102 generates a denoised output image corresponding to the noisy input image by varying the updated control features across the regions of the noisy input image using the trained neural network 302. The electronic device 102 stores the denoised output image and the associated updated control features and the noisy input image in the memory 202.

Figure 18A:
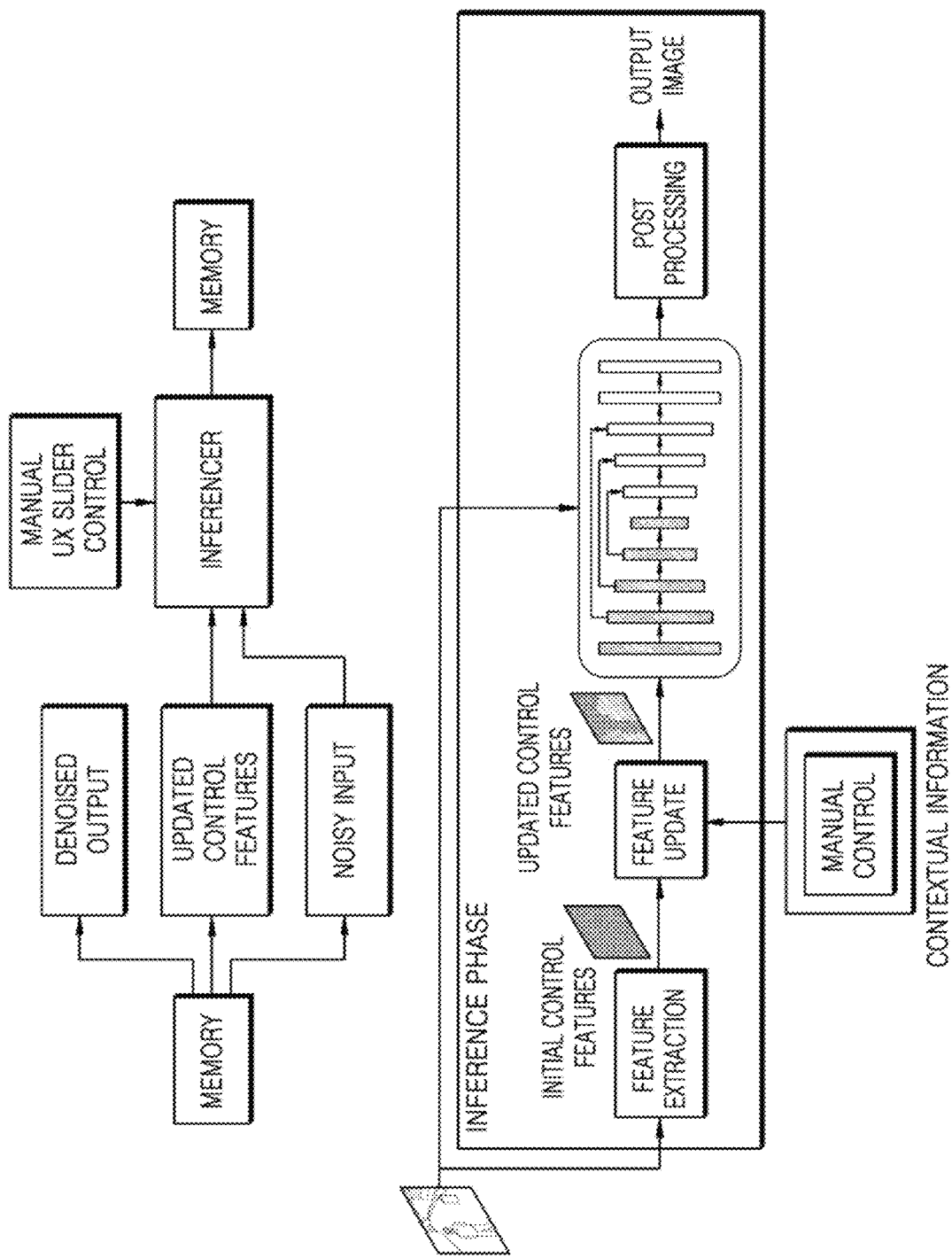
FIG. 18A depicts example block diagrams for denoising the media data, according to embodiments of the disclosure.
Figure 18B:
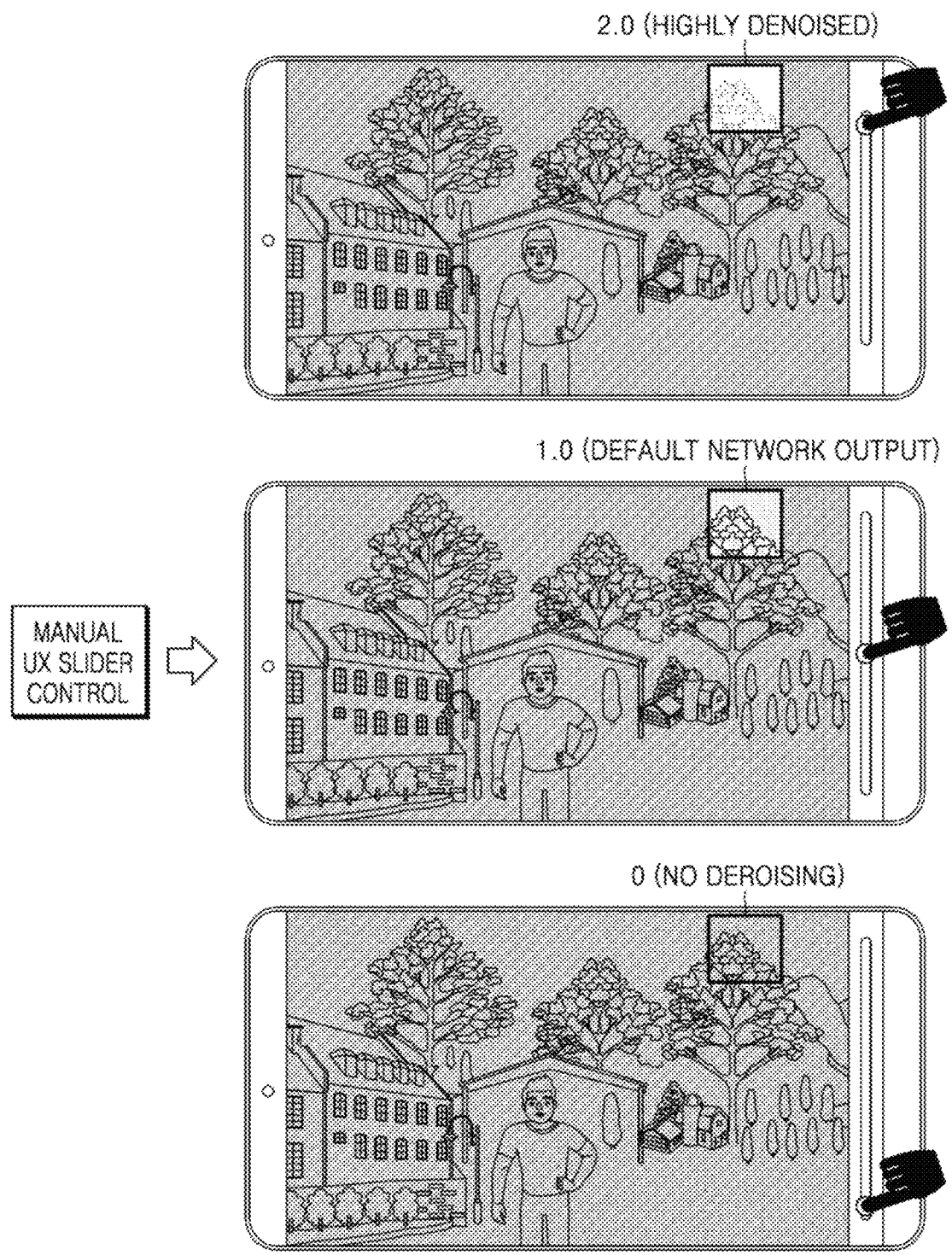
FIG. 18B depicts outputs of denoising process according to an embodiment of the disclosure.

FIG. 18A depicts example block diagrams for denoising of the media data, according to embodiments of the disclosure. FIG. 18B depicts outputs of denoising process according to an embodiment of the disclosure.

Consider an example scenario, as depicted in FIG. 18B, wherein the user selects a denoised output image stored in the memory 202 for further processing. In such a scenario, as depicted in FIG. 18A, the electronic device 102 fetches the noisy input image (unprocessed image) associated with the denoised output image from the memory 202 and displays the noisy input image to the user. On displaying the noisy input image to the user, the electronic device 102 provides a manual user experience (UX) slider control option to the user for manually adjusting the noise characteristics and the details of the denoised output image, with reference to the associated noisy input image. The noise characteristics and the details of the denoised output image may be controlled uniformly using the alpha map. The electronic device 102 further stores the post processed denoised output image in the memory 202.

FIG. 19 depicts example diagrams depicting denoising of the media data, according to embodiments of the disclosure.

Consider an example scenario, as depicted in FIG. 19, wherein the user selects a noisy input image and performs a gesture (for example: user touch) on one or more regions in the selected noisy input image. In such a scenario, the electronic device 102 creates the alpha map by boosting the details in the one or more regions on which the gesture has been performed by the user and suppressing the noise in other regions of the noisy input image. The electronic device 102 generates the updated control features using the created alpha map and the contextual information of the noisy input image. The electronic device 102 generates a denoised output image corresponding to the noisy input image by spatially varying the updated control features across the regions of the noisy input image. In the denoised output image, the details have been preserved in the one or more regions on which the user has performed the gesture.

Figure 20:
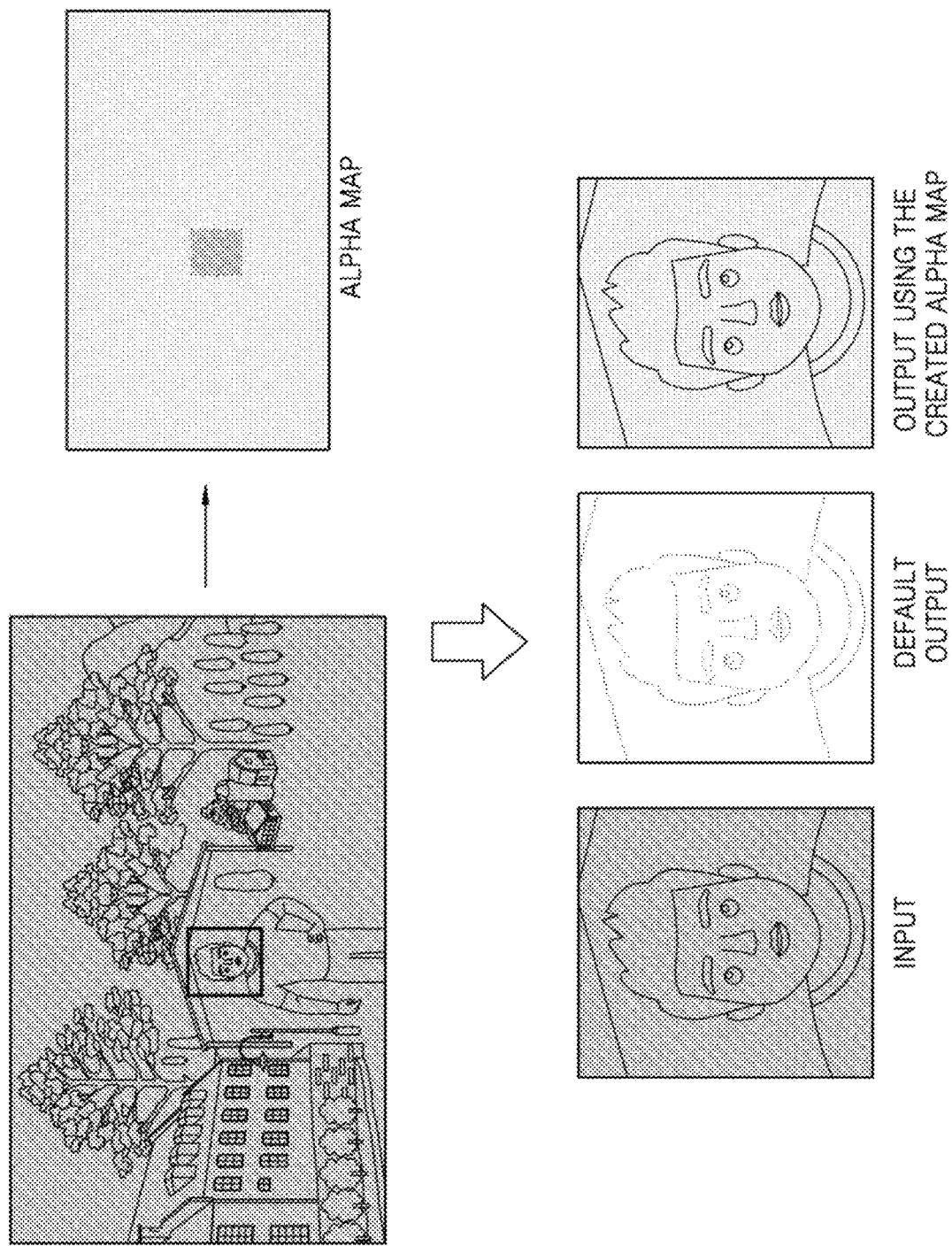
FIG. 20 depicts example diagrams depicting denoising the media data, according to embodiments of the disclosure.

FIG. 20 depicts example diagrams depicting denoising of the media data, according to embodiments of the disclosure.

Consider an example scenario, as depicted in FIG. 20, wherein the user selects a noisy input image. In such a scenario, the electronic device 102 detects a face region in the noisy input image. The electronic device 102 creates the alpha map by boosting the details in the face region and suppressing the noise in other regions of the noisy input image. The electronic device 102 generates the updated control features using the created alpha map and the contextual information of the noisy input image. The electronic device 102 generates a denoised output image corresponding to the noisy input image by spatially varying the updated control features across the regions of the noisy input image. In the denoised output image, the details have been preserved in the face region.

Figure 21:
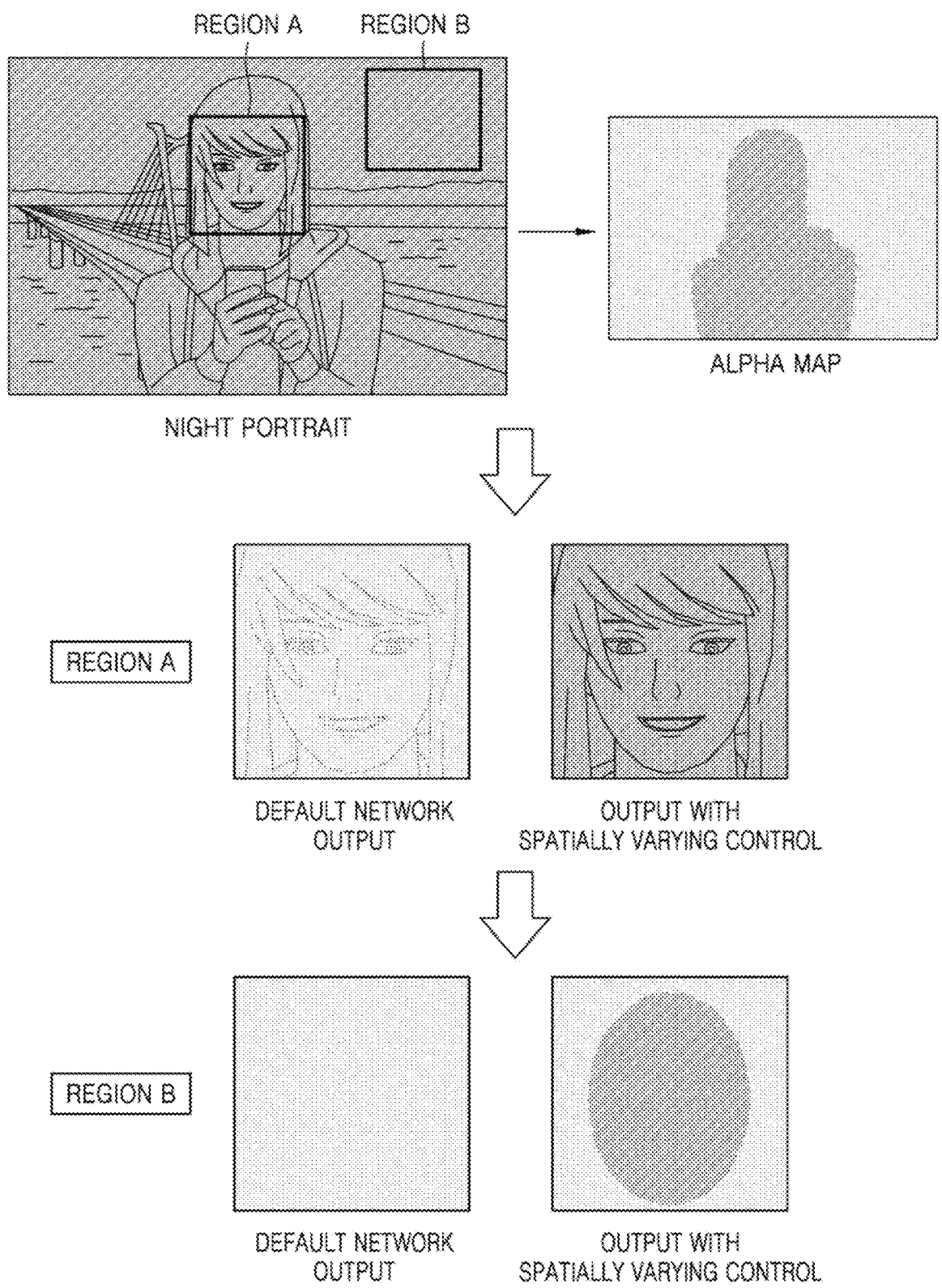
FIG. 21 depicts example diagrams depicting denoising the media data, according to embodiments of the disclosure.

FIG. 21 depicts example diagrams depicting denoising of the media data, according to embodiments of the disclosure.

Consider an example scenario, as depicted in FIG. 21, wherein the user selects a noisy input image captured in a night portrait mode for denoising. In such a scenario, the electronic device 102 creates the alpha map for the noisy input image by boosting the details in a foreground region and suppressing the noise characteristics in a background region. The electronic device 102 generates the updated control features using the created alpha map and the contextual information of the noisy input image. The electronic device 102 generates a denoised output image corresponding to the noisy input image by spatially varying the updated control features across the regions of the noisy input image. In the denoised output image, the details have been preserved in the foreground region and the noise characteristics have been reduced in the background region.

Figure 22:
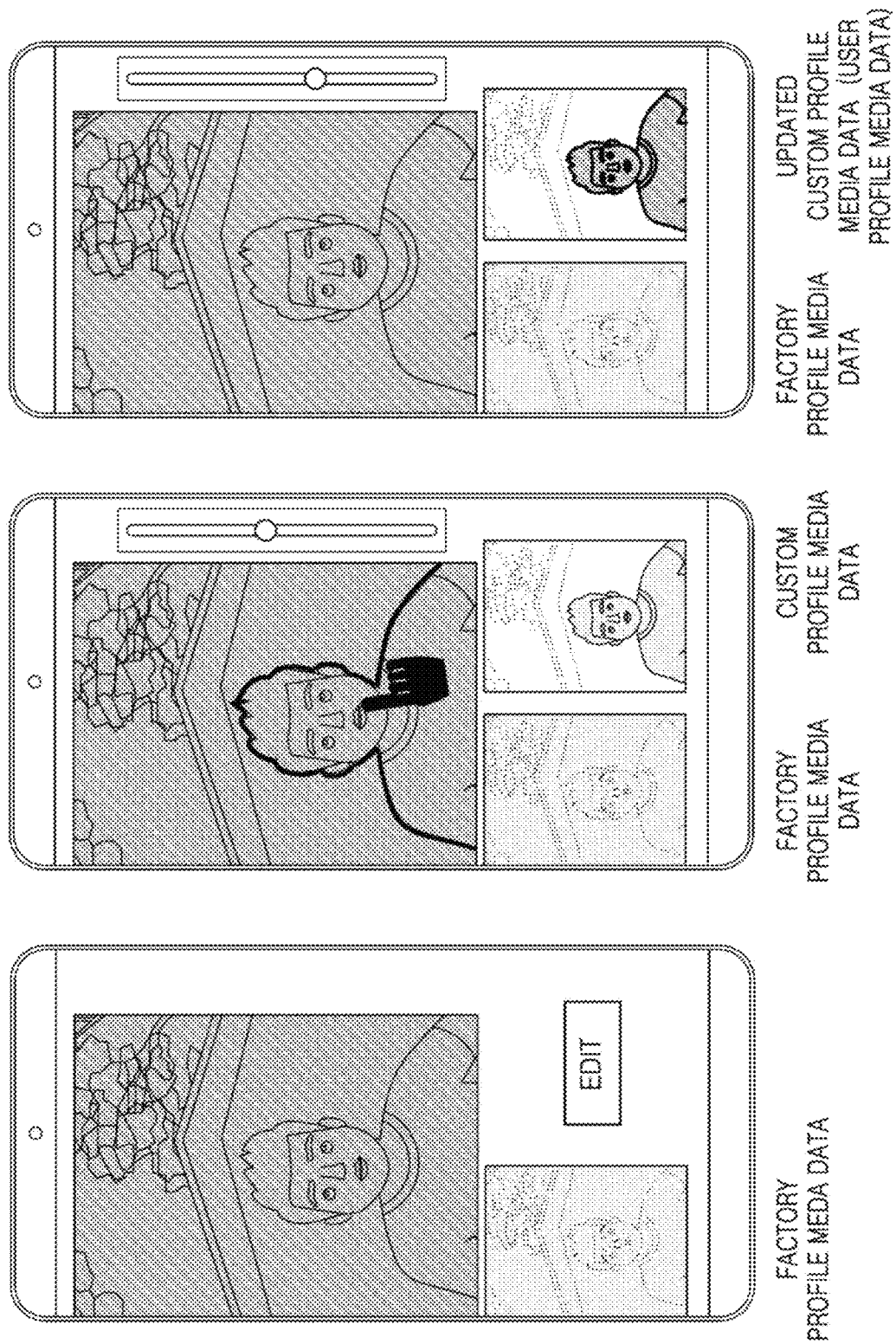
FIG. 22 depicts example diagrams depicting generation of the user profile LUT for denoising the media data, according to embodiments of the disclosure.
Figure 23:
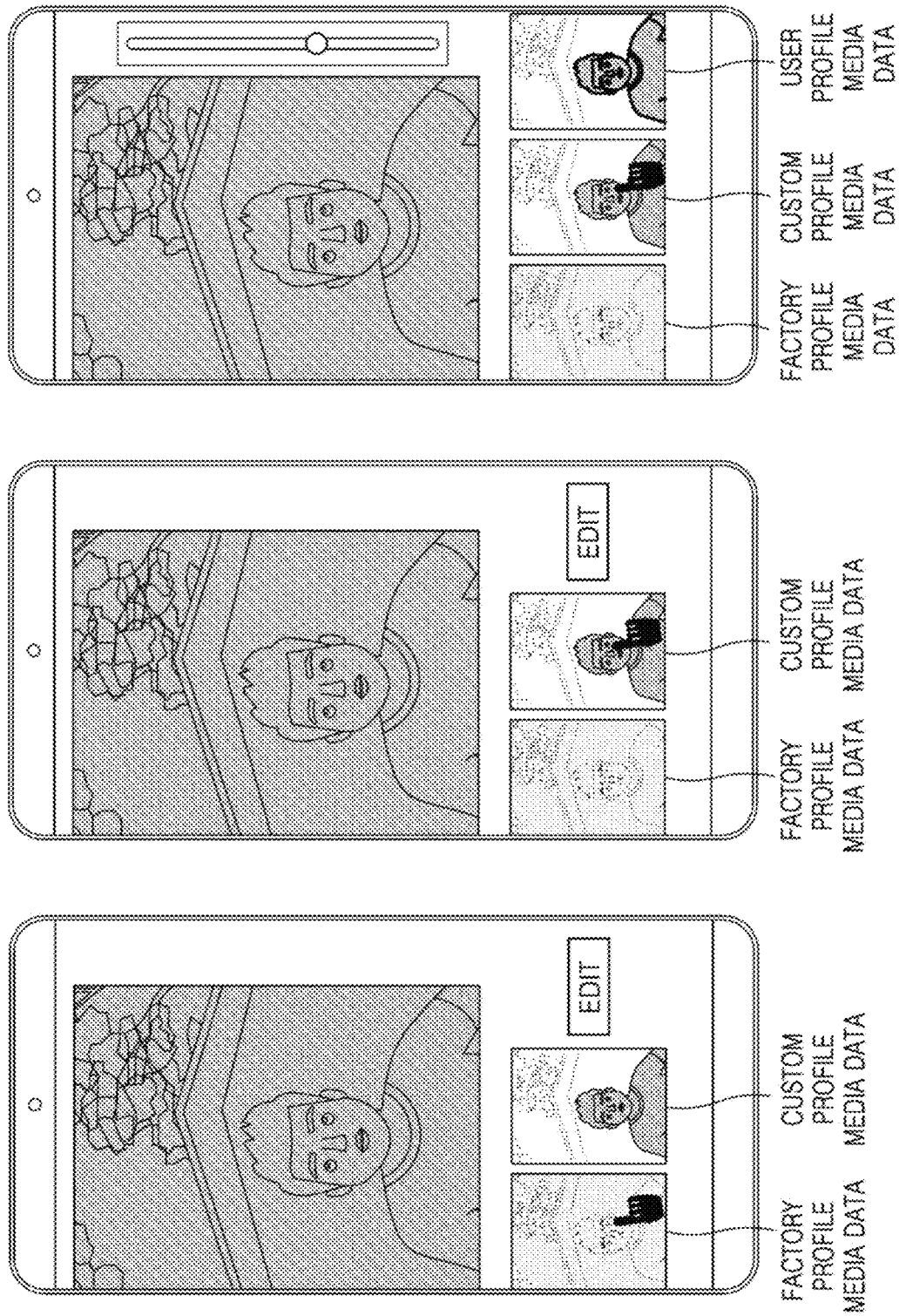
FIG. 23 depicts example diagrams depicting generation of the user profile LUT for denoising the media data, according to embodiments of the disclosure.

FIGS. 22 and 23 are example diagrams depicting generation of the user profile LUT for denoising the media data, according to embodiments of the disclosure.

FIG. 22 depicts example diagrams depicting generation of the user profile LUT for denoising the media data, according to embodiments of the disclosure.

Consider an example scenario, as depicted in FIG. 22, wherein the user selects a noisy input image for denoising. In such a scenario, the electronic device 102 displays the factory profile media data for the noisy input image to the user based on the availability of the factory profile LUT in the memory 202. The factory profile media data may be generated using the factory profile LUT.

The electronic device 102 allows the user to control the noise characteristics and the details of the input noisy image using the factory profile media data that is displayed on the electronic device 102. In an example herein, the user opens the factory profile media data and updates the factory profile media data. Updating the factory profile media data includes selecting a face in the factory profile media data and adjusting the noise characteristics and/or the details of the face. The electronic device 102 stores the updated factory profile media data as the custom profile media data in the memory 202. The electronic device 102 further determines the contextual information or object context from the custom profile media data and generates the custom profile LUT. The custom profile LUT includes the mapping of the values of the factory alpha parameter and the user alpha parameter with respect to the object context determined in the custom profile media data. The electronic device 102 stores the custom profile LUT in the memory 202.

The electronic device 102 displays the updated factory profile media data or custom profile media data to the user and further allows the user to control the noise characteristics and the details of the input noisy image using the factory profile media data and the custom profile media data. In an example herein, the electronic device 102 toggles between the factory profile media data and the custom profile media data and provides the input to the electronic device 102 to store the custom profile media data as the denoised output media data for the noisy input media data. In such a scenario, the electronic device 102 stores the custom profile media data as the user profile media data in the memory 202. The electronic device 102 further updates the custom profile LUT as the user profile LUT by tuning the values of the user alpha parameter with respect to the values of the object context determined from the user profile media data. The electronic device 102 may tune the values of the user alpha parameter based on the actions performed by the user, such as, but are not limited to, toggling between the factory profile media data and the custom profile media data to adjust the noise characteristics and the details of noisy input media data. The electronic device 102 may provide the factory profile media data, the custom profile media data, and the user profile media data to the user for denoising of the subsequent image/media data.

FIG. 23 depicts example diagrams depicting generation of the user profile LUT for denoising the media data, according to embodiments of the disclosure.

Consider an example scenario, as depicted in FIG. 23, wherein the user selects a noisy input image for denoising. In such a scenario, the electronic device 102 displays a factory profile media data and the custom profile media data to the user for denoising the noisy input media data, based on the availability of the factory profile LUT and the custom profile LUT in the memory 202.

The factory profile media data and the custom profile media data are provided to the user, and the electronic device 102 allows the user to control the noise characteristics and the details of the input noisy image using the factory profile media data and/or the custom profile media data. In an example herein, the user toggles between the factory profile media data and the custom profile media data and provides the input to the electronic device 102 to store the custom profile media data as the denoised output media data for the noisy input media data. In such a scenario, the electronic device 102 stores the custom profile media data as the user profile media data in the memory 202. The electronic device 102 further updates the custom profile LUT as the user profile LUT by tuning the values of the user alpha parameter with respect to the object context determined from the custom profile media data. The electronic device 102 may tune the values of the user alpha parameter based on the actions performed by the user, such as, but are not limited to, toggling between the factory profile media data and the custom profile media data to adjust the noise characteristics and the details of noisy input media data. The electronic device 102 may provide the factory profile media data, the custom profile media data, and the user profile media data to the user for denoising of the subsequent image or media data.

FIG. 24 is an example diagram depicting denoising of the media data based on user preferences, according to embodiments of the disclosure.

Consider an example scenario, as depicted in FIG. 24, wherein the user wants to denoise the media data on the electronic device 102 (for example; a device A) based on the noise characteristics and the details of the media data denoised on another electronic device (for example: a device B), while retaining perspective and contrast characteristics of the device A. In such a scenario, the device A receives the denoised media data (for example: an image B) from the device B and fetches the denoised media data (for example: an image A) stored in the memory 202, wherein the image A has been denoised on the device A. The device A estimates the noise characteristics and the details of the image A and the image B and calculates the ratio, which provides the relative noise estimation between the two images A and B. The device A updates the LUT by tuning the alpha parameter in the LUT based on the calculated ratio. The device A stores the updated LUT in the memory 202.

The device A receives a noisy input image from the user for denoising. The device A creates the alpha map for the noisy input image using the alpha parameter of the updated LUT stored in the memory 202. The device A generates the updated control features for the noisy input image using the created alpha map and the contextual information of the noisy input image. The device A generates an output image for the noisy input image by spatially varying the control features across the regions of the noisy input image. The output image may be the denoised noisy input image, having the noise characteristics and/or the details similar to the image denoised on the device B.

According to an embodiment of the disclosure, a method for denoising media data is provided. The method is performed by the electronic device 102 disclosed herein. The electronic device 102 may receive at least one input media data through the media data acquisitor 206 or the communication interface 204. Also, the electronic device 102 may segregate the at least one input media data into at least one region, based on the extent of denoising to be carried out. After the input media data is segregated, the electronic device 102 may denoise the at least one input media data by varying at least one updated control feature of the at least one input media data across the segregated at least one region to adjust the extent of denoising by a neural network with respect to the segregated at least one region. The segregating of the input media data and denoising of the input media data may be performed by the processor 212.

The embodiments disclosed herein may be implemented through at least one software program running on at least one hardware device and performing network management functions to control the elements. The elements shown in FIGS. 1-12, may be at least one of a hardware device, or a combination of hardware device and software module.

The embodiments disclosed herein describe methods and systems for denoising media data using contextual information of the media data. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g., Very high speed integrated circuit Hardware Description Language (VHDL) another programming language, or implemented by one or more VHDL or several software modules being executed on at least one hardware device. The hardware device may be any kind of portable device that may be programmed. The device may also include means which could be e.g., hardware means like e.g., an ASIC, or a combination of hardware and software means, e.g., an ASIC and an FPGA, or at least one microprocessor and at least one memory with software modules located therein. The method embodiments described herein could be implemented partly in hardware and partly in software. Alternatively, the invention may be implemented on different hardware devices, e.g., using a plurality of CPUs.

The foregoing embodiments are merely examples and are not to be construed as limiting. The present teaching can be readily applied to other types of apparatuses. Also, the description of the embodiments is intended to be illustrative, and not to limit the scope of the claims, and many alternatives, modifications, and variations will be apparent to those skilled in the art.

What is claimed is:

1. A method for processing image data, the method comprising:
   receiving at least one image;
   selecting at least one region in the at least one image, based on at least one of a user touch input, face detection, or scene analysis
   generating at least one updated control feature from an initial control feature of the at least one image for the selected at least one region to adjust an extent of denoising with respect to the selected at least one region; and
   denoising the at least one image by inputting an input image including the selected at least one region and the at least one updated control feature into a neural network and processing the input image based on the updated control features by the neural network.

2. The method of claim 1, further comprising segregating the at least one image into at least one region, based on the extent of denoising, wherein the at least one image is segregated into the at least one region based on at least one of a gesture input performed by a user on the at least one image, a frequency analysis performed on the at least one image, or saturation information of the at least one image.

3. The method of claim 1, wherein the denoising the at least one image comprises:
   training the neural network using a plurality of training image samples comprising noise characteristics, and a ground truth image sample; and
   denoising the at least one image using the trained neural network.

4. The method of claim 3, wherein the training the neural network comprises:
   extracting at least one feature from each of the plurality of training image samples, wherein the at least one feature comprises at least one of noise distribution, lighting levels, or sensor metadata;
   deriving at least one initial control feature for each of the plurality of training image samples by encoding the extracted at least one feature using at least one filter, wherein the at least one filter comprises at least one of a high pass filter or a Laplacian filter;
   providing each of the plurality of training image samples and the at least one initial control feature associated with of the plurality of training image samples, to the neural network for generating an output image sample for each of the plurality of training image samples;
   computing a loss function by comparing the generated output image sample corresponding to each of the plurality of training image samples with the ground truth image sample; and
   updating parameters of the neural network based on the computed loss function to generate the output image sample for at least one subsequent training image sample.

5. The method of claim 4, wherein the at least one initial control feature of a training image sample, among the plurality of training image samples, provides an estimate of noise present in the respective training image sample, wherein the at least one initial control feature comprises at least one of the user touch input, the face detection, the scene analysis, sensor metadata, or a user manual control.

6. The method of claim 3, wherein the denoising the at least one image using the trained neural network comprises:
   extracting contextual information of the at least one image, wherein the contextual information comprises at least one of the user touch input, the face detection, the scene analysis, sensor metadata, or a user manual control;
   creating an alpha map for the at least one image based on the contextual information of the at least one image;
   generating the at least one control feature based on the alpha map or the at least one initial control feature that has been derived while training the neural network; and
   generating at least one output image by varying the at least one control feature using the trained neural network, wherein the generated at least one output image comprises the at least one region of the at least one image, while preserving details of the at least one image.

7. The method of claim 6, wherein creating the alpha map includes:
   creating the alpha map based on the contextual information of the at least one image; or
   creating the alpha map using a look-up-table (LUT), wherein the alpha map provides information to control a denoising strength of the trained neural network.

8. The method of claim 7, wherein the creating the alpha map based on the contextual information of the at least one image comprises:
   generating a first initial map corresponding to a first contextual information of the at least one image by updating an initial uniform map based on the first contextual information;
   until initial maps are generated for all contextual information of the at least one image, recursively performing:
      receiving a subsequent contextual information of the at least one image; and
      generating a subsequent initial map corresponding to the subsequent contextual information by updating the first initial map or a previous initial map based on the subsequent contextual information;
   merging the initial maps corresponding to all the contextual information of the at least one image; and
   convoluting the merged initial maps using a smoothing filter to create the alpha map.

9. The method of claim 7, wherein the creating the alpha map using the LUT comprises:
   obtaining a value of an alpha parameter from the LUT for the contextual information of the at least one image; and
   creating the alpha map using the obtained value of the alpha parameter.

10. The method of claim 9, wherein the LUT comprises at least one of:
   a sensor profile LUT that comprises a mapping of values of the alpha parameter with respect to values of the sensor metadata of at least one image sample, wherein the alpha parameter in the sensor profile LUT is a senor alpha parameter;
   a user profile LUT that comprises a mapping of the values of the alpha parameter with respect to the values of the contextual information of the at least one image sample, wherein the alpha parameter in the user profile LUT is a user alpha parameter;
   a crowd source profile LUT that comprises a mapping of the values of the alpha parameter with respect to the values of the contextual information of the at least one image sample, wherein the alpha parameter in the crowd source profile LUT is a crowd source alpha parameter; and
   a factory profile LUT that comprises a mapping of the values of the alpha parameter with respect to the contextual information of the at least one image sample, wherein the alpha parameter in the factory profile LUT is a factory alpha parameter.

11. The method of claim 10, further comprising: updating the sensor profile LUT, wherein the updating the sensor profile LUT comprises at least one of:
   tuning at least one of the values of the alpha parameter using the at least one image sample captured using different image sensors under different capturing conditions;
   tuning the at least one of the values of the alpha parameter using an intra-sensor tuning, wherein the intra-sensor tuning comprises tuning the at least one of the values of the alpha parameter of an image sensor used to capture the at least one image sample; and
   tuning the at least one of the values of the alpha parameter using an inter-sensor tuning, wherein the inter-sensing tuning comprises tuning the at least one of the values of the alpha parameter with respect to a plurality of image sensors used to capture different image samples.

12. The method of claim 10, further comprising: generating the user profile LUT comprises:
   determining at least one first action performed by a user to denoise the at least one image sample, when at least one factory profile image corresponding to the at least one image sample is generated by denoising the at least one image sample using the factory profile LUT and is provided to the user;
   determining the contextual information of the denoised at least one image sample using the at least one first action of the user;
   generating a custom profile LUT by creating a mapping of the values of the alpha parameter with respect to the determined contextual information;
   generate a custom profile image by denoising the at least one image sample using the custom profile LUT;
   determining at least one second action performed by the user to denoise the at least one image sample using at least one of the custom profile image and the factory profile image;
   determining the contextual information of the denoised at least one image sample using the at least one second action of the user; and
   updating the custom profile LUT by tuning at least one of the values of the alpha parameter based on the at least one second action of the user, wherein the updated custom profile LUT is set to the user profile LUT.

13. The method of claim 10, further comprising:
   transmitting the user profile LUT to a server, to enable the server to generate a crowd source profile based on the user profile LUT corresponding to each of a plurality of users, and a weight of each of the plurality of users;
   receiving the crowd source profile LUT from the server; and
   providing, to the server, usage statistics that indicate whether a user has selected the crowd source profile LUT for denoising the at least one image sample, to enable the server to compute a preference score for the crowd source profile LUT, and to update the weight of each of the plurality of users.

14. The method of claim 10, further comprising: updating the LUT based on user preferences,
   wherein the updating the LUT comprises:
      receiving at least one second denoised image from another electronic device;
      fetching at least one first denoised image stored in a memory;
      performing a noise estimation of the at least one first denoised image and the at least one second denoised image;
      calculating a ratio based on the noise estimation of the at least one first denoised image and the at least one second denoised image, wherein the ratio provides a relative noise estimation between the at least one first denoised image and the at least one second denoised image; and updating the LUT by tuning the alpha parameter based on the calculated ratio.

15. The method of claim 1, further comprising:
generating an initial alpha map based on scene features extracted from the received at least one image, wherein the scene features comprises at least of a noise distribution or a brightness level of the received at least one image;
generating a plurality of intermediate alpha maps based on contextual information of the received at least one image, wherein the contextual information comprises at least one of a user input that enters with regard to the received at least one image, an object detected from the received at least one image, or image sensor metadata of the received at least one image;
combining the initial alpha map with the plurality of intermediate alpha maps to obtain a final alpha map of the input image, and
inputting the final alpha map to the neural network to reduce noise level of the received at least one image.

16. The method of claim 15, wherein the generating the plurality of intermediate alpha maps comprises:
generating a first alpha map by adjusting an intensity level of a first region of the user input in the received at least one image, and
generating a second alpha map by adjusting an intensity level of a second region of the object detected in the received at least one image.

17. An electronic device comprising:
a memory storing instructions; and
a processor configured to execute the instructions to:
receive at least one image;
select at least one region in the at least one image, based on at least one of a user touch input, face detection, or scene analysis;
generate at least one updated control feature from an initial control feature of the at least one input image for the selected at least one region to adjust an extent of denoising with respect to the selected at least one region;
denoise the at least one image, by inputting an input image including the selected at least one region and the at least one updated control feature into a neural network and process the input image based on the updated control features by the neural network.

18. The electronic device of claim 17, wherein the processor is further configured to segregate the at least one image into the at least one region based on at least one of a gesture input performed by a user on the at least one image, a frequency analysis performed on the at least one image, or saturation information of the at least one image.

19. The electronic device of claim 17, wherein the processor is further configured to:
train the neural network using a plurality of training image samples comprising noise characteristics and a ground truth image sample; and
denoise the at least one image using the trained neural network.

20. The electronic device of claim 19, wherein the processor is further configured to:
extract contextual information of the at least one image, wherein the contextual information comprises at least one of the user touch input, the face detection, the scene analysis, sensor metadata, or a user manual control;
create an alpha map for the at least one image based on the contextual information of the at least one image;
generate the at least one control feature based on the alpha map or the at least one initial control feature that has been obtain while training the neural network; and
generate an output image by varying the at least one control feature using the trained neural network.

21. A non-transitory computer-readable storage medium storing a program that is executable by a computer to perform an image processing method, the image processing method comprising:
receiving an input image;
generating an initial alpha map based on scene features extracted from the input image, wherein the scene features comprises at least of a noise distribution or a brightness level of the input image;
generating a plurality of intermediate alpha maps based on contextual information of the input image, wherein the contextual information comprises at least one of a user input that enters with regard to the input image, an object detected from the input image, or image sensor metadata of the input image;
combining the initial alpha map with the plurality of intermediate alpha maps to obtain a final alpha map of the input image, and
inputting the final alpha map to a neural network to reduce noise level of the input image.

22. The non-transitory computer-readable storage medium of claim 21, wherein the generating the plurality of intermediate alpha maps comprises:
generating a first alpha map by adjusting an intensity level of a first region of the user input in the input image, and
generating a second alpha map by adjusting an intensity level of a second region of the object detected in the input image.

23. A non-transitory computer-readable storage medium storing a program that is executable by a computer to perform an image processing method, the image processing method comprising:
receiving at least one image;
selecting at least one region in the at least one image, based on at least one of a user touch input, face detection, or scene analysis;
generating at least one updated control feature from an initial control feature of the at least one image for the selected at least one region to adjust an extent of denoising with respect to the selected at least one region; and
denoising the at least one image by inputting an input image including the selected at least one region and the at least one updated control feature into a neural network and processing the input image based on the updated control features by the neural network.

* * * * *